United States Patent
Biswas et al.

(10) Patent No.: US 12,433,944 B2
(45) Date of Patent: Oct. 7, 2025

(54) VACCINE COMPOSITION

(71) Applicant: SpyBiotech Limited, Oxford (GB)

(72) Inventors: Sumi Biswas, Oxford (GB); Jing Jin, Oxford (GB); Rebecca Alice Dabbs, Oxford (GB); Genevieve Marie Catherine Labbé, Oxford (GB)

(73) Assignee: SpyBiotech Limited, Oxford (GB)

( * ) Notice: Subject to any disclaimer, the term of this patent is extended or adjusted under 35 U.S.C. 154(b) by 0 days.

(21) Appl. No.: 17/052,707

(22) PCT Filed: May 3, 2019

(86) PCT No.: PCT/GB2019/051245
§ 371 (c)(1),
(2) Date: Nov. 3, 2020

(87) PCT Pub. No.: WO2019/211630
PCT Pub. Date: Nov. 7, 2019

(65) Prior Publication Data
US 2021/0128717 A1 May 6, 2021

(30) Foreign Application Priority Data

May 4, 2018 (GB) ..................................... 1807376
May 4, 2018 (GB) ..................................... 1807378

(51) Int. Cl.
*A61K 39/245* (2006.01)
*A61K 39/12* (2006.01)
*A61P 31/14* (2006.01)
*A61P 31/22* (2006.01)
*A61K 39/00* (2006.01)

(52) U.S. Cl.
CPC ............ *A61K 39/245* (2013.01); *A61K 39/12* (2013.01); *A61P 31/14* (2018.01); *A61P 31/22* (2018.01); *A61K 2039/5258* (2013.01); *A61K 2039/545* (2013.01); *C12N 2710/16123* (2013.01); *C12N 2710/16134* (2013.01); *C12N 2760/18523* (2013.01); *C12N 2760/18534* (2013.01)

(58) Field of Classification Search
None
See application file for complete search history.

(56) References Cited

U.S. PATENT DOCUMENTS

| 5,767,250 | A | 6/1998 | Spaete | |
|---|---|---|---|---|
| 9,399,059 | B2 * | 7/2016 | Morrison | ............... A61K 39/17 |
| 9,683,022 | B2 | 6/2017 | Carfi | |
| 10,287,322 | B2 | 5/2019 | Carfi | |

FOREIGN PATENT DOCUMENTS

| CN | 106456724 A | 2/2017 | | |
|---|---|---|---|---|
| CN | 107875382 A | 4/2018 | | |
| EP | 2222710 | 7/2016 | | |
| GB | 1705750.6 | 4/2017 | | |
| GB | 1706430.4 | 4/2017 | | |
| WO | WO 2011/098772 A1 | 8/2011 | | |
| WO | 2012034025 A2 | 3/2012 | | |
| WO | WO 2014/005959 A1 | 1/2014 | | |
| WO | WO 2014/160463 A1 | 10/2014 | | |
| WO | WO 2016/067239 A1 | 5/2016 | | |
| WO | WO-2016112921 A1 * | 7/2016 | ............ | A61K 39/00 |
| WO | WO 2016/193746 A1 | 12/2016 | | |
| WO | WO 2017/172890 A1 | 10/2017 | | |
| WO | WO 2018/189517 A1 | 10/2018 | | |
| WO | WO 2018/197854 A1 | 11/2018 | | |

OTHER PUBLICATIONS

Brune et al. Sci Rep vol. 6, 19234, pp. 1-13 (Year: 2016).*
Wussow et al., Human Cytomegalovirus Vaccine Based on the Envelope gH/gL Pentamer Complex. PLoS Pathog 10(11): e1004524). (Year: 2014).*
Gordon et al., The Journal of Infectious Diseases, vol. 171, No. 6, pp. 1576-1585 (Year: 1995).*
Chang et al., Cold Spring Harb Perspect Med Mar. 2015;5:a021493 (doi: 10.1101/cshperspect.a021493)). (Year: 2015).*
Wussow et al., Vaccines , 5(4), 39 (Year: 2017).*
Spaete et al., Virology vol. 193, pp. 853-861 (Year: 1993).*
Altschul, S.F., "A protein alignment scoring system sensitive at all evolutionary distances," *Journal of Molecular Evolution*, vol. 36, pp. 290-300 (Mar. 1993).
Altschul, S.F. et al., "Basic Local Alignment Search Tool," *Journal of Molecular Biology*, vol. 215, pp. 403-410 (Oct. 1990).
Arai, R. et al., "Design of the linkers which effectively separate domains of a bifunctional fusion protein," *Protein Engineering*, vol. 14, pp. 529-532 (Aug. 2001).
Brune, K.D. et al., "Plug-and-Display: decoration of Virus-Like Particles via isopeptide bonds for modular immunization," *Scientific Reports*, vol. 6, pp. 1-13 (Jan. 2016).
Brune, K.D. et al., "Dual Plug-and-Display Synthetic Assembly Using Orthogonal Reactive Proteins for Twin Antigen Immunization," *Bioconjugate Chemistry*, vol. 28, pp. 1544-1551 (Apr. 2017).
Bruun, T.U.J. et al., "Engineering a Rugged Nanoscaffold To Enhance Plug-and-Display Vaccination," *ACS Nano*, vol. 12, pp. 8855-8866 (Jul. 2018).

(Continued)

*Primary Examiner* — Janet L Andres
*Assistant Examiner* — Myron G Hill
(74) *Attorney, Agent, or Firm* — Bookoff McAndrews, PLLC

(57) ABSTRACT

The present invention relates to vaccine compositions, most notably vaccine compositions wherein the antigenic component is large, for example over 50 kDa, or multimeric, i.e. comprised of subunits. Such antigenic components are of particular interest, because they may represent antigenic components from pathogens that currently it is not possible to vaccinate against. The invention relates to a composition comprising a particle displaying an antigenic component, wherein said composition comprises an antigenic component comprising a first peptide tag, and a moiety comprising a second peptide tag, wherein the antigenic component and the moiety are linked via an isopeptide bond between said first and second peptide tags, and wherein the antigenic component is over 50 kDa, or alternatively is multimeric.

15 Claims, 12 Drawing Sheets

Figure 1:
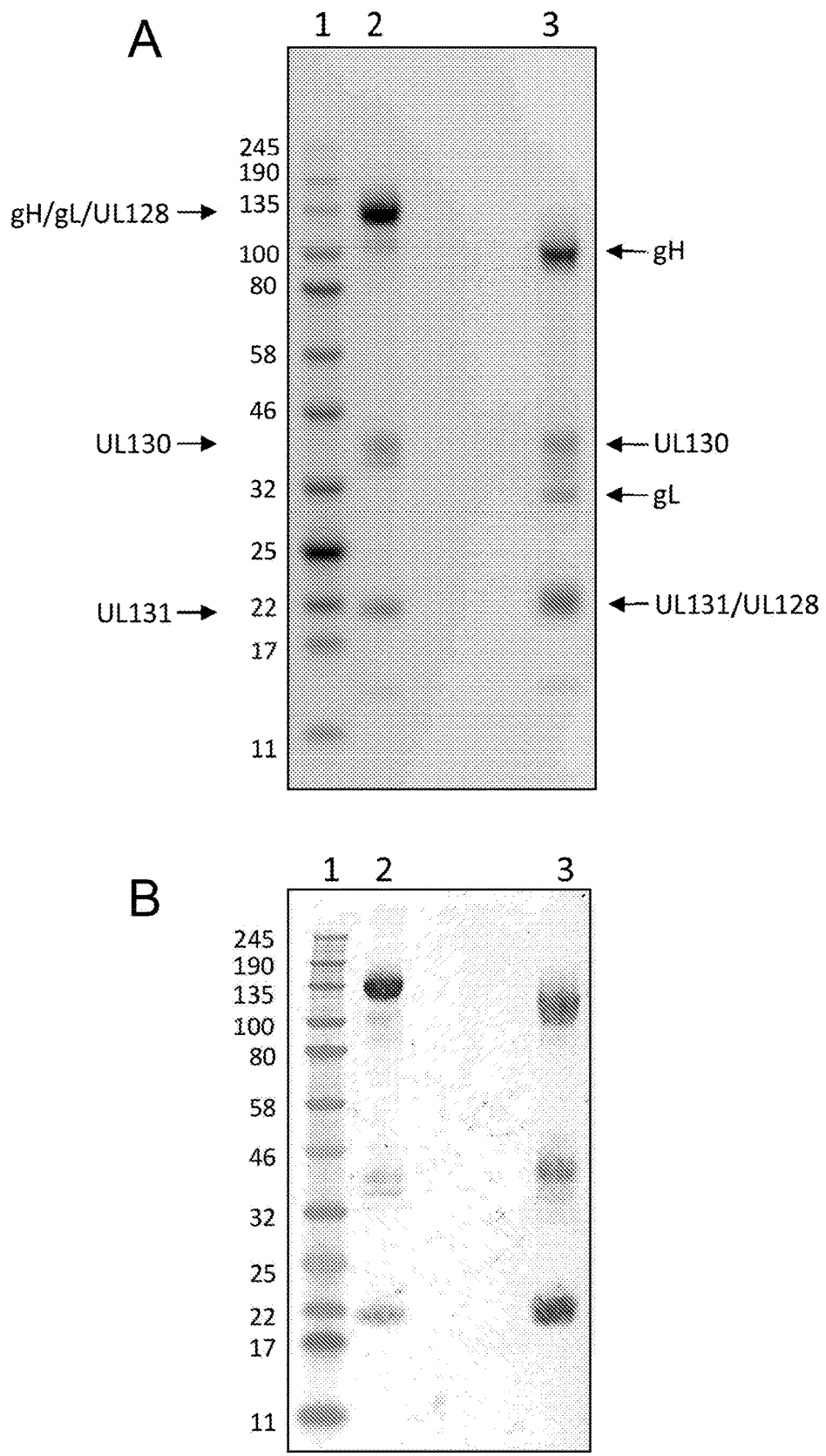

Specification includes a Sequence Listing.

(56) References Cited

OTHER PUBLICATIONS

Chen, X. et al., "Fusion Protein Linkers: Property, Design and Functionality," *Advanced Drug Delivery Reviews Author Manuscript*, vol. 65, pp. 1-32 (Oct. 2013).
Cheng, J. et al., "Cytomegalovirus Infection Causes an Increase of Arterial Blood Pressure," *PLoS Pathogens*, vol. 5, pp. 1-14 (May 2009).
Devereux, J. et al., "A comprehensive set of sequence analysis programs for the VAX," *Nucleic Acids Research*, vol. 12, pp. 387-395 (Jan. 1984).
Hofmann, I. et al., "Expression of the human cytomegalovirus pentamer complex for vaccine use in a CHO system," *Biotechnology and Bioengineering*, vol. 112, pp. 2505-2515 (Jun. 2015).
Joyce, M.G. et al., "Iterative structure-based improvement of a respiratory syncytial virus fusion glycoprotein vaccine," *Nature Structural & Molecular Biology Author Manuscript*, vol. 23, pp. 1-29 (Sep. 2016).
Karlin, S. et al., "Applications and statistics for multiple high-scoring segments in molecular sequences," *Proceedings of the National Academy of Sciences of the United States of America*, vol. 90, pp. 5873-5877 (Jun. 1993).
Kaslow, D.C. et al., "RTS,S: Toward a first landmark on the Malaria Vaccine Technology Roadmap," *Vaccine*, vol. 33, pp. 7425-7432 (Oct. 2015).
Klein, J.S. et al., "Design and characterization of structured proteinlinkers with differing flexibilities," *Protein Engineering, Design & Selection*, vol. 27, pp. 325-330 (Oct. 2014).
Krarup, A. et al., "A highly stable prefusion RSV F vaccine derived from structural analysis of the fusion mechanism," *Nature Communications*, vol. 6, pp. 1-12 (Sep. 2015).
Kushnir, N. et al., "Virus-like particles as a highly efficient vaccine platform: Diversity of targets and production systems and advances in clinical development," *Vaccine*, vol. 31, pp. 58-83 (Nov. 2012).
Leneghan, D.B. et al., "Nanoassembly routes stimulate conflicting antibody quantity and quality for transmission-blocking malaria vaccines," *Scientific Reports*, vol. 7, pp. 1-14 (Jun. 2017).
Li, L. et al., "Structural Analysis and Optimization of the Covalent Association between SpyCatcher and a Peptide Tag," *Journal of Molecular Biology Author Manuscript*, vol. 426, pp. 1-15 (Jan. 2014).
Michel, M. et al., "Optimisation of secretion of recombinant HBsAg virus-like particles: Impact on the development of HIV-1/HBV bivalent vaccines," *Vaccine*, vol. 25, pp. 1901-1911 (Aug. 2006).
Thrane, S. et al., "Bacterial superglue enables easy development of efficient virus-like particle based vaccines," *Journal of Nanobiotechnology*, vol. 14, pp. 1-16 (Apr. 2016).
Valenzuela, P. et al., "Nucleotide sequence of the gene coding for the major protein of hepatitis B virus surface antigen," *Nature*, vol. 280, pp. 815-819 (Aug. 1979).
Veggiani, G. et al., "Superglue from Bacteria: Unbreakable Bridges for Protein Nanotechnology," *Trends in Biotechnology Author Manuscript*, vol. 32, pp. 506-512 (Oct. 2014).

Wang, X. et al., "RT-qPCR-based microneutralization assay for human cytomegalovirus using fibroblasts and epithelial cells," *Vaccine*, vol. 33, pp. 7254-7261 (Nov. 2015).
Wussow, F. et al., "Human Cytomegalovirus Vaccine Based on the Envelope gH/gL Pentamer Complex," *PLoS Pathogens*, vol. 10, pp. 1-23 (Nov. 2014).
Zakeri, B. et al., "Peptide tag forming a rapid covalent bond to a protein, through engineering a bacterial adhesion," *Proceedings of the National Academy of Sciences of the United States of America*, vol. 109, pp. E690-E697 (Mar. 2012).
Search Report in GB Application No. 1807378.3, dated Feb. 1, 2019 (5 pages).
Search Report in GB Application No. 1807376.7, dated Feb. 1, 2019 (5 pages).
International Search Report in International Application No. PCT/GB2019/051245, mailed Oct. 29, 2019 (8 pages).
Pumpens, P. et al., "Construction of Novel Vaccines on the Basis of Virus-Like Particles: Hepatitis B Virus Proteins as Vaccine Carriers," Ch. 9, pp. 205-248 in *Medicinal Protein Engineering*, Khudyakov, Y., ed., CRC Press, 2008.
Pushko, P. et al., "Development of Virus-Like Particle Technology from Small Highly Symmetric to Large Complex Virus-Like Particle Structures," *Intervirology*, vol. 56, pp. 141-165 (2013).
Rutgers, T. et al., "Hepatitis B Surface Antigen as Carrier Matrix for the Repetitive Epitope of the Circumsporozoite Protein of *Plasmodium falciparum*," Biotechnology, vol. 6, pp. 1065-1070 (1998).
Wikipedia, "SpyCatcher," available at https://en.wikipedia.org/wiki/SpyCatcher, last accessed Dec. 21, 2022 (8 pages).
Moffat, J.M. et al, "Hepatitis B virus-like particles access major histocompatibility class I and II antigen presentation pathways in primary dendritic cells", Vaccine, vol. 31, pp. 2310-2316 (Apr. 2013).
Falloon et al., "An Adjuvanted, Postfusion F Protein-Based Vaccine Did Not Prevent Respiratory Syncytial Virus Illness in Older Adults", The Journal of Infectious Disease, 2017, vol. 216, Issue 11, pp. 1362-1370.
Graham et al., "Novel antigens for RSV vaccines", Current Opinions in Immunology, 2015, vol. 35, pp. 30-38.
Graham, "Vaccine development for respiratory syncytial virus", Current Opinions in Virology, 2017, vol. 23, pp. 107-112.
Lilleri et al., "Fetal human cytomegalovirus transmission correlates with delayed maternal antibodies to gH/gL/pUL128-130-131 complex during primary infection", PLoS One, 2013, vol. 8, Issue 3, Article No. e59863, pp. 1-13.
Wen et al., "Human cytomegalovirus gH/gL/UL128/UL130/UL131A complex elicits potently neutralizing antibodies in mice", Vaccine, 2014, vol. 32, Issue 30, pp. 3796-3804.
Kotiw et al., "Immunological Response to Parenteral Vaccination with Recombinant Hepatitis B Virus Surface Antigen Virus-Like Particles Expressing Helicobacter pylori KatA Epitopes in a Murine H. pylori Challenge Model", Clinical and Vaccine Immunology, 2012, vol. 19, No. 2, pp. 268-276.

\* cited by examiner

A

B

VACCINE COMPOSITION

CROSS-REFERENCE TO RELATED APPLICATIONS

This application is a U.S. national stage filing under 35 U.S.C. § 371 of International Application No. PCT/GB2019/051245, filed on May 3, 2019, which claims the benefit of priority to GB Application No. 1807378.3, filed on May 4, 2018, and GB Application No. 1807376.7, filed on May 4, 2018.

SEQUENCE LISTING

This application contains a sequence listing, submitted electronically in ASCII format under the filename Sequence_ Listing.txt, which is incorporated by reference herein in its entirety. The ASCII copy of the sequence listing was created on Nov. 3, 2020, and is 116,789 bytes in size.

BACKGROUND TO THE INVENTION

Vaccines are a safe and effective way to combat and eradicate infectious diseases. Vaccine development has been very successful, but there is a list of remaining disease challenges against which no vaccine currently exists, including many important pathogens representing daunting immunological obstacles. It is generally considered that an effective vaccine must traffic to lymph nodes, persist for a sufficient time to generate an immune response.

Vaccine development has moved away from using attenuated or dead pathogens to using smaller antigenic components of those pathogens, in an aim to generate the required protective immune response whilst avoiding the risks inherent by using such attenuated strains. Efforts have focussed on attempting to express immunogenic portions of components of a pathogen (such as those components which are required for the pathogen to infect a cell) which, for simplicity, have been limited to short/small peptides and proteins because of technical problems with the expression of large or multicomponent antigens. However, a potential problem with using very short or small peptides is the risk of antigenically variable pathogens, which escape the immune response induced by vaccination through changes in that particular part of the antigen.

There would be immunological advantages associated with expression of large/multicomponent antigens, including the ability to allow the generation of antibodies against multiple neutralising epitopes of the one pathogen. However, expression of one or more large antigens which may form a complex, in such a way that the relevant antigenic epitopes are maintained and presented for generation of an effective antibody response remains a huge challenge. There therefore remains a need for improved methods for expressing large antigens and/or multicomponent antigens in such a way that they can raise a clinically significant immune response.

Previous recombinant vaccines designed to invoke an immune response against multiple antigenic components either rely on each component being expressed and packaged separately into distinct particles, for example in the case of the anti-HPV vaccines Cervarix and Gardasil, where recombinant major capsid L1 proteins of particular HPV strains are separately expressed and assembled as virus-like particles (VLP), following which the different types of VLP are combined into the vaccine formulation. Alternatively, multiple short epitopes are selected and combined into a single recombinant vaccine (e.g. the Multimeric-001 influenza vaccine), but by their very nature these epitopes are short linear peptides, chosen in order to avoid manufacturing complexities involved with three-dimensional structures or refolding, and therefore do not attempt to represent the native pathogen as presented to the immune system in active infection.

As an example, the β-herpes human Cytomegalovirus (HCMV, also known as human herpesvirus-5 (HHV-5)) is a leading viral cause of neonatal developmental disabilities. This ubiquitous virus has infected over 60% of the general population, with initial infection usually being only minor or asymptomatic. After infection, the virus remains latent in the body but can cause serious disease in the immunocompromised (i.e. HIV patients, transplant patients and those undergoing chemotherapy) or elderly. HCMV is the leading infectious cause of birth defects in developed countries. Up to 4/200 babies are born with HCMV due to congenital infection, and up to 10% of these will suffer long term consequences. HCMV infection has also been implicated in high blood pressure and atherosclerosis in adults (Cheng et al. (May 2009). Früh K, ed. "Cytomegalovirus infection causes an increase of arterial blood pressure". PLoS Pathog. 5 (5): e1000427). HCMV is therefore a public health priority. Despite intensive efforts, however, a successful HCMV vaccine has not been developed to date.

Respiratory syncytial virus (RSV) is another ubiquitous virus that causes very little ill health in healthy adults and older children that it infects. However, it is the second largest cause of death in infants under the age of one worldwide, second only to Malaria. The virus is responsible for an estimated 160,000 deaths per year worldwide. This virus causes serious respiratory infections, and complications include pneumonia and bronchiolitis. High risk groups include infants under the age of one and immunocompromised patients, the elderly, and those with heart and lung conditions. Again, no currently licensed vaccine for RSV exists despite many years of active research and development.

For diseases such as those caused by RSV and HCMV, where there are no currently available vaccines, generally current approaches to vaccine production haven't shown the desired efficacy, indicating that there is a large unmet need in providing an alternative type of vaccine in order to deal with diseases with such catastrophic outcomes.

Recently several genetically-encoded systems for enabling spontaneous or assisted amide bond formation have been described. For example, SpyTag is a peptide which has been engineered such that a spontaneous and irreversible isopeptide bond to its protein partner SpyCatcher is formed when the two components are mixed. The position of the SpyTag and SpyCatcher components within protein chains can be designed to be at various locations and are reactive under a wide range of pH, buffer and temperature conditions. The SpyTag/SpyCatcher pair and variants and derivatives thereof have been used in vaccine development but only for the presentation of simple antigens to date. Other genetically encoded systems for enabling spontaneous amide bond formation include SnoopTag/SnoopTagJr and SnoopCatcher; RrgATag/RrgATag2/DogTag and RrgACatcher, IsopepTag/IsopepTag-N and Pilin-C or Pilin-N, PsCsTag and PsCsCatcher; and SnoopTapJr and DogTag (mediated by SnoopLigase), and variants of all these systems.

The present inventors have proven that use of large/multicomponent antigens in vaccine compositions is possible using genetically-encoded systems for enabling amide bond formation, which may improve the response to the large/multicomponent antigen. This is a surprising result.

SUMMARY OF THE INVENTION

In a first aspect of the invention there is provided a composition comprising a particle displaying a protein component, wherein said composition comprises:
 i) i) a protein component comprising a first peptide tag, and
 ii) ii) a moiety comprising a second peptide tag,
wherein the protein component and the moiety are linked via an isopeptide bond between said first and second peptide tags, and wherein the protein component is over 50 kDa.

In another aspect of the invention there is provided a composition comprising a particle displaying a protein component, wherein said composition comprises:
 i) a protein component comprising a first peptide tag, and
 ii) a moiety comprising a second peptide tag,
wherein the protein component and the moiety are linked via an isopeptide bond between said first and second peptide tags, and wherein the protein component is multimeric.

The protein component may have any function e.g. it may be an enzyme or have enzymatic properties. The protein component may be a full-length protein, or it may be a part, segment, domain or truncation of a full-length protein. The protein component may be an antigen or an immunogen. The protein component may also be called the antigenic component.

In another aspect of the invention there is provided a composition comprising a particle displaying an antigenic component, wherein said composition comprises:
 iii) an antigenic component comprising a first peptide tag, and
 iv) a moiety comprising a second peptide tag,
wherein the antigenic component and the moiety are linked via an isopeptide bond between said first and second peptide tags, and wherein the antigenic component is over approximately 50 kDa.

In some embodiments of any aspect of the invention the protein component or the antigenic component may be over 60 kDa, 70 kDa, 80 kDa, 90 kDa, 100 kDa, 110 kDa, 120 kDa, 130 kDa, 140 kDa, 150 kDa, 160 kDa, 170 kDa, 180 kDa, 190 kDa or more, such as over 200 kDa, over 300 kDa or over 400 kDa.

A multimer may comprise any number of subunits, which may or may not be covalently linked in the protein or antigenic component. The multimer may comprise 2-20 subunits, alternatively, 3, 4, 5, 6, 7, 8, 9, 10, 11, 12, 13, 14, 15 or more subunits. Alternatively, the multimer may be a dimer, trimer, tetramer, pentamer, hexamer, septamer, octamer, nonamer or decamer. The multimer may be from any appropriate pathogen, but is preferably a viral multimer.

Non-limiting examples of large protein components, i.e. those over 50 kDa or as described above, include the pentameric complex (PC) and gB glycoprotein from Human cytomegalovirus (HCMV), the G and F glycoproteins from RSV, the haemagglutinin (HA) and neuraminidase (NA) antigens from influenza A virus, *Plasmodium falciparum* Pfs230, *P. falciparum* CSP, Human HER2 receptor, PCSK9, VAR2CSA, *P. falciparum* RIPR, Varicella zoster virus (VZV) glycoprotein E, Rabies virus glycoprotein and the Epstein-Barr virus (EBV) gH/gL complex.

In some embodiments of any aspect of the invention the protein component or the antigenic component may be a monomer or a multimer, for example a dimer, trimer, tetramer or pentamer. In some embodiments of any aspect of the invention the protein component or the antigenic component may be a protein or peptide complex.

Non-limiting examples of multimeric antigenic components include the pentameric complex (PC) and gB trimer from Human cytomegalovirus (HCMV), the G and F glycoproteins from RSV, the haemagglutinin (HA) and neuraminidase (NA) antigens from influenza A virus, some of which are described herein. Other examples include components of disease agents such as viruses, bacteria, fungal pathogens, parasites or other disease vectors. Suitable multimeric antigenic components include, for example those derived from viruses such as influenza (such as Influenza hemagglutinin (HA) (e.g. Flu trimer)), Respiratory syncytial virus (RSV) etc.

The protein component may be attached to the first peptide tag by genetic fusion, and expressed recombinantly in an appropriate cell. For components that include post-translational modifications such as glycosylation it may be preferable to express the recombinant protein in a eukaryotic or mammalian cell line.

In one embodiment, the "moiety" is a component onto which a protein component or an antigenic component may be displayed e.g. made available to the immune system. In one embodiment the moiety multimerises to form said particle. Suitably, such a moiety may be a virus, a bacteria, a multimerisation scaffold for vaccination or a protein component which multimerises to form a VLP (virus-like particle). Suitably, the moiety may be a component of a bacteriophage, tobacco mosaic virus particle, adeno-associated virus like particles (AAVLP), *E. coli* etc. In one embodiment, the moiety is itself a component of the virus, bacteria etc. such that the multimerisation (e.g. self-assembly) of the moiety forms the particle for displaying the protein component or the antigenic component. In one embodiment the moiety may be a viral structural protein, for example a viral envelope or capsid protein or surface antigen. Examples of structural proteins include matrix M1 protein and viral envelope M2 protein from the influenza virus, HBsAg from Hepatitis B virus, *E. coli* bacteriophage AP205 viral coat protein (CP3), hemagglutinin-neuraminidase from a variety of viruses including Mumps and the like. Suitable viral structural proteins will be known to those skilled in the art. In other embodiments, the moiety may be a protein or peptide, such as a multimerisation domain such as IMX313, which forms nanoparticles, or a computationally derived particle such as MI3. In further embodiments the moiety may be a synthetic nanoparticle or a synthetic VLP, such as a gold, lipopeptide or poly(lactic-co-glycolic acid) (PLGA) nanoparticle. Other suitable moieties may include liposomes or outermembrane vesicles. Suitably a moiety comprising a second peptide tag is a moiety to which a second peptide tag is attached.

The use of a structural surface antigen from a virus may be preferred. The second peptide tag is therefore attached to the structural surface antigen, permitting the formation of a virus-like particle (VLP), to which the second peptide tag is attached, or to which is displaying the second peptide tag. VLPs are non-infectious self-assembling nanoparticles and their repetitive molecularly-defined architecture is attractive for engineering multivalency, notably for vaccination. VLPs have been produced from components of a wide variety of virus families including the Hepatitis B virus (including Hepatitis B small surface antigen (HBsAg)), Parvoviridae (e.g. adeno-associated virus), Retroviridae (e.g. HIV), Flaviviridae (e.g. Hepatitis C virus) and bacteriophages (e.g. Qβ, AP205). Any of these may be suitable for use as the moiety in the present invention.

The second peptide tag may be attached to the moiety through genetic fusion. This genetic fusion may be at any appropriate point in the sequence, not simply limited to the termini. Those skilled in the art will appreciate that the fusion protein may be expressed recombinantly in an appropriate cell.

The second peptide tag may alternatively be displayed or attached to the moiety by means of chemical conjugation. This would require, for example, the presence of a reactive amine group in order to allow the conjugation to take place.

Accordingly, in one embodiment, the moiety is a surface antigen of the hepatitis B virus (HBsAg). Suitably HBsAg has the amino acid sequence set out in SEQ ID NO: 41, as described herein (or functional equivalents thereof).

In one embodiment of any aspect of the invention the protein component or antigenic component is an immunogenic component of an HCMV pentamer. Suitably, an antigenic or immunogenic component is one which is capable of generating an immune response such as an antibody response against that component upon introduction into a subject such as a patient. Accordingly, an "immunogenic component of an HCMV pentamer", for example, is a component which is capable of generating an anti-HCMV antibody response in a subject. Suitably an immunogenic component comprises one or more of (at least one of) the HCMV pentamer subunit components selected from gH, gL, pUL128, pUL130 and pUL131 (also known as pUL131A). In some embodiments, the immunogenic component comprises one or more of those "pUL" or "UL" components. In other embodiments, the immunogenic component comprises one or more of those gH or gL components. In one embodiment the immunogenic component comprises a combination of one or more "UL" components with one or more components selected from the gH or gL components. In another embodiment of the invention, the immunogenic component of an HCMV pentamer is the HCMV pentamer comprising all of the gH/gL/pUL128/pUL130/pUL131 subunits. Suitably the gH/gL/pUL128/pUL130/pUL131 subunits have amino acid sequences corresponding to those derived from any known HCMV strain (including both laboratory strains and/or clinical isolates), including Towne (GI:239909366), AD169 (GI:219879600), Toledo (GI:290564358) and Merlin (GI: 155573956), or functional equivalents thereof. By functional equivalents is meant amino acid sequences that share some homology and differ only in some amino acids but retain the functional property of being able to form an antigenic subunit or pentamer that provides protective antibodies. Suitable variants of the components gH/gL/pUL128/pUL130/pUL131A are described, for example, in WO2014/005959 (see pages 4 to 10), hereby incorporated by reference. Advantageously, using HCMV pentamer subunits in a vaccine approach can provide immunogenic protection against infection from a wide range of HCMV viral strains, due to the high degree of homology between strains at the level of pentamer amino acid sequence.

In some embodiments, an antigenic component may correspond to a component of a disease agent or vector or a portion thereof. An antigenic component may, for example, lack a transmembrane domain for ease of manufacture. Suitably, in the HCMV pentamer, for example, the immunogenic component of an HCMV pentamer comprises a gH subunit with a truncated transmembrane domain (having been truncated by deletion of one or more amino acids from this region) such that the subunit is secreted into the cell supernatant, during protein production in host cells, for ease of purification.

In one embodiment, the gH/gL/pUL128/pUL130/pUL131A subunits have the amino acid sequences set out in SEQ ID NOs: 28, 31, 35, 33, 36, respectively (or functional equivalents thereof) (with or without the signal peptide indicated). By functional equivalents is meant amino acid sequences that share some homology and differ only in some amino acids but retain the functional property e.g. of being able to form an antigenic subunit or pentamer that provides protective antibodies. In some embodiments, a functional equivalent may share 70%, 80%, 90% homology, or more, with the relevant amino acid sequence. In another embodiment, the gH/gL/pUL128/pUL130/pUL131A subunits are encoded by nucleic acid sequences such as those set out in SEQ ID NOs: 13, 16, 20, 18, 21, or codon optimised versions thereof (with or without the encoding sequence for the signal peptide). In some embodiments any one of the gH/gL/pUL128/pUL130/pUL131A subunits may have a signal peptide, for example that signal peptide present on the native protein for that strain, a functional equivalent of the signal peptide, or a signal peptide derived from a different strain of HCMV. In some embodiments any one of the gH/gL/pUL128/pUL130/pUL131A subunits may have a signal peptide derived from a heterologous protein. The choice of signal peptide may be determined in order to target the expressed protein to a particular cellular (or extracellular) location, or to confer other functionality. Following expression of the subunit(s), the signal peptide may be enzymatically cleaved (e.g. by a signal peptidase), either by native cellular machinery in the expression system used, or in vitro. In some embodiments, any one of the gH/gL/pUL128/pUL130/pUL131A subunits may be expressed without a signal peptide. In some embodiments, the native sequences, including introns, may be used where these may result in higher expression levels. Suitably, the native nucleic acid sequence for UL128 includes 2 introns. In another embodiment, the nucleic acid sequence for UL131A includes one intron. In some embodiments, the introns may be removed. In some embodiments, the native sequences may be codon-optimised for the relevant expression system.

In one embodiment of any aspect of the invention the protein component or antigenic component is an immunogenic component of a RSV virus, such as the attachment glycoprotein (G protein) or fusion glycoprotein (F protein), both of which control the initial phase of infection. G is a highly glycosylated 90 kDa type II integral membrane protein, and can mediate viral attachment to the host cell membrane either through interaction with heparan sulphate on proteoglycans, and is a good candidate for a protein component.

The F protein is an integral membrane protein composed of three $F_0$ monomers that are processed during assembly into $F_1$ and $F_2$ subunits, which are covalently linked by two disulphide bonds. The F protein is highly conserved amongst RSV isolates from both A and B subgroups and the amino acid sequences show 90% or above identity. F is a 574 amino acid class I fusion protein consisting of a 50 kilodalton (kDa) carboxy-terminal F1 fragment and a 20 kDa amino-terminal F2 fragment; making it a trimer of heterodimers. It is distinguished by two furin cleavage sites that liberate a 27 amino acid glycopeptide and expose the hydrophobic fusion peptide at the F1 amino terminus. There are two N-linked glycosylation sites in F2 and only one in F1. After removal of the 25 amino acid signal peptide and the 27 amino acid glycopeptide between F2 and F1, the remaining ectodomain of F consists of 472 amino acids. Only 25 amino acids in the F ectodomain differ between subtypes A and B.

In order to develop an antigenic composition from RSV-F protein, some studies have focussed upon making variants of the pre-fusion protein, which is a trimer. Variants have been produced by genetically fusing the two subunits of mature pre-F into a single chain. DS-Cav1 variants with F2 fused genetically to F1 and both fusion peptide and pep27 region deletions have been made. Differences in the linker between F2 and F1 subunits appeared to affect immunogenicity, and therefore variants may use a selection of different linkers. The native RSV-F protein sequence may be found at Accession number P03420.1.

Several versions of pre-fusion F proteins have been researched and developed, and consequently published. These pre-fusion trimers may all be suitable for use in the present invention. The DS-Cav1-stabilized fusion glycoprotein is derived from the native protein. EP2222710, incorporated here by reference, also discloses recombinant RSV antigen comprising a soluble F protein polypeptide comprising an F2 domain and an F1 domain of an RSV-F protein polypeptide and a trimerisation domain. In Nat. Commun. 2015; 6: 8143, Krarup et al, a highly stable pre-fusion RSV-F protein is described, again incorporated by reference.

WO2014/160463, herein incorporated by reference, describes isolated recombinant RSV-F proteins that are stabilised in a pre-fusion conformation, as well as nucleic acid molecules encoding the recombinant RSV-F proteins.

WO2017/172890, herein incorporated by reference, describes substitution-modified pre-fusion RSV-F proteins, and nucleic acids coding therefor. Further description is given in Nat Struct Mol Biol. 2016 September; 23(9): 811-820, Iterative structure-based improvement of a respiratory syncytial virus fusion glycoprotein vaccine, M. Gordon Joyce, Baoshan Zhang, Li Ou, Man Chen, Gwo-Yu Chuang, Aliaksandr Druz, Wing-Pui Kong, Yen-Ting Lai, Emily J. Rundlet, Yaroslav Tsybovsky, Yongping Yang, Ivelin S. Georgiev, Miklos Guttman, Christopher R. Lees, Marie Pancera, Mallika Sastry, Cinque Soto, Guillaume B. E. Stewart-Jones, Paul V. Thomas, Joseph G. Van Galen, Ulrich Baxa, Kelly K. Lee, John R. Mascola, Barney S. Graham, and Peter D. Kwong, also incorporated herein by reference.

Exemplary nucleic acid sequences encoding recombinant $F_2$-$F_1$ ectodomain protomers linked to a T4 Fibritin trimerization domain are available as Accession Numbers: LP884611.1, LP884610.1, LP884609.1 and LP884608.1.

In some embodiments, a protein or antigenic component may correspond to a component of a disease agent or vector or a portion thereof. An antigenic component may, for example, lack a transmembrane domain for ease of manufacture. Suitably, in the RSV-F protein or a pre-fusion conformation thereof, for example, the immunogenic component of an F protein comprises a $F_2$-$F_1$ subunit with a truncated transmembrane domain (having been truncated by deletion of one or more amino acids from this region) such that the subunit is secreted into the cell supernatant, during protein production in host cells, for ease of purification. Therefore, the RSV-F protein lacks a functional TM domain. Alternatively, the genetic fusion with the first peptide tag may indeed prevent the F protein from residing in the membrane despite the presence of a functional transmembrane domain.

In one embodiment, the pre-fusion stabilised subunits have the amino acid sequences set out in SEQ ID NO: 50-58, respectively (or functional equivalents thereof). By functional equivalents is meant amino acid sequences that share some homology and differ only in some amino acids but retain the functional property e.g. of being able to form an antigenic subunit that provides protective antibodies. In some embodiments, a functional equivalent may share 70%, 80%, 90% homology, or more, with the relevant amino acid sequence. In one embodiment, the pre-fusion stabilised RSV-F trimer may not include a heterologous trimerisation domain.

The protein component comprises a first peptide tag. This first peptide tag may be attached to the protein component by expressing a recombinant fusion protein. Those skilled in the art will be aware of techniques for the genetic fusion of peptide sequences in order to express the recombinant protein in suitable cell systems. For moieties that include post-translational modifications such as glycosylation it is preferable to express the recombinant protein in a eukaryotic or mammalian cell line.

Advantageously using a first peptide tag and a second peptide tag which form an isopeptide bond, such as the SpyTag-SpyCatcher system as described herein, allows "decoration" of the large and/or multimeric antigen, such as the HCMV pentamer, or immunogenic component thereof, onto the moiety which displays said large antigen, such as a VLP, in the correct formation and orientation such that the antigen is presented to the immune system in such a way as to be able to generate anti-antigen (e.g. anti-HCMV) antibodies which can provide a protective/neutralising/immunogenic effect. Traditional approaches of vaccination that use a soluble antigen (even a large antigen such as a multimer/pentamer) may be less effective in producing a protective/neutralising/immunogenic effect. Advantageously, display of an antigen (e.g. a multimeric antigen) on a particle, such as a VLP or nanoparticle, results in the presentation of a geometric repetitive array of identical antigens that, in contrast to soluble antigens, are capable of robustly triggering an immune response. The larger size of VLPs or other suitable particles compared to 'free' antigens may also have a greater immunogenic effect. In addition, the orientation of display of a multimeric antigen, e.g. the HCMV pentamer, may be important to immunogenicity. The use of paired tags, such as the SpyTag-SpyCatcher system as described herein, to attach a multimeric antigen onto a particle permits the antigen to be attached to the particle in a particular advantageous orientation. For example in the case of HCMV, the gH/gL subunits may be less likely to have neutralising epitopes than the "UL" subunits. Thus, advantageously, the present invention permits the orientation of display of the HCMV pentamer on a particle to be determined by suitable positioning of the first peptide tag, such that, for example, the "UL" subunits are displayed towards the outside of the particle and therefore are more easily available to the immune system of an individual. Alternatively/additionally, the positioning of the first peptide tag on the antigen may be determined in order to produce a similar orientation of the antigen to that on the native virus, thereby presenting to the immune system a particle displaying an antigen in an orientation more likely to induce an immune response to an invading live virus.

In contrast, traditional approaches for presenting a protein onto a VLP may involve chemical linkage which has the disadvantages that such a chemical reaction may be more random, such that the correct (e.g. immunologically preferred) orientation of the antigen could not be obtained with certainty and may only represent a small proportion of the linkage reactions obtained. Moreover, the processes involved in a chemical conjugation may make it unlikely that the 3-D structure required for suitable antigen presentation could be maintained. Some disadvantages of traditional approaches are described, for example, in Brune et al.

2016; Scientific Reports, 6:19234, DOI: 10.1038/srep19234, Brune et al. Bioconjugate Chemistry, 2017, 28, 1544-1551, and Leneghan et al (2017) Scientific reports, 7:3811.

Similarly, genetic fusion of an antigen to a viral coat protein has proved challenging and time-consuming because of problems with misfolding and in determining expression conditions optimal for both of the two components. Moreover a genetic fusion would not be appropriate for expression of a large antigen or a multi-component antigen as effective expression in correct conformation would be too difficult to achieve.

In order to present the protein or antigenic component in such a way that it is immunogenic, the position of the first peptide tag needs to be carefully designed such that the native protein conformation is maintained, and optionally any post-translational modifications are retained, if appropriate. For some antigens, the retention of glycosylation does not affect the way the epitopes are presented, but for others either maintaining or removing them improves efficacy. For protein components that are transmembrane proteins, the transmembrane section of the protein component provides a good target for positioning the first peptide tag, since this sequence is not involved with the conformation of the protein component that is antigenic, and provides a role that will no longer be required in a vaccine, for example. If the protein component does not include a transmembrane protein, fusing the first peptide tag to a C- or N-terminus of the component or a subunit thereof (in the case of a multimer) may prove helpful, but the first peptide tag can also be included in any part of the sequence. Alternatively, it may be possible to locate the first peptide tag in a loop on the protein or antigenic component.

In order to present an immunogenic component, such as an immunogenic component of an HCMV pentamer, the position of the first peptide tag needs to be carefully designed such that the native protein conformation is maintained. For HCMV, in one embodiment, attachment is via the gH subunit, suitably via the C-terminus of the gH subunit, or transmembrane domain (or portion thereof) of the gH subunit. In addition to maintaining the conformation of the pentamer (or component of the pentamer), this rational design also presents the target region of the pentamer towards the outside of the particle as discussed above. As used herein, the target region is the part of the protein known to raise antibodies with a neutralising effect, and may also be referred to as the immunogenic portion.

In order to present an immunogenic component, such as an immunogenic component of an RSV pre-fusion F protein, the position of the first peptide tag needs to be carefully designed such that the native protein conformation is maintained. For RSV-F pre-fusion protein, in one embodiment, attachment suitably via the C-terminus of the F pre-fusion, via the 3' end of the nucleic acid encoding the same. In addition to maintaining the conformation of the pre-fusion F protein (or component thereof), this rational design also presents the most neutralising epitopes of the pre-fusion F protein towards the outside of the particle as discussed above. The same considerations will apply for any other variation of the F protein. Inclusion of the first peptide tag at the C-terminus has been demonstrated to work by the present inventors, leaving an immunogenic protein component to fold correctly.

In one embodiment the first and second peptide tags are part of a peptide tag/binding partner pair capable of forming an isopeptide bond. This isopeptide bond may be spontaneous, i.e. without assistance, or require assistance, i.e. from a ligase or other helper. Suitably, the first and second peptide tag are a SpyTag/SpyCatcher pair. Suitably, the first and second peptide tag are selected from the list comprising SpyTag/SpyCatcher, SnoopTag/SnoopTapJr and SnoopCatcher; RrgATag/RrgATag2/DogTag and RrgACatcher; IsopepTag/IsopepTag-N and Pilin-C or Pilin-N, PsCsTag and PsCsCatcher; and SnoopTapJr and DogTag (mediated by SnoopLigase), and variants, derivatives and modifications of all these systems.

Suitably, the first peptide tag is the peptide tag from a peptide tag/binding partner pair, such as SpyTag, and the second peptide tag is the binding partner, such as SpyCatcher. In another embodiment, the first peptide tag is the binding partner, such as SpyCatcher, and the second peptide tag is the peptide tag component from the peptide tag/binding partner pair, such as SpyTag.

Suitably, the first peptide tag is the peptide tag from a peptide tag/binding partner pair, such as SnoopTag, and the second peptide tag is the binding partner, such as SnoopCatcher. In another embodiment, the first peptide tag is the binding partner, such as SnoopCatcher, and the second peptide tag is the peptide tag component from the peptide tag/binding partner pair, such as SnoopTag. Thus, it can be seen that the first peptide tag can be either the "tag" or "catcher"; with the second peptide tag being the partner for this pair, the "catcher" or the "tag", respectively. Suitable peptide tag/binding partner pairs are described in detail in WO2011/09877, WO2016/193746, WO2018/18951 and WO2018/197854, herein incorporated by reference.

In one embodiment, the protein or antigenic component is attached to any one of SpyTag, SnoopTag, RrgATag, RrgATag2, DogTag, IsopepTag, IsopepTag-N, PsCsTag and SnoopTapJr as a first peptide tag.

The first peptide tag may be attached via a linker, if required, which may be rigid or flexible. Those skilled in the art will appreciate which linker would be appropriate.

In another embodiment, the moiety is attached to any one of SpyCatcher, SnoopCatcher, RrgACatcher, Pilin-C, Pilin-N, PsCsCatcher and DogTag (mediated by SnoopLigase) as a second peptide tag.

The moiety may be any suitable moiety, as discussed previously, including synthetic multimerisation platforms.

The second peptide tag may be attached to any suitable position in the moiety, which does not affect its ability to fold and form an appropriate conformation. Genetic fusion may be preferred. It may be preferable to include the second peptide tag at the C- or N-terminus of the moiety but the second peptide tag can also be included in any part of the sequence. Alternatively, it may be possible to locate the second peptide tag in a loop on the moiety. For example, genetically fused SpyCatcher to the N-terminus of the viral coat protein (CP3) of the RNA bacteriophage AP205 is described in Brune et al, Scientific Reports volume 6, Article number: 19234 (2016). Alternative fusions using self-assembling synthetic proteins as multimerisation platforms are discussed in Bruun et al, ACS Nano, 2018, 12 (9), pp 8855-8866. The second peptide tag may alternatively be attached via chemical conjugation.

The second peptide tag may be attached via a linker, if required, which may be rigid or flexible. Those skilled in the art will appreciate which linker would be appropriate.

In one embodiment, the antigenic component, such as the HCMV pentamer or immunogenic component thereof, is attached to SpyTag. A suitable SpyTag has the amino acid sequence set out in SEQ ID NO: 30.

The SpyTag may be attached via a linker. Suitable linkers include the linker having the amino acid sequence set out in SEQ ID NO: 29.

In another embodiment, the moiety is attached to a SpyCatcher binding partner (second peptide tag). The moiety may suitably be HBsAg. A suitable SpyCatcher has the amino acid sequence set out in SEQ ID NO: 38. In one embodiment, SpyCatcher is attached via a linker. The linker may be a rigid linker or a flexible linker, suitably wherein the linker has the amino acid sequence set out in SEQ ID NO: 39.

In another embodiment, the protein composition or antigenic composition in accordance with any aspect or embodiment of the invention further comprises another, preferably different, protein comprising a first peptide tag.

In another embodiment, the composition in accordance with any aspect or embodiment of the invention further comprises another, preferably different, antigen comprising a first peptide tag, such as another HCMV antigen. Suitably the other HCMV antigen is glycoprotein B. Suitably glycoprotein B sequences are described, for example, in WO2014/005959, see SEQ ID NOs: 21, 22, 23 or 36. In one embodiment, the composition comprises particles (e.g. VLPs) displaying both the HCMV pentamer and the other HCMV antigen.

In one embodiment, the composition is an immunogenic composition or vaccine composition. Preferably said immunogenic or vaccine composition is one which is capable of inducing an immune response, such as an antibody response, upon administration to an individual. Suitably the immune response may be a protective immune response. A suitable immunogenic composition may further comprise additional components including adjuvants, immunostimulants and/or pharmaceutically acceptable excipients.

Suitable adjuvants, for example, may be based on aluminium, peptides, squalene, liposomes, oil-in-water emulsions and saponin, and may include Alhydrogel®, MF59, AS01, MatrixM, muramyl dipeptide and Quil A. Water-in-oil adjuvants are also suitable. Squalene-Oil-in-water emulsions, such as Addavax™, are suitable.

Accordingly, in another aspect or embodiment of the invention there is provided an immunogenic or vaccine composition comprising a composition in accordance with the invention. Suitably, a vaccine composition comprises a vaccine dose which is an amount of composition in accordance with the invention which provides an immunogenic, preferably immunoprotective effect from an infective agent/vector, such as a neutralising effect from HCMV infection. Suitably, a vaccine composition comprises a vaccine dose which is an amount of composition in accordance with the invention which provides a neutralising effect from an infective agent/vector, such as a neutralising effect from RSV infection. Antibodies, preferably neutralising antibodies generated to an immunogenic composition may be detected and measured by methods familiar to those skilled in the art, including standardised ELISA assays or microneutralisation assays, as described herein, for example.

In another aspect there is provided a VLP comprising:
i) a moiety comprising a first peptide tag
ii) a protein comprising a second peptide tag
wherein said first peptide tag and said second peptide tag form an isopeptide bond. In some embodiments, the moiety is HBsAg. However, any suitable moiety may be used, as described previously.

Suitably, the first peptide tag is the peptide tag from a peptide tag/binding partner pair, such as SpyTag, and the second peptide tag is the binding partner, such as SpyCatcher. In another embodiment, the first peptide tag is the binding partner, such as SpyCatcher, and the second peptide tag is the peptide tag from the peptide tag/binding partner pair, such as SpyTag. Other suitable peptide tag/binding partner pairs are described herein and will be known to those skilled in the art. Suitably, the first and second peptide tag are selected from the list comprising SpyTag/SpyCatcher, SnoopTag/SnoopTagJr and SnoopCatcher; RrgATag/RrgATag2/DogTag and RrgACatcher, IsopepTag/IsopepTag-N and Pilin-C or Pilin-N, PsCsTag and PsCsCatcher; and SnoopTapJr and DogTag (mediated by SnoopLigase), and variants, derivatives and modifications of all these systems.

Suitably the protein comprising the second peptide tag is a protein or peptide complex which is greater than 50 kDa. The protein comprising the second peptide tag may be a protein or peptide complex which is greater than 50 kDa, 60 kDa, 70 kDa, 80 kDa, 90 kDa, 100 kDa, 110 kDa, 120 kDa, 130 kDa, 140 kDa, 150 kDa or 160 kDa, 170 kDa, 180 kDa, 190 kDa or more, such as over 200 kDa, over 300 kDa or over 400 kDa.

In one embodiment, the protein comprising the second peptide tag is a multimeric protein. In one embodiment, the protein comprising the second peptide tag is an antigen, preferably a multimeric antigen. Suitably, the multimeric antigen may be HCMV pentamer as described herein. Suitably, the protein may be an RSV-F protein or derivative thereof (such as the pre-fusion F protein). In one embodiment, the protein comprising a second peptide tag is an immunogenic component of HCMV pentamer. The HCMV pentamer (gH/gL/pUL128/pUL130/pUL131) as described herein and including suitable linkers and tags has a molecular weight of over 160 kDa. Other suitable large or multimeric proteins or antigens include antigens from other infectious agents including viruses such as influenza virus, RSV and so forth.

Advantageously, using HBsAg as a carrier (VLP) in this way would also be likely to generate an anti-HepB boost, alternatively described as a an anti-Hepatitis B virus (HBV) response In another aspect there is provided a VLP comprising:
i) a protein comprising a first peptide tag
ii) a moiety comprising a second peptide tag
wherein said first peptide tag and said second peptide tag form an isopeptide bond. In some embodiments, the moiety is HBsAg. However, any suitable moiety may be used, as described previously.

Suitably, the first peptide tag is the peptide tag from a peptide tag/binding partner pair, such as SpyTag, and the second peptide tag is the binding partner, such as a SpyCatcher. In another embodiment, the first peptide tag is the binding partner, such as a SpyCatcher, and the second peptide tag is the peptide tag from the peptide tag/binding partner pair, such as SpyTag. Other suitable peptide tag/binding partner pairs are described herein and will be known to those skilled in the art. Suitably, the first and second peptide tag are selected from the list comprising SpyTag/SpyCatcher, SnoopTag/SnoopTagJr and SnoopCatcher; RrgATag/RrgATag2/DogTag and RrgACatcher, IsopepTag/IsopepTag-N and Pilin-C or Pilin-N, PsCsTag and PsCsCatcher; and SnoopTapJr and DogTag (mediated by SnoopLigase), and variants, derivatives and modifications of all these systems.

Suitably the protein comprising the first peptide tag is a protein or peptide complex which is greater than 50 kDa. The protein comprising the first peptide tag may be a protein or peptide complex which is greater than 50 kDa, 60 kDa, 70 kDa, 80 kDa, 90 kDa, 100 kDa, 110 kDa, 120 kDa, 130 kDa, 140 kDa, 150 kDa or 160 kDa or more, notably 200 kDa, 300 kDa or even 400 kDa or more. In one embodiment, the protein comprising the first peptide tag is a multimeric protein. In one embodiment, the protein comprising the second peptide tag is an antigen, preferably a multimeric antigen. Suitably, the multimeric antigen may be HCMV pentamer as described herein. Suitably, the protein may be an RSV-F protein or derivative thereof (such as the pre-fusion F protein). In one embodiment, the protein comprising a first peptide tag is an immunogenic component of HCMV pentamer. The HCMV pentamer (gH/gL/pUL128/pUL130/pUL131A) as described herein and including suitable linkers and tags has a molecular weight of over 160 kDa. Other suitable large or multimeric proteins or antigens include antigens from other infectious agents including viruses such as influenza virus, RSV and so forth.

Advantageously, using HBsAg as a carrier (VLP) in this way would also be likely to generate an anti-HBV boost.

In another aspect of the invention, there is provided an HCMV pentamer linked to a SpyTag, as described herein.

In accordance with another aspect of the invention there is provided a method of producing a composition or VLP in accordance with the invention, said method comprising:
  introducing a first nucleic acid which encodes a first genetic fusion of a first protein to a first peptide tag into a first host cell;
  incubating said first host cell under conditions for expressing said first genetic fusion; optionally purifying the expressed components;
  introducing a second nucleic acid which encodes a second genetic fusion of a second protein to a second peptide tag into a second host cell;
  incubating said second host cell under conditions for expressing said second genetic fusion; optionally purifying the expressed components;
  incubating the expressed components under conditions for formation of an isopeptide bond between the first peptide tag and the second peptide tag; optionally purifying the resultant composition.

Suitably, the expressed components are incubated together in order for the isopeptide bond to form. The formation of the isopeptide bond may require co-incubation with a ligase or similar.

Suitably, the method of producing a composition or VLP in accordance with the invention may be for producing a composition comprising an antigenic component displayed on a VLP.

In some embodiments, where the "immunogenic component of the HCMV pentamer" comprises the entire HCMV pentamer, recombinant production of the components of the HCMV pentamer requires each subunit to be expressed in the right stoichiometry for the pentamer to be formed, as well as to fold correctly for assembly. In these embodiments, complexes of just parts of the required pentamer (e.g. gH/gL dimers and tetramers, or tetramers lacking any one of the five subunits) need to be excluded from the final product. Advantageously, the present invention overcomes the problems that would otherwise be associated by expressing all of the vaccine components in one system (i.e. HBsAg and 5 subunits of HCMV pentamer) by providing a simple approach of making the components separately and then conjugating them. Accordingly, in one embodiment, a purification tag is incorporated onto UL130 (Hofmann et al, DOI 10.1002/bit 25670). Similar principles would be applicable to other immunogenic components.

In some embodiments, where the "immunogenic component of the RSV-F protein" comprises the entire F protein or a derivative thereof, recombinant production of the components of the F protein or derivative thereof requires it to fold correctly for assembly, with derivatives including the pre-fusion F protein trimer.

Suitably, the method is for producing a composition comprising an HCMV pentamer displayed on an HBsAg VLP. Suitably, the method is for producing a composition comprising an RSV-F pre-fusion F protein trimer displayed on an HBsAg VLP.

In another aspect of the invention there is provided a vaccine for use in the prophylaxis and/or treatment of a disease. Suitably, said vaccine comprises a composition or VLP in accordance with any aspect or embodiment of the invention. In one embodiment, the disease is HCMV infection. In another aspect there is provided a prophylactic method of treatment for HCMV. Suitably, the vaccine is for use in humans. Suitably the vaccine is for use in adult humans, for example women of reproductive age or pregnant women. In another aspect, the invention provides a method of inducing an immunogenic response, for example a protective immune response, for HCMV in an individual wherein the method comprises administering a composition in accordance with any aspect or embodiment of the invention.

In another aspect of the invention there is provided a composition in accordance with any aspect of the invention for use as a medicament.

In a further aspect of the invention there is provided a composition in accordance with any aspect of the invention for use as a vaccine, preferably a vaccine for use in prophylaxis and/or treatment of HCMV infection. A composition for use as a medicament or a vaccine in accordance with the invention may be administered to human adults, for example women of reproductive age or pregnant women.

In another aspect, the invention provides nucleic acid molecules for use in a method in accordance with the invention. In one embodiment, a nucleic acid molecule in accordance with the invention comprises a nucleic acid sequence encoding an amino acid sequence as set out in any of SEQ ID NOs: 27 to 41. In one embodiment, a nucleic acid molecule in accordance with the invention comprises a nucleic acid sequence as set out in any of SEQ ID NOs: 12 to 26 or 42 to 46.

In another aspect, the invention provides a plurality of nucleic acid molecules comprising those nucleic acid molecules encoding an amino acid sequence as set out in SEQ ID NOs: 27 to 41. In one embodiment, the nucleic acid molecules of the invention include those having a sequence as set out in any of SEQ ID NOS: 12 to 26 or 42 to 46.

In another aspect, the invention provides nucleic acid molecules for use in a method in accordance with the invention. In one embodiment, a nucleic acid molecule in accordance with the invention comprises a nucleic acid sequence encoding an amino acid sequence as set out in any of SEQ ID NOs: 50 to 58. In one embodiment, a nucleic acid molecule in accordance with the invention comprises a nucleic acid sequence as set out in any of SEQ ID NOs: 47 to 55.

In another aspect, the invention provides a plurality of nucleic acid molecules comprising those nucleic acid molecules encoding an amino acid sequence as set out in SEQ ID NOs: 50 to 58. In one embodiment, the nucleic acid molecules of the invention include those having a sequence as set out in any of SEQ ID NOS: 47 to 55.

In another aspect, the invention provides a vector comprising a nucleic acid molecule or a plurality of nucleic acid molecules in accordance with the invention. Suitably a vector is an expression vector for expressing the amino acid sequence of any component of a composition in accordance with the invention.

In another aspect, the invention provides host cells for expressing the components of a composition in accordance with the invention. Suitable host cells may be those for transient or stable expression of those components. Methods and host cells for expressing CMV proteins are described, for example, in WO2014/005959 and WO2016/067239, both incorporated by reference. In some embodiments, the components may be glycosylated.

In another aspect of the invention, there is provided a kit comprising a composition in accordance with the invention for use in a prime-boost vaccination regime. Suitably said kit may comprise a prime composition comprising a first immunogenic composition in accordance with the invention and a boost composition comprising a second immunogenic composition in accordance with the invention. Alternatively, the kit may be provided to provide a single or multiple dose vaccination regime, i.e., 1, 2, 3, 4, 5, 6, 7, 8, 9, or 10 doses. Accordingly, in another aspect the invention provides a dosage regime comprising doses applied at approximately 3 week intervals.

FIGURES

FIG. 1. SDS-PAGE and Western blot analysis of purified pentamer-SpyTag under non-reducing and reducing conditions. Lane 1: ColorPlus Prestained Broad Range Protein Ladder, sizes indicated in kDa; Lane 2: non-reduced sample; Lane 3: reduced sample. A) SDS-PAGE and Coomassie staining analysis, with the position of the HCMV pentamer components indicated, non-reduced to the left and reduced to the right of the gel. B) Western blot analysis using anti-HCMV pentamer antibody.

Figure 2:
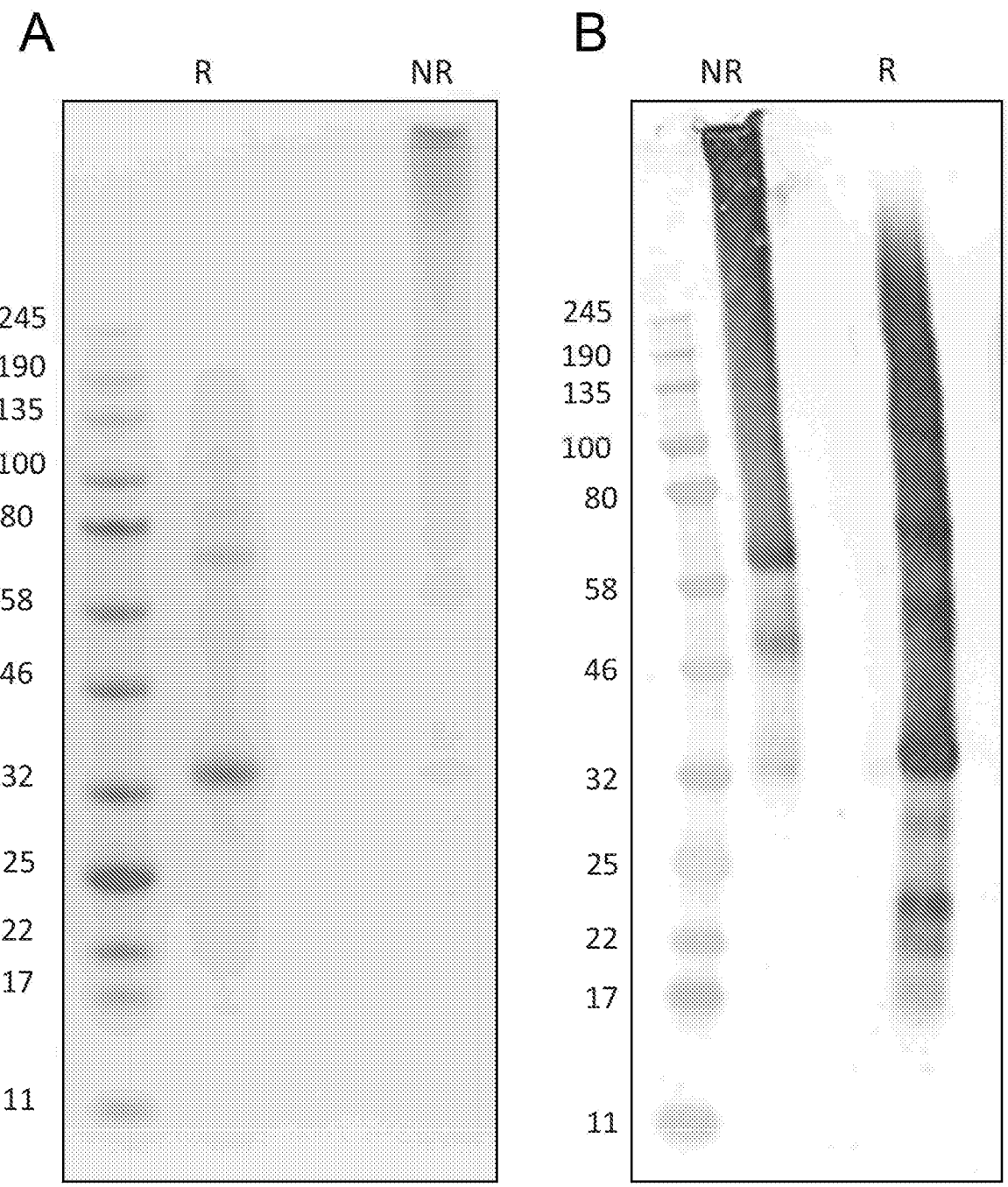

FIG. 2. SDS-PAGE and Western blot analysis of purified SpyCatcher-HBsAg under non-reducing (NR) and reducing conditions (R). A) SDS-PAGE and Coomassie staining analysis. B) Western blot analysis using anti-HBsAg monoclonal antibody.

Figure 3:
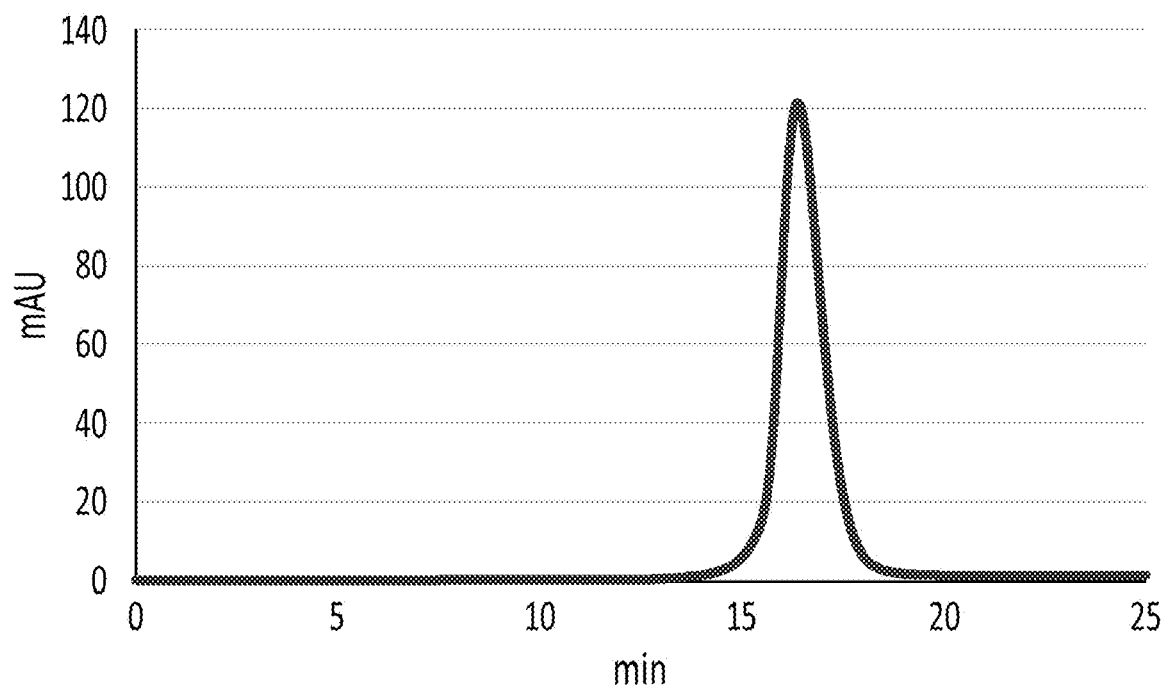
Figure 3:
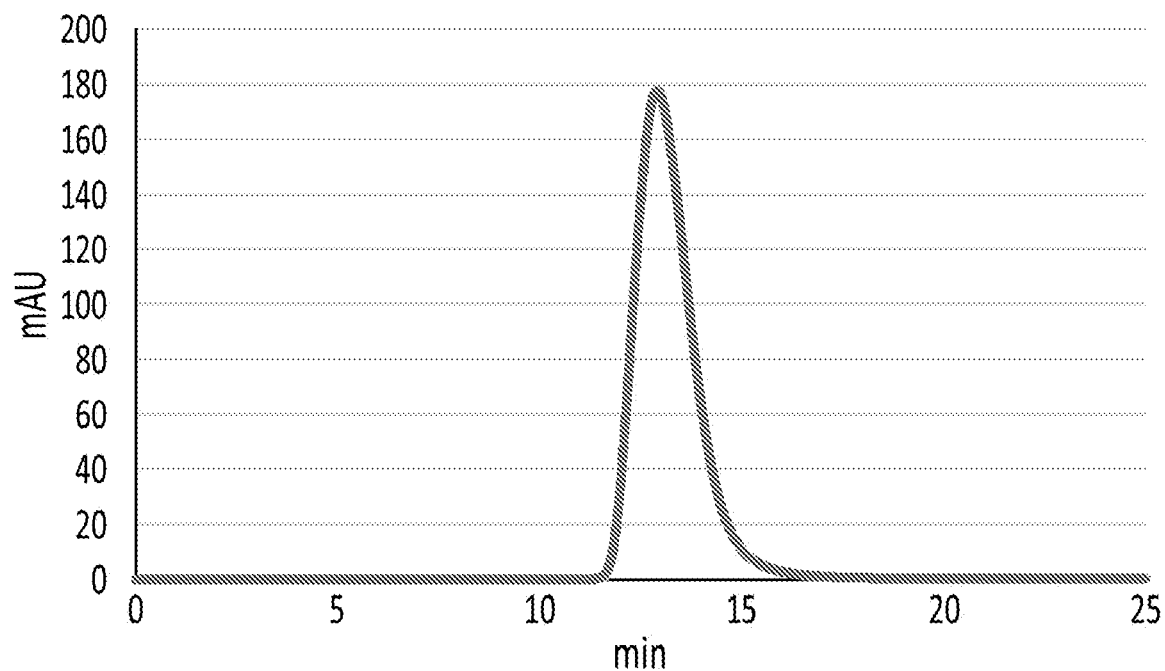

FIG. 3: HPLC analysis using a s200 increase 3.2/300 column. A) 10 µl of purified HCMV pentamer-SpyTag was loaded and eluted as a single peak. B) 10 µl of purified SpyCatcher-HBsAg was loaded and eluted as a single main peak at the void volume of the column.

Figure 4:
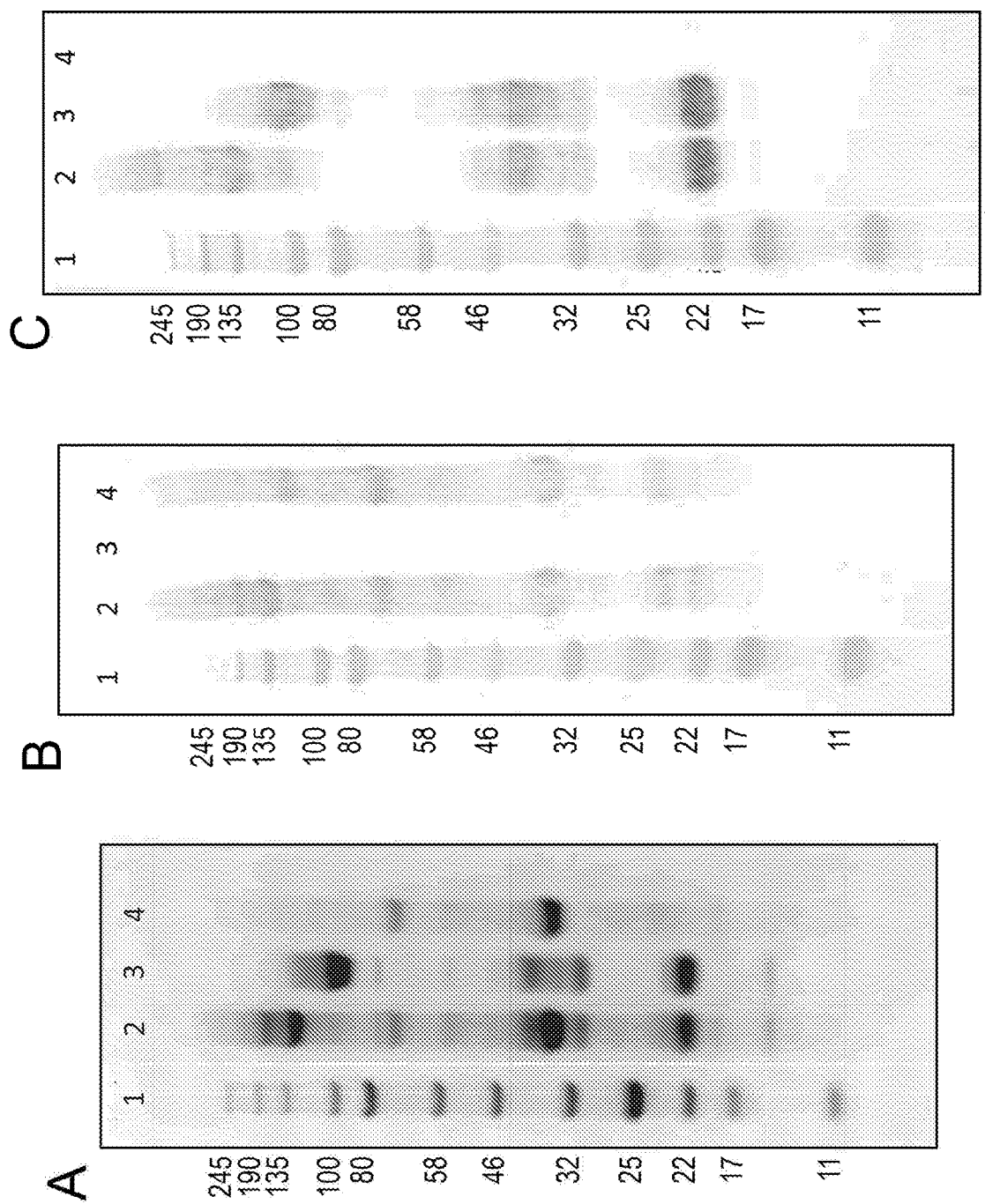

FIG. 4: SDS-PAGE and Western-blot analysis of conjugated pentamer-SpyTag and SpyCatcher-HBsAg under reducing conditions. 1: ColorPlus Prestained Broad Range Protein Ladder, sizes indicated in kDa; 2: conjugation; 3: pentamer-SpyTag; 4: SpyCatcher-HBsAg. A) SDS-PAGE and Coomassie staining analysis. B) Western blot using anti-HBsAg monoclonal antibody. C) Western blot using anti-pentamer polyclonal antibody.

Figure 5:
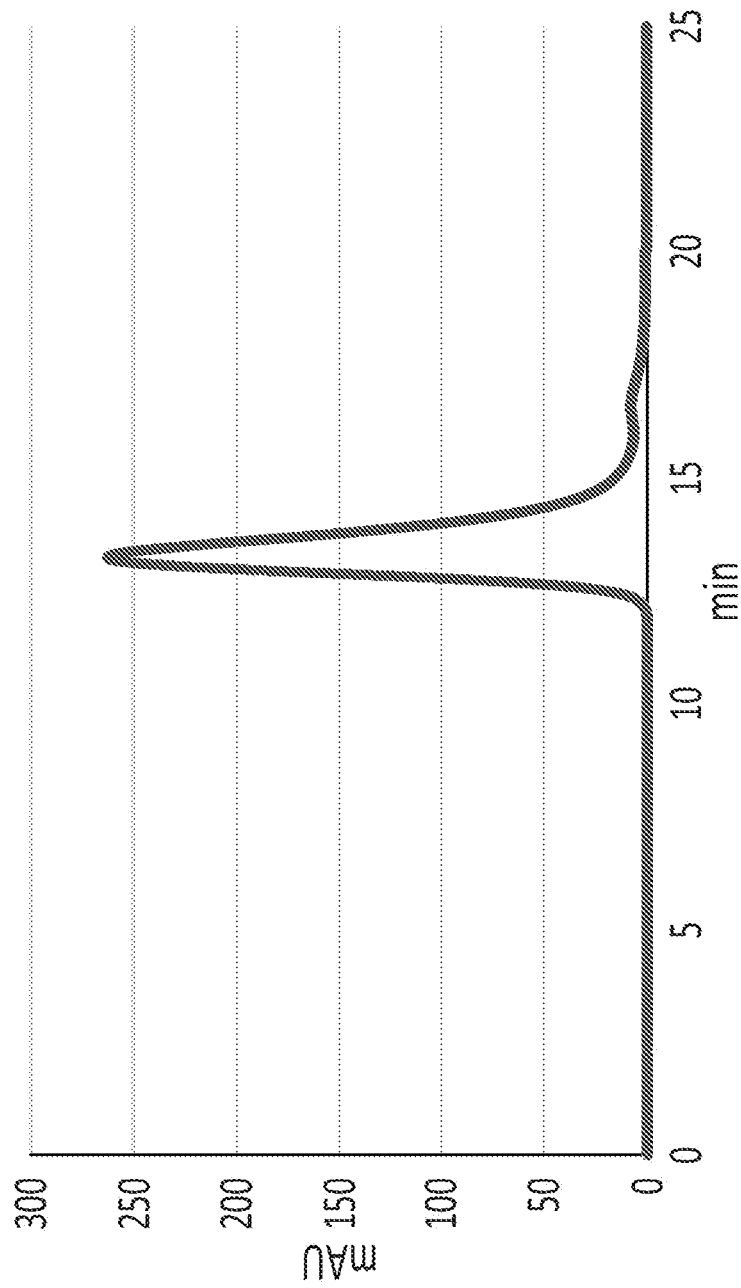

FIG. 5: HPLC analysis using a s200 increase 3.2/300 column. 30 µl of conjugated pentamer-SpyTag-SpyCatcher-HBsAg was loaded and eluted as a main peak at the void volume of the column.

Figure 6:
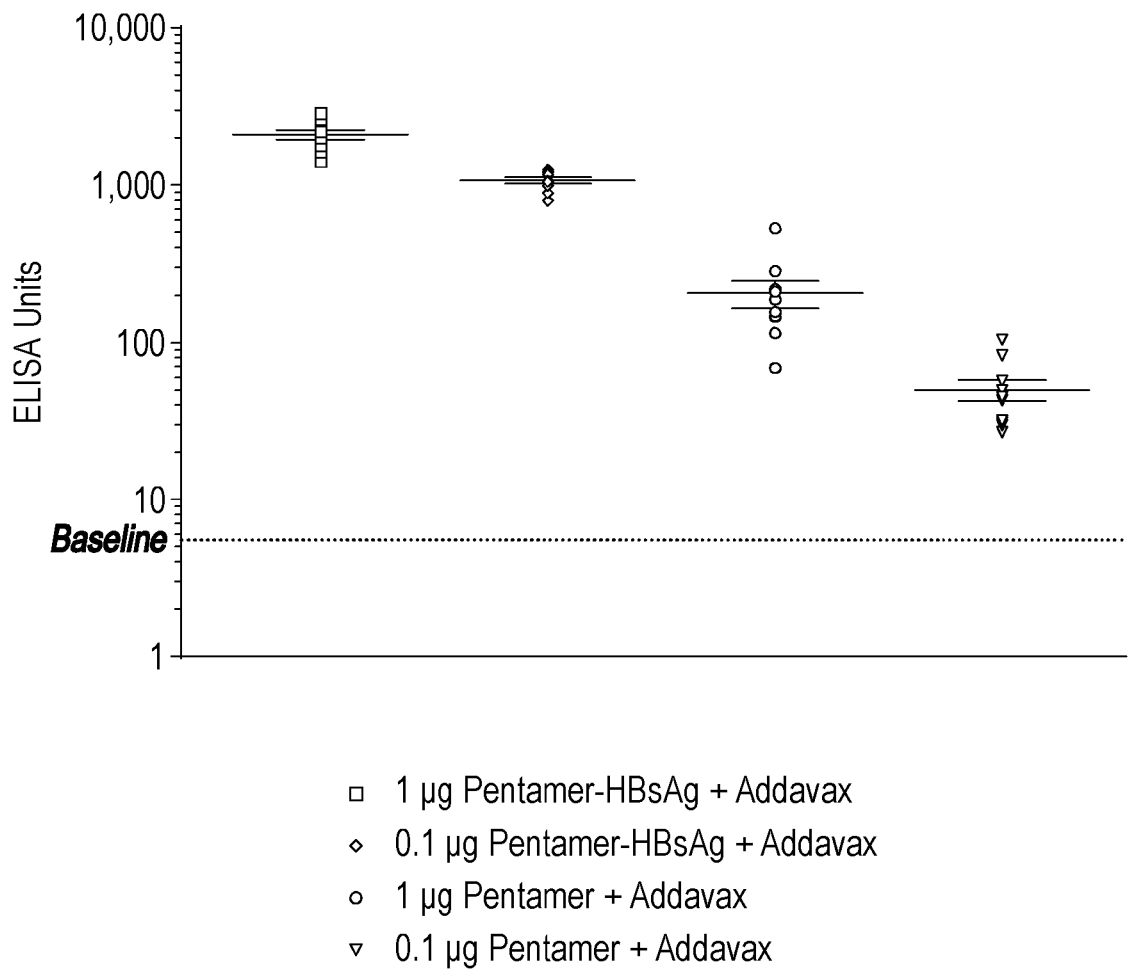

FIG. 6: Immunogenicity of HCMV pentamer-HBsAg vaccine versus pentamer protein vaccine, adjuvanted with Addavax, after a single immunisation. BALB/c mice were immunised with 1 µg or 0.1 µg of HCMV pentamer-SpyTag, either as soluble protein or as a pentamer-HBsAg VLP. Titres were measured by standardised ELISA from mice sera. Lines represent the means, error bars represent the standard deviation (n=10). Mice immunised with HCMV pentamer-HBsAg VLP show substantially stronger serum IgG antibody responses compared to mice immunised with HCMV Pentamer protein alone, even when the pentamer-equivalent VLP dose is 10× lower.

Figure 7:
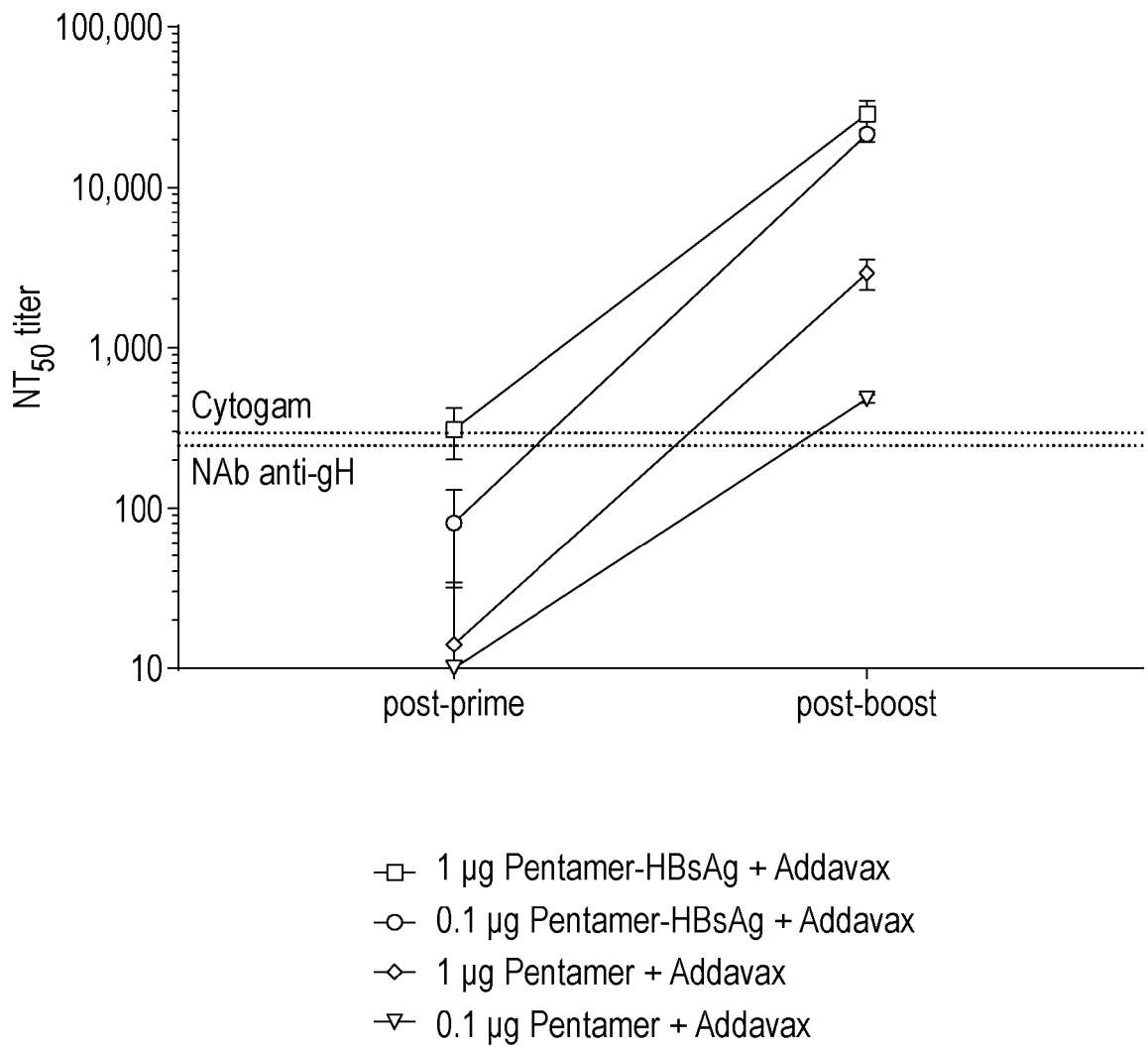

FIG. 7: Neutralising activity in the sera of mice immunised with HCMV pentamer-HBsAg vaccine compared to pentamer protein vaccine. Vaccines were adjuvanted with Addavax, and responses shown after one (post-prime) or two immunisations (post-boost). $NT_{50}$ was measured on ARPE-19 cells infected with AD169$^{wt131}$ strain (displaying a functional pentamer). Neutralising titres for Cytogam and a commercially available neutralising anti-gH mAb (HCMV16 (51C1) from Bio-Rad Antibodies) in the same assay are indicated.

Figure 8:
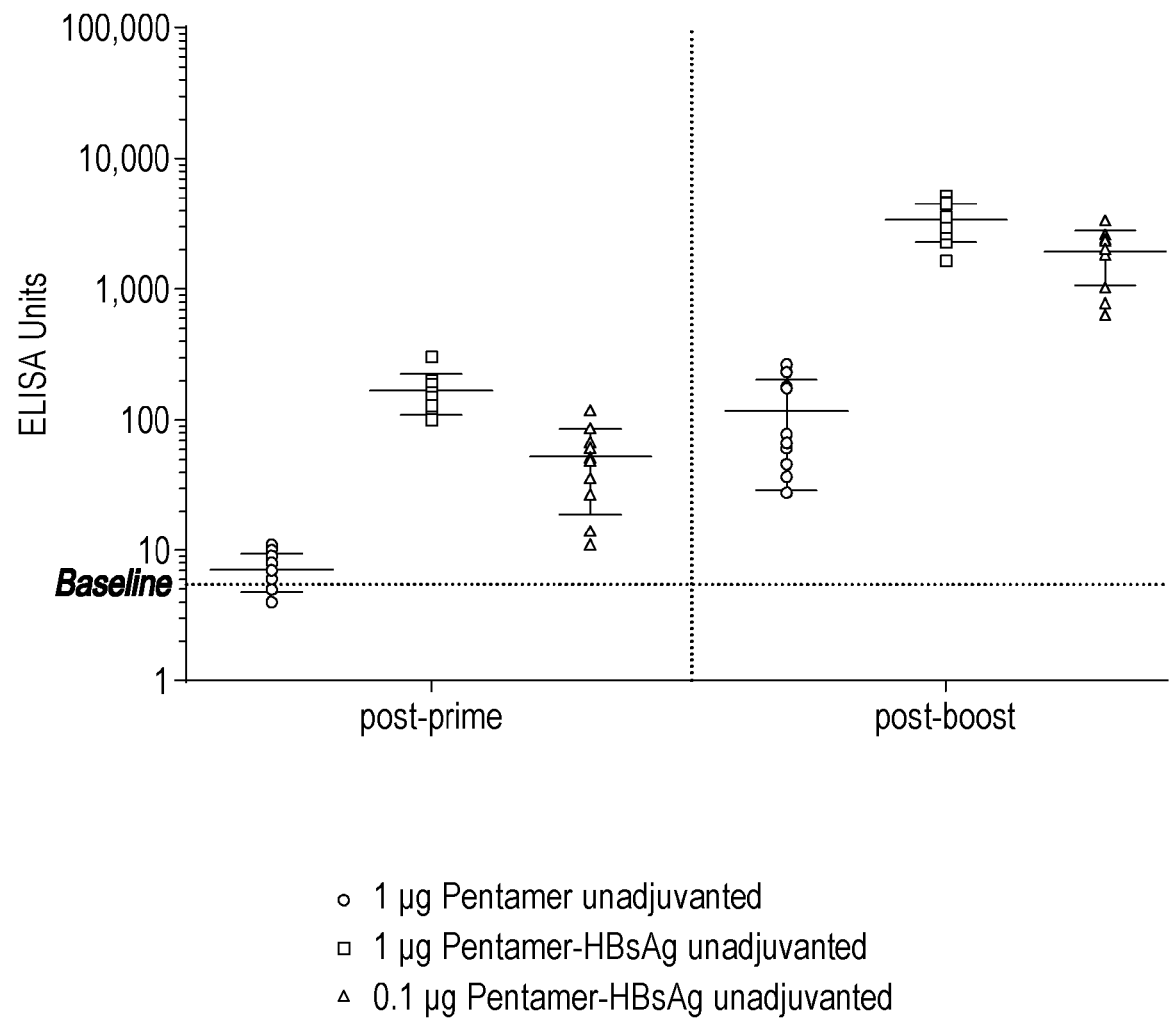

FIG. 8: Immunogenicity of HCMV pentamer-HBsAg vaccine versus pentamer protein vaccine, unadjuvanted, after one or two immunisations. BALB/c mice were immunised with 1 µg or 0.1 µg of HCMV pentamer-SpyTag conjugated to SpyCatcher-HBsAg (Pentamer-HBsAg), or with 1 µg of pentamer-SpyTag protein. Titres were measured by standardised ELISA from mice sera. Lines represent the means, error bars represent the standard deviation (n=10). Mice immunised with HCMV pentamer-HBsAg VLP show substantially stronger serum IgG antibody responses compared to mice immunised with HCMV Pentamer protein alone, even when the pentamer-equivalent VLP dose is 10× lower.

Figure 9:
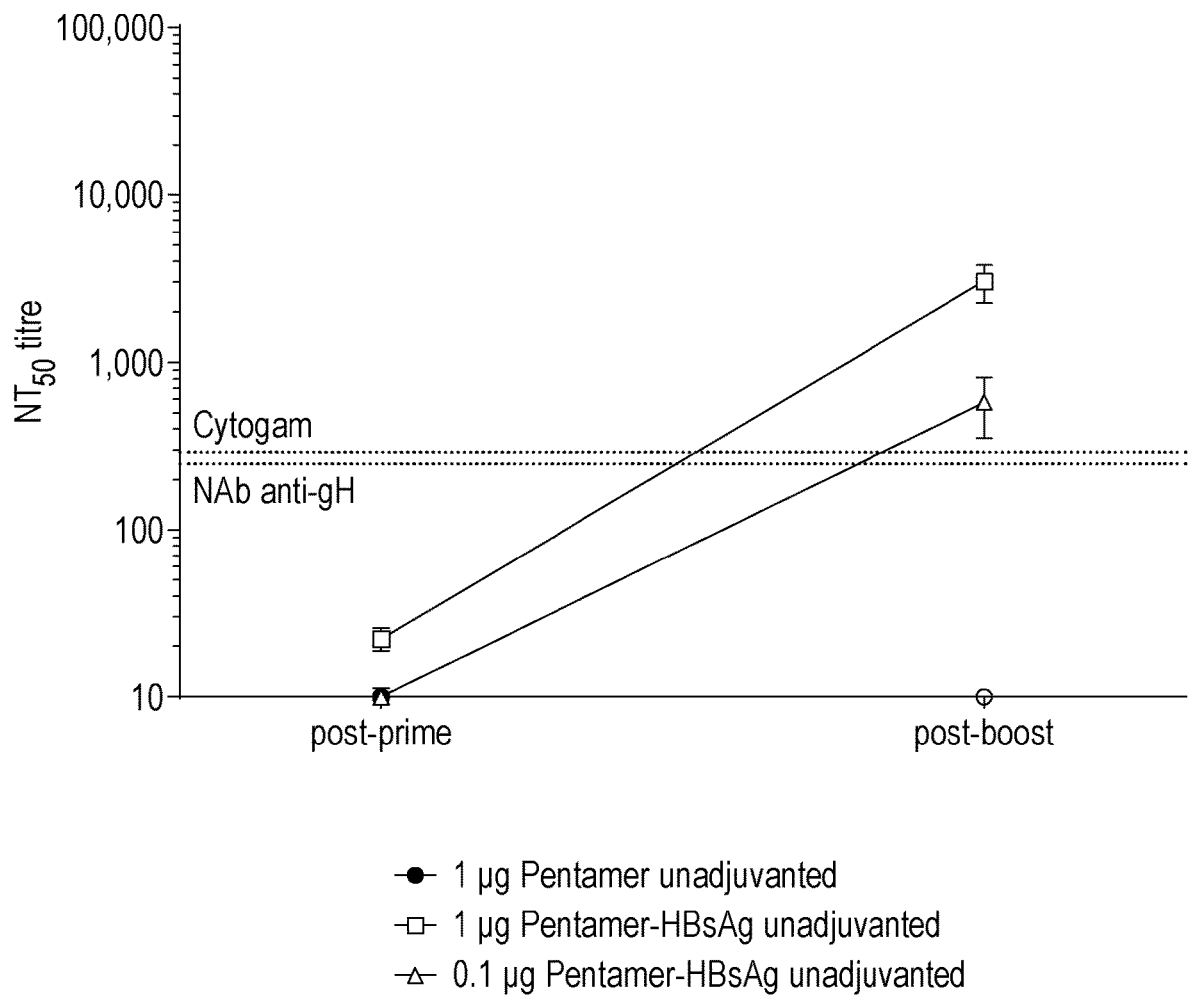

FIG. 9: Neutralising activity in the sera of mice immunised with HCMV pentamer-HBsAg vaccine compared to pentamer protein vaccine. Vaccines were unadjuvanted, and the response shown after one (post-prime) or two immunisations (post-boost). NT50 was measured on ARPE-19 cells infected with AD169$^{wt131}$ strain (displaying a functional pentamer). Neutralising titres for Cytogam and a commercially available neutralising anti-gH mAb (HCMV16 (51C1) from Bio-Rad Antibodies) in the same assay are indicated.

Figure 10:
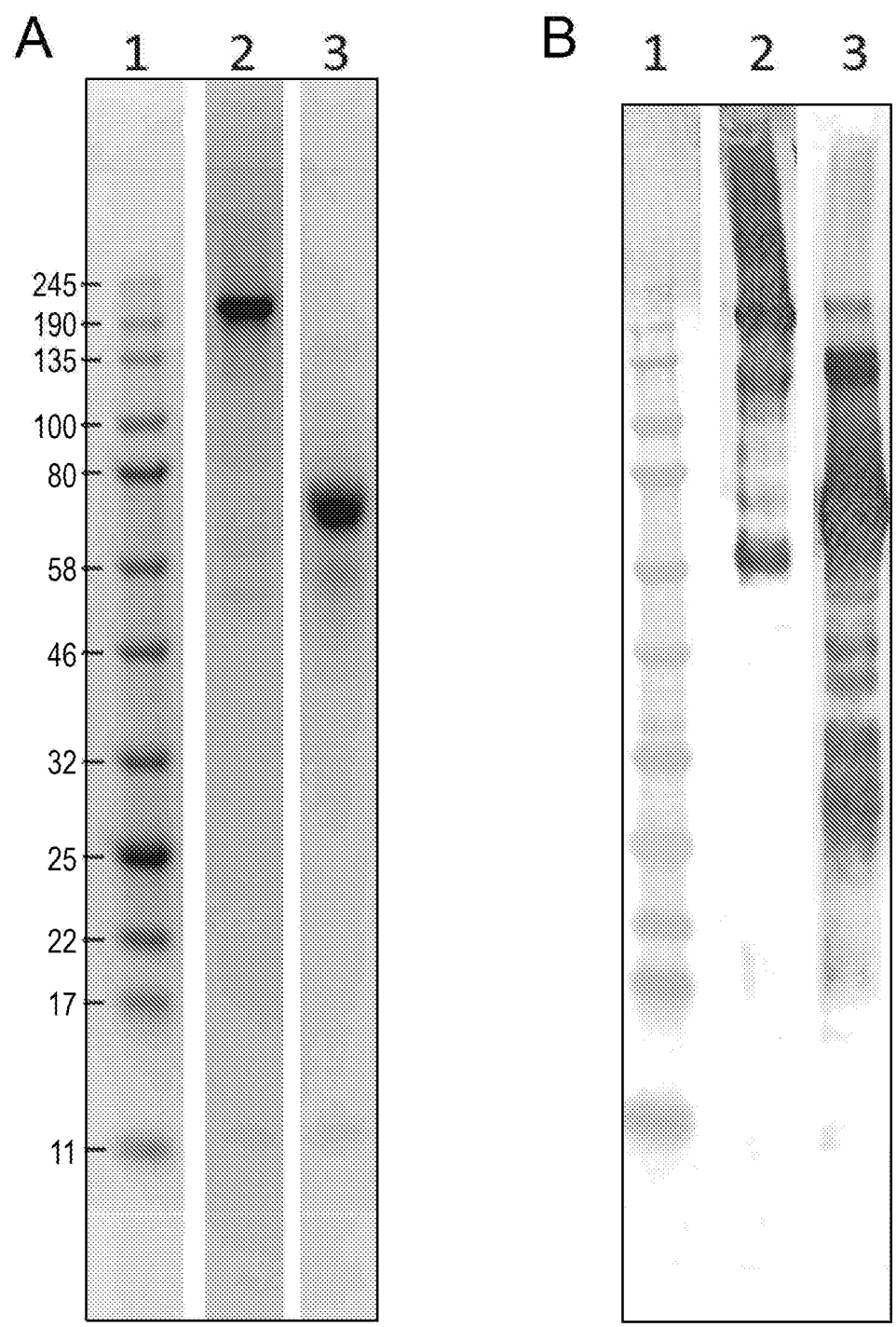

FIG. 10. SDS-PAGE and Western blot analysis of purified RSV-F-SpyTag under non-reducing and reducing conditions. A) SDS-PAGE and Coomassie staining analysis, Lane 1: ColorPlus Prestained Broad Range Protein Ladder; Lane 2: non-reduced sample; Lane 3: reduced sample. B) Western blot analysis using anti-RSV-F monoclonal antibody, Lane 1: ColorPlus Prestained Broad Range Protein Ladder; Lane 2: non-reduced sample; Lane 3: reduced sample.

Figure 11:
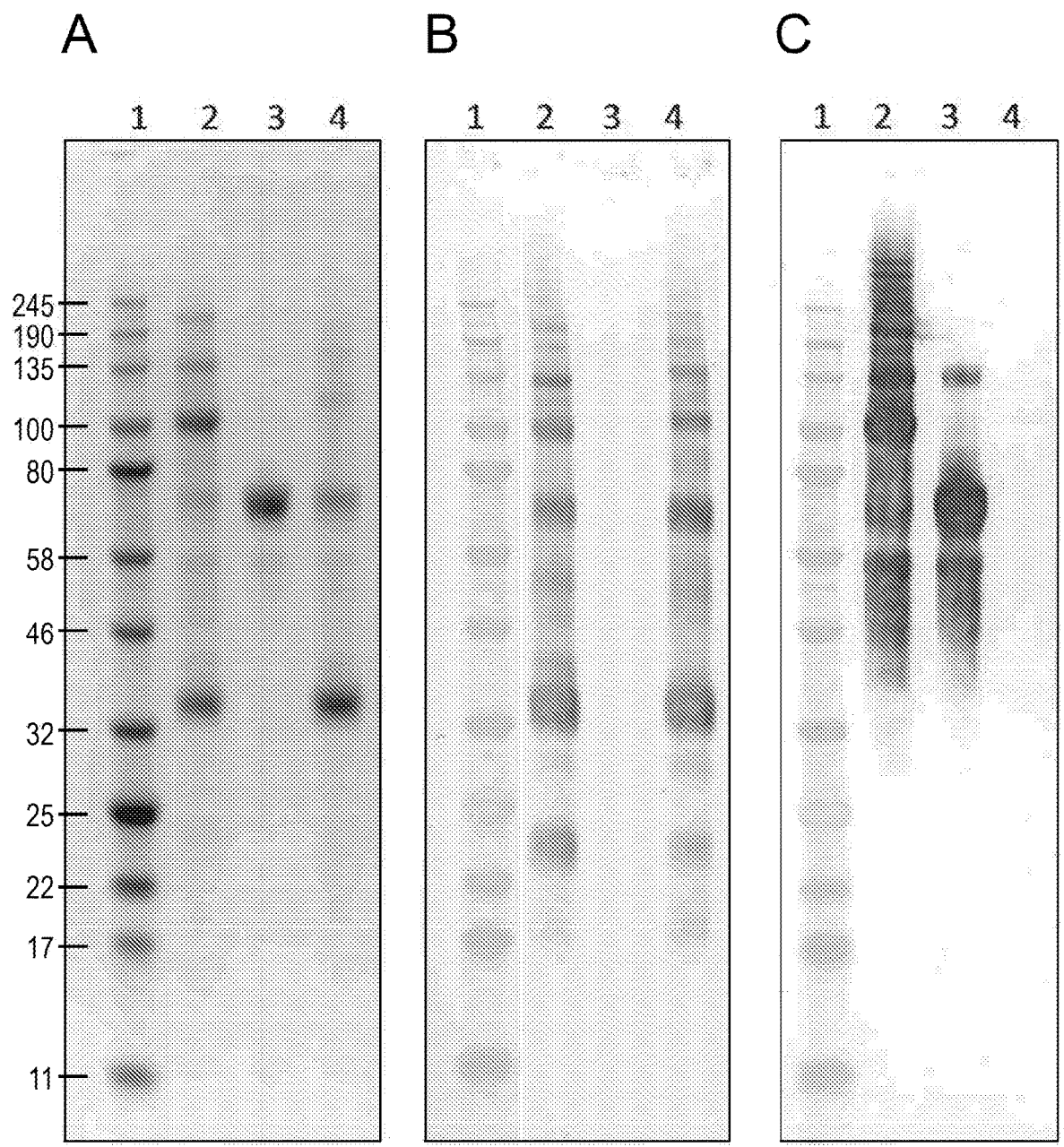

FIG. 11. SDS-PAGE and Western-blot analysis of RSV-F-SpyTag conjugated with SpyCatcher-HBsAg under reducing conditions. 1: ColorPlus Prestained Broad Range Protein Ladder, 2: RSV-F-SpyTag-SpyCatcher-HBsAg conjugate, 3: RSV-F-SpyTag, 4: SpyCatcher-HBsAg. A) SDS-PAGE and Coomassie staining analysis. B) Western blot using anti-HBsAg monoclonal antibody. C) Western blot using anti-RSV-F monoclonal antibody.

Figure 12:
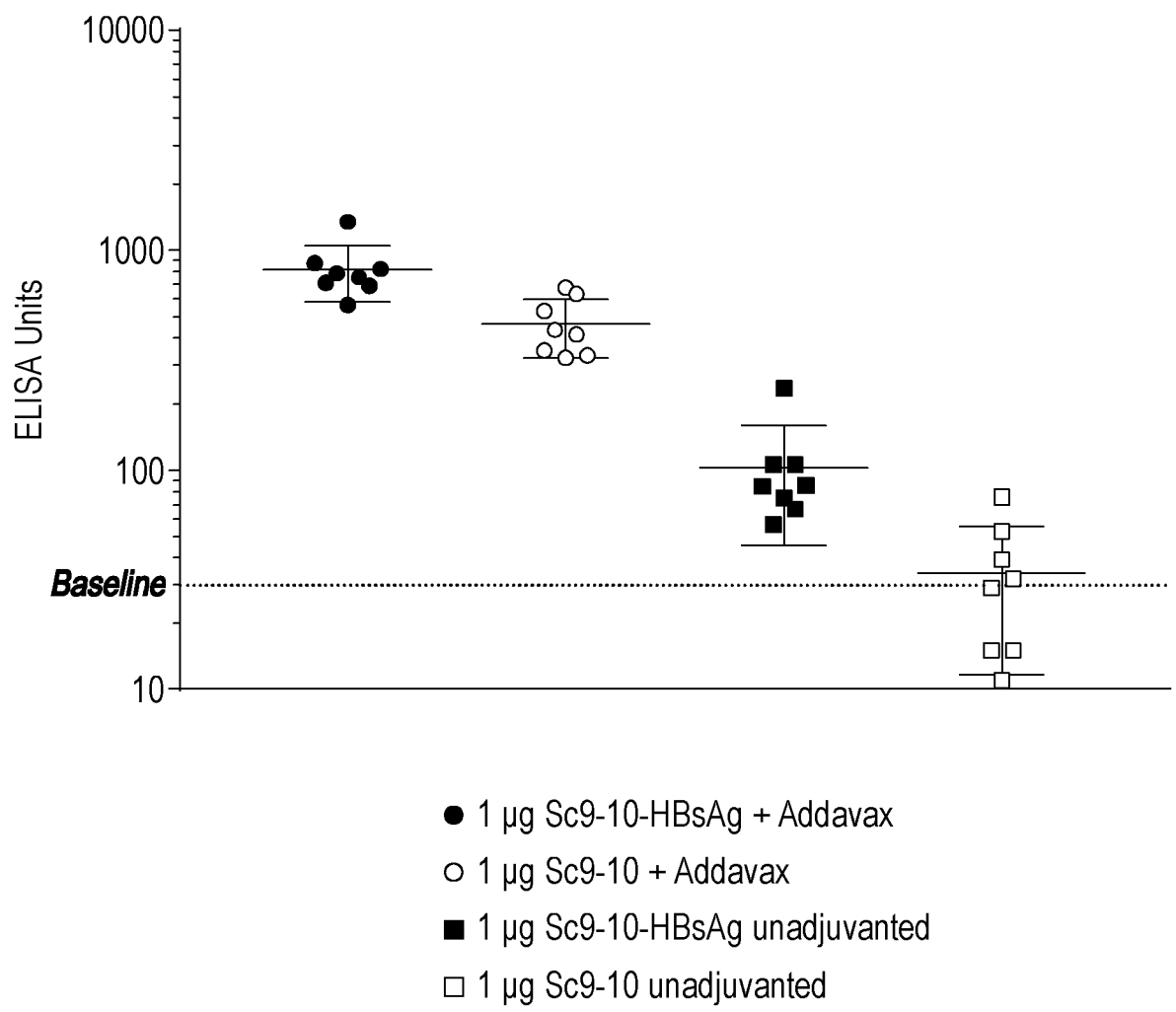

FIG. 12. Immunogenicity of conjugated RSV-F-SpyTag-SpyCatcher-HBsAg ('Sc9-10-HBsAg') versus unconjugated RSV-F-SpyTag ('Sc9-10'). BALB/c mice were immunised with 1 µg of RSV-F-SpyTag conjugated to SpyCatcher-HBsAg (RSV-F VLP) or 1 µg of RSV-F-SpyTag protein, either unadjuvanted or with Addavax™ (n=8). RSV-F antigen is sc9-10 DS-Cav1 A149C Y458C-SpyTag.

DETAILED DESCRIPTION OF THE INVENTION

Virus-Like Particles

Traditionally, vaccine approaches used attenuated or dead whole pathogens although this has been replaced by using recombinant subunit vaccines which include a protein from the appropriate pathogen. More recently, approaches using Virus-like particles (VLPs) have been developed. VLPs are particles which resemble viruses in their size (approx. 20-200 nm), their shape and their repetitive protein arrangement but lack any genetic material from a pathogen. Because of their size, VLPs are more likely to drain to lymph nodes, making them ideal for uptake and presentation by antigen-presenting cells. In addition, their repetitive structure facilitates complement fixation and B cell receptor cross-linking (Kushnir et al. Vaccine 2012; Vol 31(1):58-83). However, their mechanism of action is not restricted to theory.

HCMV

Human Cytomegalovirus (HCMV, also known as human herpesvirus-5 (HHV-5)) is a virus that most adults have been exposed to, with initial infection usually being only minor or asymptomatic. After infection, the virus remains latent in the body but can cause serious disease in the immunocompromised or elderly. HCMV is also the leading infectious cause of birth defects in developed countries. Up to 4/200 babies are born with HCMV due to congenital infection, and up to 10% of these will suffer long term consequences. HCMV infection has also been implicated in high blood pressure and atherosclerosis in adults (Cheng et al. (May 2009). Früh K, ed. "Cytomegalovirus infection causes an increase of arterial blood pressure". PLoS Pathog. 5 (5): e1000427).

The pentameric complex of HCMV comprising the viral protein gH/gL/pUL128/pUL130/pUL131A has been identified as a potentially useful vaccine target for HCMV based on the observation that antibodies to this complex can neutralise the entry of virus into epithelial cells as well as reduce the risk of the transmission of HCMV perinatally. Despite intensive efforts, however, a successful HCMV vaccine has not been developed to date.

HCMV Pentamer

HCMV strains, including clinical isolates and laboratory strains, differ in the sequence of their genomes. HCMV strains include Merlin (GI:155573956), Towne (G1239909366) and AD169 (GI:219879600), Toledo (G1290564358) and TB40/E. HCMV contains multiple membrane proteins and protein complexes. The pentameric protein gH/gL/pUL128/pUL130/pUL131A is important for HCMV infection of epithelial and endothelial cells, thought to be through endocytic pathways. Other combinations of the components of this complex have been shown to be important for infection of e.g. fibroblast cells. "pUL" sub-units/components are also referred to as "UL"; "pUL131" is also referred to as "pUL131A" and "pUL131a", or "UL131A".

Various HCMV strains have been deposited with the ATCC, and can be found as: Merlin (VR-1590), Towne (VR-977) and AD169 (VR-538). Genomic sequences may be reference via accession numbers: Merlin (AY446894.2), Towne (GO121041.1), AD169 (FJ527563.1), Toledo (GU37742.2) and TB40/E (KF297339.1).

RSV

Respiratory syncytial virus is a leading cause of serious respiratory disease in young children throughout the world. An estimated 3.4 million children younger than 5 years of age are hospitalized each year with severe RSV lower respiratory tract infection, with the highest incidence in children younger than 6 months of age. Most deaths occur in infants under the age of 1 and in developing countries. At present, options for prevention and control are limited.

RSV-F Pre-Fusion Trimer

The F glycoprotein is a type I viral fusion protein. It is thought that the RSV F precursor (F0) is cleaved by a furin-like protease at two sites, which generates three fragments. The shorter, N-terminal fragment ($F_2$) is covalently attached to the larger, C-terminal fragment ($F_1$) by two disulphide bonds. The intervening fragment of 27 amino acids dissociates after cleavage and is not found in the mature protein.

Numerous stabilised pre-fusion F trimers are available, as discussed previously. In the examples filed here, exemplary sequences encoding for these pre-fusion trimers are found as SEQ ID Nos: 48, 48, 54 and 55. Sequences including a fusion with a SpyTag are included as SEQ ID NOs: 47 and 53. The amino acid sequences are shown as SEQ ID Nos: 51, 52, 57 and 58 for the pre-fusion trimer, and SEQ ID Nos: 50 and 56 with a SpyTag. Other exemplary sequences are referred to herein.

Peptide Tag/Binding Partner Pairs

Proteins that are capable of spontaneous isopeptide bond formation (so-called "isopeptide proteins") have been advantageously used to develop peptide tag/polypeptide binding partner pairs (i.e. two-part linkers) which covalently bind to each other and provide irreversible interactions (see e.g. WO2011/098772 and WO 2016/193746 both herein incorporated by reference, together with WO2018/189517 and WO2018/197854 both incorporated herein by reference). In this respect, proteins which are capable of spontaneous isopeptide bond formation may be expressed as separate fragments, to give a peptide tag and a polypeptide binding partner for the peptide tag, where the two fragments are capable of covalently reconstituting by isopeptide bond formation, thereby linking molecules or components fused to the peptide tag and its polypeptide binding partner. The isopeptide bond formed by the peptide tag and its polypeptide binding partner is stable under conditions where non-covalent interactions would rapidly dissociate, e.g. over long periods of time (e.g. weeks), at high temperature (to at least 95° C.), at high force, or with harsh chemical treatment (e.g. pH 2-11, organic solvent, detergents or denaturants).

Isopeptide bonds are amide bonds formed between carboxyl/carboxamide and amino groups, where at least one of the carboxyl or amino groups is outside of the protein main-chain (the backbone of the protein). Such bonds are chemically irreversible under typical biological conditions and they are resistant to most proteases. As isopeptide bonds are covalent in nature, they result in some of the strongest measured protein-protein interactions.

In brief, a two-part linker, i.e. a peptide tag and its polypeptide binding partner (a so-called peptide tag/binding partner pair) may be derived from a protein capable of spontaneously forming an isopeptide bond (an isopeptide protein), wherein the domains of the protein are expressed separately to produce a peptide "tag" that comprises one of the residues involved in the isopeptide bond (e.g. an aspartate or asparagine, or a lysine) and a peptide or polypeptide binding partner (or "catcher") that comprises the other residue involved in the isopeptide bond (e.g. a lysine, or an aspartate or asparagine) and at least one other residue required to form the isopeptide bond (e.g. a glutamate). Mixing the peptide tag and binding partner results in the spontaneous formation of an isopeptide bond between the tag and binding partner. Thus, by separately incorporating the peptide tag and binding partner into different molecules or components, e.g. proteins, it is possible to covalently link said molecules or components together via an isopeptide bond formed between the peptide tag and binding partner, i.e. to form a linker between the molecules or components incorporating the peptide tag and binding partner.

The spontaneous formation of the isopeptide bond may be in isolation, and not require the addition of any other entity.

For some peptide tag and tag partner pairs, the presence of a helper entity, such as a ligase, may be required in order to generate the isopeptide bond.

A peptide tag/binding partner pair (two-part linker), termed SpyTag/SpyCatcher, has been derived from the CnaB2 domain of the *Streptococcus pyogenes* FbaB protein (Zakeri et al., 2012, Proc Natl Acad Sci USA 109, E690-697) and used in diverse applications including vaccine development (Brune et al., 2016, Scientific reports 6, 19234; Thrane et al., 2016, Journal of Nanobiotechnology 14, 30).

Suitably, the first and second peptide tags form the peptide tag/binding pair termed SpyTag/SpyCatcher. Suitably, the SpyCatcher component is DeltaN1 (ΔN1) SpyCatcher (as described in Li, L., Fierer, J. O., Rapoport, T. A. & Howarth, M. Structural analysis and optimization of the covalent association between SpyCatcher and a peptide Tag. *J. Mol. Biol.* 426, 309-317 (2014)) which has a 23 amino acid truncation at the N-terminal compared to "SpyCatcher" (SEQ ID No. 38).

In other embodiments, the first and second peptide tags form a peptide tag/binding pair which is a mutated version of SpyTag/SpyCatcher displaying an increased rate of reaction for isopeptide bond formation such as, for example, those described in co-pending application, GB1706430.4. In some embodiments, these mutated forms may be useful for the attachment of large proteins (e.g. >50 kDa or >100 kDa, such as the >160 kDa HCMV pentameric protein as described herein) and/or where slow reactions or steric hindrance may be an issue.

In other embodiments, the isopeptide proteins may include SnoopTag/SnoopCatcher, described, for example in WO 2016/193746.

In some embodiments, one or both of the isopeptide proteins may have N- or C-terminal truncations, whilst still retaining the reactivity of the isopeptide bond.

Exemplary first and second peptide tag pairs (peptide tag/binding partner pairs; reactive pairs) are described in the following table:

| | Reactive pairs | |
|---|---|---|
| (a) | SpyTag<br>SpyTag002<br>SpyTag002 RG T3H | SpyCatcher |
| (b) | SpyTag<br>SpyTag002<br>SpyTag002 RG T3H | SpyCatcher002 |
| (c) | SpyTag<br>SpyTag002<br>SpyTag002 RG T3H | SpyCatcher002 D5A<br>A92P Q100D |
| (d) | SnoopTag<br>SnoopTagJr | SnoopCatcher |
| (e) | RrgATag<br>RrgATag2<br>DogTag | RrgACatcher |
| (f) | Isopeptag | Pilin-C |
| (g) | Isopeptag-N | Pilin-N |
| (h) | PsCsTag | PsCsCatcher |
| (i) | SnoopTagJr | DogTag [mediated by SnoopLigase] | described, for example, in WO2011/098772, WO2016/193746, GB1706430.4 GB1705750.6 or Li, L., et al., *J. Mol. Biol.* 426, 309-317 (2014).

Variants, derivatives and modifications of the binding pairs may be made by any suitable means. Variants, derivatives and functionally operative modifications may involve amino acid additions, substitutions, alterations or deletions that retain the same function in relation to the ability to form an isopeptide bond with the relevant binding partner.

For some of the binding pairs, mediation by a third entity such as an enzyme is required. For example, SnoopLigase may be used to meditate the bond formation between SnoopTapJr and DogTag. Thus, the pairing may require the assistance of an enzyme such as a ligase.

HBsAg

By "HBsAg" is meant a surface antigen from Hepatitis B Virus (HBsAg), or portion thereof. In one embodiment, HBsAg may refer to the N-terminus of HBsAg, such as the HBsAg sequence as set out in SEQ ID NO: 41, comprising 226 amino acids of the S protein of Hepatitis B virus (adw serotype). Suitably, the HBsAg includes a four amino acid sequence, Pro Val Thr Asn, representing the four carboxy terminal residues of the hepatitis B virus (adw serotype) preS2 protein, as described in Valenzuela et al., (1979) 'Nucleotide sequence of the gene coding for the major protein of hepatitis B virus surface antigen' Nature 280:815-819. VLPs formed from HBsAg have been approved for clinical use against Hepatitis B (Kushnir et al. Vaccine 2012; Vol 31(1):58-83) including Recombivax HB (https://vaccines.procon.org/sourcefiles/recombivax_package_insert.pdf), and Energix B (https://au.gsk.com/media/217195/engerix-b_pi_006_approved.pdf). HBsAg has also been used as the basis for the pre-erythrocytic malaria vaccine RTS,S which has completed phase III clinical trials and is the most advanced malaria vaccine to date (http://www.malariavaccine.org/sites/www.malariavaccine.org/files/content/page/files/RTSS%20FAQs_FINAL.pdf; Kaslow and Biernaux, Vaccine 2015, Vol. 33(52): 7425-7432).

Linker Details

The distance between proteins (e.g. VLP and decorating antigen), can have an effect on the availability of antigenic epitopes in the protein, stability of the protein/s and may also have an effect on conjugation efficiency due to the accessibility of either of the isopeptide bond partners (e.g. SpyTag/SpyCatcher). Therefore a linker may be chosen with suitable properties in order to optimise availability, stability and/or accessibility. Linkers may be broadly subdivided into flexible and rigid subtypes.

Flexible Linkers

Flexible linkers may be used when the linked domains require movement. They usually consist of small non-polar (e.g.: Gly) or polar (eg: Ser, Thr) amino acids, where the small size provides flexibility (Chen et al., 2013 Adv Drug Deliv Rev. October 15; 65(10): 1357-1369). The addition of Ser or Thr can help maintain stability in solution, and adjusting the length can impact the proper folding of proteins (Chen et al., 2013). Any suitable flexible linker may be used, with the nature and length appropriate to the entities concerned. Suitably, a flexible linker may include combinations between 2 and 70 amino acids of such type.

EXAMPLES

| Sequence name | Sequences | SEQ ID No |
|---|---|---|
| Flexible linker 1 | GSG | n/a |
| Flexible linker 2 - (GSG)$_2$ | GSGGSG | SEQ ID NO: 1 |
| Flexible linker 3 - (GSG)$_3$ | GSGGSGGSG | SEQ ID NO: 2 |

-continued

| Sequence name | Sequences | SEQ ID No |
|---|---|---|
| Flexible linker 4 - (G45)$_1$ | GGGGS | SEQ ID NO: 3 |
| Flexible linker 5 - (G45)$_3$ | GGGGSGGGGSGGGGS | SEQ ID NO: 4 |
| Flexible linker 6 - (G4S)$_4$ | GGGGSGGGGSGGGGS GGGGS | SEQ ID NO: 5 |
| Flexible linker 7 | GSAGSAAGSGEF | SEQ ID NO: 6 |
| Flexible linker 8 | KESGSVSSEQLAQFR SLD | SEQ ID NO: 7 |
| Flexible linker 9 | EGKSSGSGSESKST | SEQ ID NO: 8 |

Rigid Linkers

In some cases rigid linkers may be preferred, as they can assist with providing protein separation. Rigid linkers have a secondary structure. One of the most common rigid linkers is (EAAAK)$_n$ (where n is the number of repeats) which adopts an α-helical structure (Arai et al., (2001) Protein Eng. August; 14(8):529-32). Other rigid linkers may include proline rich sequences such as (XP)$_n$, where X is any amino acid but preferentially Ala (A), Lys (K) or Glu (E), where the proline provides conformational constraint (Chen at al., 2013).

Other suitable linkers are described, for example, by Klein et al. (2014) Protein Eng Des Sel. October; 27(10): 325-330. Any suitable rigid linker may be used, with the nature and length appropriate to the entities concerned. Suitably, a rigid linker may include combinations between 2 and 70 amino acids of such type.

EXAMPLES

| Sequence name | Sequences | SEQ ID No |
|---|---|---|
| Rigid linker 1 | EAAAK | SEQ ID NO: 9 |
| Rigid linker 2 - (EAAAK)$_3$ | EAAAKEAAAKEAAAK | SEQ ID NO: 10 |
| Rigid linker 3 - (AP)$_7$ | APAPAPAPAPAPAP | SEQ ID NO: 11 |

Host Cells and Expression Vectors

Suitably host cells for expression of nucleic acids to produce proteins and compositions in accordance with the invention will be known by those skilled in the art.

In one embodiment, the host cells will be suitable for transient expression. In another embodiment, host cells will be those cells which are capable of forming stable cell lines. Suitably, the coding sequences encoding the antigenic component, such as the HCMV pentamer and the RSV-F protein, including those comprising the isopeptide bond forming peptide tag will be integrated into one host cell. In one embodiment, each of the nucleic acid sequences encoding a subunit of the multimer such as a pentamer will be encompassed in a different plasmid/vector such that transfection of a host cell with, for example, all 5 plasmids/vectors will result in the pentamer being produced by the host cell, when it is cultured in suitable conditions. In other embodiments, a plasmid/vector may comprise a combination of one or more coding sequence such that at least 1, 2, 3, 4 or 5 plasmids may be introduced. Alternatively, an entire fusion peptide coding sequence may be provided in one vector, such that the entire protein component and first peptide tag are encoded on the same vector.

In one embodiment, these vectors are used for stable integration of the coding sequences into the genome of the host cells. Suitable host cells for stable expression include mammalian cells, such as HEK cells (Human embryonic kidney 293 cells) or rodent cells including CHO (Chinese Hamster Ovary) cells. Suitable mammalian cells and vectors for expression of the protein components of the composition in accordance with the invention will be known by those skilled in the art and are described, for example in WO2016/067239, at pages 15-16 and Hofmann et al., (2015) Biotech and Bioeng, 112(12):2505-2515. Exemplary stable construct sequences for expression of components in accordance with the invention may be found in Example 3 below.

Affinity Purification

In some embodiments, those expression constructs for use in expressing components of the composition in accordance with the invention may include "tag" sequence or sequences which facilitate purification such as affinity purification. Any suitable tag, such as an affinity tag may be included in order to separate the protein component and first peptide tag from the system in which it is produced. Those skilled in the art of recombinant protein production are aware of systems such as His-tags and Strep-tags which may be included for purification purposes. Such tags dramatically aid in protein purification and rarely adversely affect biological or biochemical activity, and are therefore desirable. Suitable tag sequences include C-tag, histidine tags (His-tag), streptavidin tags (Strep-tags), maltose-binding protein (MBP), Glutathione-S-transferase (GST) and FLAG tags.

Both the protein component and/or the moiety may include an affinity purification tag. For ease of use, these are generally fused genetically at the C- or N-terminal end of the protein.

Therefore, in some embodiments, for example, the gH, gL, pUL128, pUL130, pUL131A (or a fragment thereof) subunits of HCMV, the RSV pre-fusion F protein, or the HBsAg peptides/proteins may comprise additional amino acid residues, at the N- or C-terminus, which facilitate purification. Such additional amino acid residues may comprise a tag such as a His-tag or C-tag, for example. In some embodiments, C-tag may provide a cleaner purification. Other suitable tag sequences include maltose-binding protein (MBP), Strep-tag, Glutathione-S-transferase (GST) and FLAG tag. In some embodiments, a tag may be linked to the amino acid sequence in such a way that it may be cleaved after purification e.g. by using a cleavable linker, for example. In other embodiments, non-affinity purification methods may be used.

In other embodiments, the RSV pre-fusion F protein may comprise additional amino acid residues, at the C- or N-terminus, which facilitate purification. Exemplified herein, the RSV pre-fusion F protein has a C-Tag for affinity purification.

Conjugation of First and Second Peptide Tag Pairs

Conjugation of the first and second peptide tag/binding partner/reactive pairs may be carried out overnight at 4° C. Alternatively, the conjugation reaction may be conducted at room temperature for 3-4 hours as coupling speed is expected to be increased at room temperature. The optimal first and second binding partner ratio for a given coupling reaction is dependent on the size of each binding partner. For example, a 1:1.5 molar ratio of VLP monomer to antigen may be sufficient for smaller antigens (~20 kDa), whereas, a 1:1 mass ratio may be sufficient for larger antigens (>100 kDa) in combination with the same VLP monomer. However, both ratios result in excess antigen (the smaller binding partner). Any excess antigen can be removed by e.g. size exclusion chromatography (SEC) or by dialysis. Dialysis may be more suitable for smaller antigens as it is not as efficient as SEC. Alternatively, the ratio of VLP/particle to antigen may be optimised so that all of the antigen is conjugated and downstream purification is therefore not required. A suitable final protein concentration of approximately 1 mg/ml is optimal for conjugation reactions, as lower concentrations can reduce the reaction speed. A wide range of buffers near neutral pH are compatible with coupling/conjugation. A standard choice of conjugation buffer is TBS (20 mM Tris and 150 mM NaCl, pH 7.4). In some circumstances the addition of a 10× stock of citrate buffer (40 mM $Na_2HPO_4$, 200 mM sodium citrate, pH 6.2) may be used as described by Brune et al. Sci Rep. (2016).

Pharmaceutical Composition and Use

The compositions of the invention may be incorporated into a vaccine or immunogenic composition. Suitably, a vaccine or immunogenic composition will comprise particles of the invention in an immunogenic dose.

A pharmaceutical composition may comprise a particle or immunogenic composition in accordance with the invention provided with a pharmaceutically acceptable carrier. Suitable carriers are well known to those skilled in the art. In one embodiment a pharmaceutical composition comprises a buffer, excipient or carrier. Suitably a pharmaceutical composition may comprise suitable excipients and formulations to maintain stability of the composition. Suitably the formulation may comprise an adjuvant. In one embodiment, the formulation may comprise AddaVax™ or a similar squalene-based oil-in-water nano-emulsion with a formulation similar to MF59®. Other suitable adjuvants include liposome-based adjuvants such as Matrix M and AS01. Other suitable adjuvants include aluminium-based formulations such as Alhydrogel®. In one embodiment the formulation may comprise EDTA, for example at a concentration of 5 mM. Suitable excipients or formulations may depend on the properties of the particle or immunogenic composition; for example, the choice of expression system may affect the stability, glycosylation or folding of the proteins of the composition, which may in turn affect the optimal formulation of the composition. Methods of determination of a suitable excipient, formulation or adjuvant will be known to those skilled in the art.

Various further aspects and embodiments of the present invention will be apparent to those skilled in the art in view of the present disclosure.

All documents mentioned in this specification are incorporated herein by reference in their entirety.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

"Recombinant" as used herein to describe a polynucleotide means a polynucleotide of genomic, cDNA, semisynthetic, or synthetic origin which, by virtue of its origin or manipulation: (1) is not associated with all or a portion of the polynucleotide with which it is associated in nature; and/or (2) is linked to a polynucleotide other than that to which it is linked in nature. The term "recombinant" as used with respect to a protein or polypeptide means a polypeptide produced by expression of a recombinant polynucleotide.

Unless specifically stated, a process comprising steps may be performed in any suitable order. Thus steps can be performed in any appropriate order.

Sequence identity between polypeptide sequences is preferably determined by pairwise alignment algorithm using the Needleman-Wunsch global alignment algorithm (Needleman and Wunsch 1970), using default parameters (e.g. with Gap opening penalty=10.0, and with Gap extension penalty=0.5, using the EBLOSUM62 scoring matrix). This algorithm is conveniently implemented in the needle tool in the EMBOSS package (Rice, Longden and Bleasby 2000). Sequence identity should be calculated over the entire length of the polypeptide sequence of the invention.

Any homologues of components mentioned herein are typically a functional homologue and are typically at least 40% homologous to the relevant region of the protein. Homology can be measured using known methods. For example the UWGCG Package provides the BESTFIT program which can be used to calculate homology (for example used on its default settings) (Devereux et al (1984) Nucleic Acids Research 12, 387-395). The PILEUP and BLAST algorithms can be used to calculate homology or line up sequences (typically on their default settings), for example as described in Altschul S. F. (1993) J Mol Evol 36:290-300; Altschul, S, F et al (1990) J Mol Biol 215:403-10. Software for performing BLAST analyses is publicly available through the National Center for Biotechnology Information (http://www.ncbi.nlm.nih.gov/).

The BLAST algorithm performs a statistical analysis of the similarity between two sequences; see e.g., Karlin and Altschul (1993) Proc. Natl. Acad. Sci. USA 90: 5873-5787. One measure of similarity provided by the BLAST algorithm is the smallest sum probability (P(N)), which provides an indication of the probability by which a match between two nucleotide or amino acid sequences would occur by chance. For example, a sequence is considered similar to another sequence if the smallest sum probability in comparison of the first sequence to the second sequence is less than about 1, preferably less than about 0.1, more preferably less than about 0.01, and most preferably less than about 0.001.

A variant polypeptide comprises (or consists of) sequence which has at least 40% identity to the native protein. In preferred embodiments, a variant sequence may be at least 55%, 65%, 70%, 75%, 80%, 85%, 90% and more preferably at least 95%, 97% or 99% homologous to a particular region of the native protein over at least 20, preferably at least 30, for instance at least 40, 60, 100, 200, 300, 400 or more contiguous amino acids, or even over the entire sequence of the variant. Alternatively, the variant sequence may be at least 55%, 65%, 70%, 75%, 80%, 85%, 90% and more preferably at least 95%, 97% or 99% homologous to full-length native protein. Typically the variant sequence differs from the relevant region of the native protein by at least, or less than, 2, 5, 10, 20, 40, 50 or 60 mutations (each of which can be substitutions, insertions or deletions). A variant sequence of the invention may have a percentage identity with a particular region of the full-length native protein which is the same as any of the specific percentage homology values (i.e. it may have at least 40%, 55%, 80% or 90% and more preferably at least 95%, 97% or 99% identity) across any of the lengths of sequence mentioned above.

Variants of the protein also include truncations. Any truncation may be used so long as the variant is still functional. Truncations will typically be made to remove sequences that are non-essential for activity/function, in particular the formation of an isopeptide bond, and/or do not affect conformation of the folded protein, in particular folding of any immunogenic sites. Truncations may also be selected to improve ease of production of the components. Appropriate truncations can routinely be identified by systematic truncation of sequences of varying length from the N- or C-terminus.

Variants of the native protein further include mutants which have one or more, for example, 2, 3, 4, 5 to 10, 10 to 20, 20 to 40 or more, amino acid insertions, substitutions or deletions with respect to a particular region of the native protein. Deletions and insertions are made preferably outside of the antigenic areas. Insertions are typically made at the N- or C-terminal ends of a sequence derived from the native protein, for example for the purposes of recombinant expression. Substitutions are also typically made in regions that are non-essential for activity/function and/or do not affect conformation of the folded protein. Such substitutions may be made to improve solubility or other characteristics of the protein. Substitutions may be made in order to increase the stability of the protein.

Substitutions preferably introduce one or more conservative changes, which replace amino acids with other amino acids of similar chemical structure, similar chemical properties or similar side-chain volume. The amino acids introduced may have similar polarity, hydrophilicity, hydrophobicity, basicity, acidity, neutrality or charge to the amino acids they replace. Alternatively, the conservative change may introduce another amino acid that is aromatic or aliphatic in the place of a pre-existing aromatic or aliphatic amino acid. Conservative amino acid changes are well known in the art.

A derivative is an entity that arises or is made from a parent entity by replacement of some part of the parent entity.

EXAMPLES

Example 1

Generation of Exemplary Multimer—VLP Composition (HCMV Pentamer-HBsAg VLP)

HCMV pentamer was expressed transiently in Expi293F cells using ExpiFectamine™ 293 transfection reagents (ThermoFisher Scientific) and 5 separate plasmids encoding the sequences below. The HCMV pentamer described below is approx. 162 kDa without glycosylation (including tags and linkers but excluding signal peptides).

Nucleotide Sequences

The HCMV pentamer sequences expressed represent native sequences from the Merlin strain (GenBank: AY446894.2; low-passage (i.e. attenuated) HCMV strain) (including introns), except for two introduced mutations (one in gH, one in UL128) described in the relevant passages below.

gH-SpyTag-his Nucleotide Sequence (SEQ ID NO: 12)

In this sequence (SEQ ID NO: 12), a silent mutation C>A at position 1146 was introduced for GeneArt® synthesis, as the native sequence CACCTGC around this nucleotide was flagged up as possibly problematic. The construct comprises: Signal peptide (nt 1-69), Ectodomain (nt 70-2151), transmembrane domain (truncated) (nt 2152-2157), (the signal peptide, ectodomain and transmembrane domain (truncated) together being represented by SEQ ID NO: 13), Linker (nt 2158-2175; SEQ ID NO: 14), SpyTag (nt 2176-2214; SEQ ID NO: 15), 6× His tag (nt 2215-2232), Stop codon (nt 2233-2235). Nucleotides 1 to 2157 (SEQ ID NO: 13) represent the gH coding sequence.

gL Nucleotide Sequence (SEQ ID NO. 16)

In this sequence: Signal peptide (nt 1-90), Ectodomain (nt 91-834), Stop codon (nt 835-837).

UL130-C-Tag Nucleotide Sequence (SEQ ID NO. 17)

In this sequence: Signal peptide (nt 1-75), Ectodomain (nt 76-642), Linker (nt 643-687), C-tag (nt 688-699), Stop codon (nt 700-702).

UL128 Nucleotide Sequence (SEQ ID NO. 20) (Includes the 2 Introns Present in the Native Sequence)

In this sequence: Signal peptide (nt 1-81), Introns: nt 165-287, nt 423-542, Ectodomain exons (nt 82-164, nt 288-422, nt 543-756), Stop codon (nt 757-759).

A T>C mutation was introduced at nucleotide 634. The T634 nucleotide was mentioned in the GenBank file as causing premature termination of UL128 in the Merlin strain, and we therefore used annotations from a different strain (GenBank: GQ396662.1, strain HAN38) to inform which base to substitute to in order to revert to expression of the full-length protein.

UL131A Nucleotide Sequence (SEQ ID NO. 21) (Includes the Intron Present in the Native Sequence)

In this sequence: Signal peptide (nt 1-54), Intron (nt 237-344), Ectodomain exons (nt 55-236, nt 345-495), Stop codon (nt 496-498).

SpyCatcher-HBsAg Nucleotide Sequence (SEQ ID NO. 22)

In this sequence: SpyCatcherDeltaN1 (nt 1-276), flexible Linker (nt 277-303), PVTN linker (nt 304-315), HBsAg (nt 316-993), C-tag (nt 994-1005), Stop codon (nt 1006-1008).

Amino Acid Sequences

Expression of the above nucleotide sequences is predicted to result in the below amino acid sequences.

gH-SpyTag-his Amino Acid Sequence (SEQ ID NO. 27)

Predicted mass 81.852 kDa (without signal peptide), 84.364 kDa (including signal peptide).

In this sequence: Signal peptide (aa 1-23), Ectodomain (aa 24-717), Transmembrane domain (truncated) (aa 718-719)) (the signal peptide, ectodomain and transmembrane domain (truncated) together represented by SEQ ID NO: 28), Linker (aa 720-725; SEQ ID NO: 29), SpyTag (aa 726-738; SEQ ID NO: 30), 6× His tag (aa 739-744). Amino acid residues 1-719 represent the native Merlin strain gH amino acid sequence with truncated TM domain (SEQ ID NO: 28).

gL Amino Acid Sequence (SEQ ID NO: 31)

Predicted mass 27.522 kDa (without signal peptide), 30.815 kDa (including signal peptide).

In this sequence: Signal peptide (aa 1-30), Ectodomain (aa 31-278). Amino acid residues 1-278 represent the native Merlin strain gL amino acid sequence.

UL130-C-Tag Amino Acid Sequence (SEQ ID NO: 32)

Predicted mass 23.167 kDa (without signal peptide), 26.081 kDa (including signal peptide).

In this sequence: Signal peptide (aa 1-25), Ectodomain (aa 26-214), (signal peptide and ectodomain together represented by SEQ ID NO: 33), Linker (aa 215-229; SEQ ID NO: 34), C-tag (aa 230-233). Amino acid residues 1-214 represent the native Merlin strain UL130 amino acid sequence.

UL128 amino acids sequence (SEQ ID NO: 35)

Predicted mass 16.659 kDa (without signal peptide), 19.717 kDa (including signal peptide).

In this sequence: Signal peptide (aa 1-27), Ectodomain (aa 28-171). Amino acid residues 1-171 represent the native Merlin strain UL128 amino acid sequence.

UL131A Amino Acid Sequence (SEQ ID NO: 36)

Predicted mass 12.985 kDa (without signal peptide), 14.989 kDa (including signal peptide).

In the above sequence: Signal peptide (aa 1-18), Ectodomain (aa 19-129). Amino acid residues 1-129 represent the native Merlin strain UL131A amino acid sequence.

SpyCatcher-HBsAg Amino Acid Sequence (SEQ ID NO: 37)

Predicted mass 36.824 kDa including tags and linkers.

In this sequence: SpyCatcherDeltaN1 (aa 1-92; SEQ ID NO: 38), Flexible Linker (aa 93-101; SEQ ID NO: 39), PVTN linker (aa 102-105; SEQ ID NO: 40), HBsAg (aa 106-331; SEQ ID NO: 41), C-tag (aa 332-335).

Purification of the Pentamer

Pentamer-SpyTag was expressed in EXP1293F cells and was secreted into the supernatant (due to the deletion of (a portion of) the TM domain from the gH subunit). Initial attempts to use affinity purification to purify the HCMV pentamer relied on the expression of the gH subunit with a C-tag, but this resulted in the isolation of gH/gL hetero homodimers as well as the pentamer. In an alternative strategy a C-tag was added to the UL130 subunit (SEQ ID NO: 17 (nucleotide) and SEQ ID NO: 32 (amino acid)) which permitted purification of the pentamer from the supernatant using C-tag affinity purification (ThermoFisher) and size exclusion chromatography. The pentamer appeared as expected under non-reducing and reducing conditions when analysed by SDS-PAGE (FIG. 1A) and reacted with anti-HCMV pentamer antibodies (Native Antigen Company (AbCMV2450)) (FIG. 1B), with only minor contaminants observed at ~14 kDa.

Purification of the HBsAg VLP Monomer

SpyCatcher-HBsAg was expressed in *Pichia pastoris* and purified from the cell homogenate. Under reducing conditions on an SDS-PAGE gel the predominant protein band corresponded to the expected size of the monomer (approx. 37 kDa) with further larger bands indicating the presence of oligomeric species, indicating that good cross-linking of the particle had occurred (FIG. 2A, lane 'R'). Under non-reducing conditions (lane 'NR') the material predominantly remained at the top of the gel with some smearing, which indicates that the VLP particle was well formed and therefore too large to fully migrate into the gel (FIG. 2A). Both non-reduced and reduced SpyCatcher-HBsAg reacted strongly with a mouse anti-HBsAg monoclonal antibody (obtained from Bio-Rad (MCA4658)) (FIG. 2B), indicating that the presence of SpyCatcher did not negatively affect the reactive epitope. Both HCMV pentamer-SpyTag and SpyCatcher-HBsAg eluted as single peaks as assessed by HPLC size exclusion analysis on an s200 increase 3.2/300 column (FIG. 3A-B). HCMV pentamer-SpyTag eluted at ~400 kDa (FIG. 3A) which is larger than expected. However, this can be explained by the structure of the pentamer not being spherical which is known to alter the retention times of proteins during size exclusion chromatography. SpyCatcher-HBsAg eluted in the void volume of the column, which indicates that the particle is properly formed with no monomer detectable in the solution (FIG. 3B).

Antigen-VLP Conjugation

HCMV pentamer-SpyTag was conjugated to SpyCatcher-HBsAg overnight at 4° C. resulting in an HBsAg VLP coated with HCMV-pentamer. A buffer containing Tris buffered saline (TBS; 20 mM Tris and 150 mM NaCl, pH 7.4) supplemented with 5 mM EDTA was used for conjugation. The conjugation was monitored using SDS-PAGE and Western-blot analysis as well as HPLC. When the conjugation reaction was compared to either pentamer-SpyTag or SpyCatcher-HBsAg alone there was the presence of a new band at ~130 kDa under reducing conditions (FIG. 4A, lane 2) which was reactive with both monoclonal anti-HBsAg (FIG. 4B) and polyclonal anti-HCMV pentamer (FIG. 4C) antibodies, indicating it contained conjugated HBsAg-gH at least. When analysed by HPLC size exclusion chromatography 97% eluted in the main peak corresponding to the predicted size of conjugated HCMV pentamer-HBsAg monomer (FIG. 5).

Example 2

In Vivo Testing of HCMV-SpyTag-SpyCatcher-HBsAg VLP (Adjuvanted)

The conjugated HCMV pentamer-HBsAg VLP, as well as unconjugated HCMV pentamer-SpyTag, were used in an immunisation schedule using BALB/c mice to (i) confirm the immunogenicity of the HCMV pentamer-SpyTag produced and (ii) to compare the immunogenicity of the unconjugated HCMV pentamer-SpyTag versus conjugated HCMV pentamer-HBsAg VLP.

A Prime-Boost-Boost schedule with 3 week intervals was used as follows:

Day 0: immunisation (prime); Day 20: tail bleed; Day 21: immunisation (boost 1); Day 41: tail bleed;

Day 42: immunisation (boost 2); Day 63: cardiac bleed.

The immunised groups were as follows. For each group n=10:

1) 1 µg HCMV pentamer-SpyTag in AddaVax™ (Invivogen)
2) 1 µg HCMV pentamer-SpyTag-SpyCatcher-HBsAg VLP (1 µg of pentamer equivalent) in AddaVax™
3) SpyCatcher-HBsAg VLP (normalised to the amount of SpyCatcher-HBsAg in group 2) in AddaVax™
4) 0.1 µg HCMV pentamer-SpyTag in AddaVax™
5) 0.1 µg HCMV pentamer-SpyTag-SpyCatcher-HBsAg VLP (0.1 µg of pentamer equivalent) in AddaVax™
6) TBS (20 mM Tris and 150 mM NaCl, pH 7.4)

AddaVax™ is a squalene-based oil-in-water nano-emulsion with a formulation similar to MF59® that has been licensed in Europe for adjuvanted flu vaccines. Squalene oil-in-water emulsions are known to elicit both cellular (Th1) and humoral (Th2) immune responses. Other suitable adjuvants will be known to those skilled in the art.

Immunogenicity was assessed using ELISA. A standardised ELISA against HCMV pentamer was used to determine the titre of the antisera raised in each group. Plates were coated overnight with 5 µg/ml pentamer (without SpyTag), 50 µL/well; washed; blocked with milk for one hour; washed; mouse sera (at an appropriate dilution in PBS) applied for 1 hour; washed; goat anti-mouse-Alkaline Phosphatase antibody (1:10,000) applied for one hour; washed; developed.

Both unconjugated (Groups 1 and 4) and conjugated HCMV pentamer-HBsAg (Groups 2 and 5) at different doses were included to permit the comparison of immunogenicity between the conjugated HCMV pentamer-HBsAg VLP vaccine and unconjugated HCMV pentamer-SpyTag, which allows extrapolation to other HCMV pentamer vaccines (e.g. soluble pentamer). Groups 3 and 6 represent negative controls.

At each time point, OD values for the samples were read at appropriate dilutions, and ELISA Units determined using a standard curve run on each plate. Data showing the results for groups 1, 2, 4 and 5 post-prime is shown in FIG. 6. HCMV pentamer-HBsAg immunised mice show substantially stronger serum IgG antibody responses using both 1 µg and 0.1 µg doses, in comparison to mice immunised with 1 µg or 0.1 µg doses of unconjugated HCMV pentamer. ELISA units for groups 3 and 6 provided the baseline for this assay, also shown in FIG. 6.

The functional activity of the antibodies raised was investigated using a microneutralisation assay based upon Wang et al. (Vaccine 33 (2015) 7254-7261; DOI: 10.1016/j.vaccine.2015.10.110). Neutralising titres for groups 1, 2, 4 and 5 are shown in FIG. 7. The sera from mice immunised with pentamer-HBsAg VLP are substantially more neutralising than those of mice immunised with pentamer-SpyTag protein alone.

Example 3

Stable Construct Sequences

Two stable constructs (adapted from Hofmann et al., (2015) Biotech and Bioeng, 112(12):2505-2515) were optimised for CHO expression of components of the HCMV pentamer-SpyTag. Introns were removed from the HCMV pentamer sequences but the signal sequences were retained.

HCMV gH-SpyTag/gL Stable Expression Construct

Stable vector construct HCMV-gH-(GSG)$_2$-SpyTag-His-IRES-gL was designed to comprise the gH-SpyTag-His component (SEQ ID NO: 42) and the gL component (SEQ ID NO: 43), respectively upstream and downstream of the EV71 IRES. The coding sequences used in this construct are described below.

Nucleotide Sequences gH-(GSG)2-SpyTag-his (without Introns) Inserted Upstream of EV71 IRES (SEQ ID NO: 42)

In this sequence: Signal peptide (nt 1-69), Ectodomain (nt 70-2151), Truncated transmembrane domain (nt 2152-2157), (GSG)$_2$ linker (nt 2158-2175), SpyTag (nt 2176-2214), His-tag (nt 2215-2232), Stop codon (nt 2233-2235).

gL (without Introns) Inserted Downstream of EV71 IRES (SEQ ID NO: 43)

In this sequence: Signal peptide (nt 1-90), Ectodomain (nt 91-834), Stop codon (nt 835-837)

HCMV UL128/UL130/UL131A Stable Expression Construct

Stable construct HCMV-UL128-IRES-UL130-(G4S)3-C-tag-IRES-UL131A was designed to comprise the UL128 component (SEQ ID NO: 44), the UL130 component (SEQ ID NO: 45) and the UL131A component (SEQ ID NO: 46). The UL130 component was inserted after the first EV71 IRES of the plasmid and the UL131A component was inserted after the second EV71 IRES. The coding sequences used in this construct are described below.

Nucleotide Sequences

UL128 (without Introns) (SEQ ID NO: 44)

In this sequence: Signal peptide (nt 1-81), Ectodomain (nt 82-513), Stop codon (nt 514-516).

UL130-(G4S)3-C-Tag (without Introns) (SEQ ID NO: 45)

In this sequence: Signal peptide (nt 1-75), Ectodomain (nt 76-642), (G4S)$_3$ linker (nt 643-687), Ctag (nt 688-699), Stop codon (nt 700-702).

UL131A (without Introns) (SEQ ID NO: 46)

In this sequence: Signal peptide (nt 1-54), Ectodomain (nt 55-387), Stop codon (nt 388-390).

Example 4

In Vivo Testing of HCMV-SpyTag-SpyCatcher-HBsAg VLP (Unadjuvanted)

The conjugated HCMV pentamer-HBsAg VLP, as well as unconjugated HCMV pentamer-SpyTag, were used in an immunisation schedule using BALB/c mice to further study the immunogenicity of the conjugated pentamer-HBsAg VLP versus unconjugated pentamer-SpyTag protein.

A Prime-Boost-Boost schedule with 3 week intervals was used as follows:

Day 0: immunisation (prime); Day 20: tail bleed; Day 21: immunisation (boost 1); Day 41: tail bleed;
Day 42: immunisation (boost 2); Day 63: cardiac bleed.

The immunised groups were as follows. For each group n=10:

1) 1 µg HCMV pentamer-SpyTag unadjuvanted
2) 1 µg HCMV pentamer-SpyTag-SpyCatcher-HBsAg VLP (1 µg of pentamer equivalent) unadjuvanted
3) 0.1 µg HCMV pentamer-SpyTag-SpyCatcher-HBsAg VLP (0.1 µg of pentamer equivalent) unadjuvanted Immunogenicity was assessed using ELISA. A standardised ELISA against HCMV pentamer was used to determine the titre of the antisera raised in each group. Plates were coated overnight with 5 µg/ml pentamer (without SpyTag), 50 µL/well; washed; blocked with milk for one hour; washed; mouse sera (at an appropriate dilution in PBS) applied for 1 hour; washed; goat anti-mouse-Alkaline Phosphatase antibody (1:10,000) applied for one hour; washed; developed.

At each timepoint, OD values for the samples were read at appropriate dilutions, and ELISA Units determined using a standard curve ran on each plate. Post-prime and post-boost data is shown in FIG. 8. HCMV pentamer-HBsAg immunised mice show substantially stronger serum IgG antibody responses using both 1 µg and 0.1 µg doses, in comparison to mice immunised with 1 µg of HCMV pentamer alone as soluble protein.

The functional activity of the antibodies raised was investigated using a microneutralisation assay based upon Wang et al. (2015). Post-prime and post-boost neutralising titres are shown in FIG. 9. The sera from mice immunised with unadjuvanted pentamer-HBsAg VLP are substantially more neutralising than those of mice immunised with unadjuvanted pentamer-SpyTag protein alone.

Example 5

Expression and Purification of RSV-F-SpyTag

The sequence from antigen RSV-F Sc9-10 DS-Cav1 A149C Y458C was fused to SpyTag to generate RSV-F-SpyTag, and was expressed by transiently transfecting ExpiCHO™ cells with the nucleotide sequence SEQ ID NO: 47 in plasmid pcDNA3.4, using ExpiCHO™ Expression System Kit and ExpiFectamine™ transfection reagents (ThermoFisher Scientific).

RSV-F Sc9-10 DS-Cav1 A149C Y458C (National Institutes of Health) is a variant of the Respiratory Syncytial Virus Fusion protein (pre-fusion RSV-F) as described by Joyce et al. (2016) (Iterative structure-based improvement of a respiratory syncytial virus fusion glycoprotein vaccine. Nat Struct Mol Biol. 2016 September; 23(9): 811-820). This variant is a pre-fusion-stabilised form of the fusion (F) glycoprotein with genetically-linked F subunits, fusion peptide deleted, T4 fibritin trimerisation motif (foldon domain), and interprotomer movements stabilised by an additional interprotomer disulfide bond (A149C Y458C).

Nucleotide Sequences

RSV-F-SpyTag-Ctag Nucleotide Sequence (SEQ ID NO: 47)

The original sequence of Sc9-10 DS-Cav1 A149C Y458C was modified at the 3' end by the deletion of the thrombin site, 6× His-tag and Strep-tag® II. These deleted domains were replaced with a linker-SpyTag-C-tag sequence, to produce a 1587 nt cassette (SEQ ID NO: 47) comprising Sc9-10 DS-Cav1 A149C Y458C (nt 1-1515, including signal peptide (nt 1-75), and T4 fibritin foldon domain (nt 1435-1515)), (GSG)$_2$ linker (nt 1516-1533; SEQ ID NO: 14), SpyTag (nt 1534-1572; SEQ ID NO: 15), C-tag (nt 1573-1584) and Stop codon (nt 1585-1587). The Sc9-10 DS-Cav1 A149C Y458C nucleotide sequence excluding the linker, SpyTag, C-tag and Stop codon is encompassed by SEQ ID NO: 48 The Sc9-10 DS-Cav1 A149C Y458C nucleotide acid sequence excluding the signal peptide, linker, SpyTag or C-tag is encompassed by SEQ ID NO: 49.

Amino Acid Sequences

Expression of nucleotide sequence SEQ ID NO: 47 was predicted to result in an RSV-F-SpyTag-Ctag amino acid sequence (SEQ ID NO: 50) with the following domains: Sc9-10 DS-Cav1 A149C Y458C ((aa 1-505, including signal peptide (aa 1-25) and foldon domain (aa 479-505)), linker (aa 506-511; SEQ ID NO: 29), SpyTag (aa 512-524; SEQ ID NO: 30), C-tag (aa 525-528). The predicted mass of the protein was 57.9 kDa with the signal peptide, 55.3 kDa without the signal peptide. The Sc9-10 DS-Cav1 A149C Y458C amino acid sequence excluding the linker, SpyTag or C-tag is encompassed by SEQ ID NO: 51. The Sc9-10 DS-Cav1 A149C Y458C amino acid sequence excluding the signal peptide, linker, SpyTag or C-tag is encompassed by SEQ ID NO: 52.

Purification of RSV-F-SpyTag

The RSF-F-SpyTag antigen was secreted from the cells and purified from the supernatant using C-tag affinity purification and size exclusion chromatography. RSV-F-SpyTag appeared as expected under non-reducing and reducing conditions when analysed by SDS-PAGE (FIG. 10A) and reacted with anti-RSV-F [2F7] monoclonal antibody (ab43812; Abcam) (FIG. 10B).

Purification of the HBsAg VLP Monomer

SpyCatcher-HBsAg (VLP monomer) was prepared and purified as described in Example 1 above, see also FIG. 2.

Conjugation of RSV-F-SpyTag to SpyCatcher-HBsAg

RSV-F-SpyTag was conjugated to SpyCatcher-HBsAg overnight at 4° C. resulting in a HBsAg VLP coated with RSV-F trimer (RSV-F-SpyTag-SpyCatcher-HBsAg). A buffer containing Tris buffered saline (TBS; 20 mM Tris and 150 mM NaCl, pH 7.4) was used for conjugation. The conjugation was monitored using SDS-PAGE and Western-blot analysis (FIG. 11). When the conjugation reaction was compared to either RSV-F-SpyTag or SpyCatcher-HBsAg alone there was the presence of a new band at ~105 kDa (lane 2) under reducing conditions (FIG. 11A) which was reactive with both anti-HBsAg monoclonal antibody (MCA4658, Bio-Rad) (FIG. 11B) and anti-RSV-F [2F7] monoclonal antibody (ab43812; Abcam) (FIG. 11C), indicating it contained conjugated RSV-F-SpyTag-SpyCatcher-HBsAg.

Example 6

Immunogenicity of Conjugated RSV-F-SpyTag-SpyCatcher-HBsAg

An immunisation schedule was designed using BALB/c mice to confirm the immunogenicity of the produced RSV-F antigen and to compare the immunogenicity of the conjugated RSV-F-SpyTag-SpyCatcher-HBsAg VLP versus unconjugated RSV-F-SpyTag protein. The groups were dosed based on the amount of RSV-F-SpyTag in the sample, and a Prime-Boost schedule with 3 weeks interval was selected with the final time point 2 weeks after the boost immunisation.

Post-prime mice immunised with RSV-F-SpyTag-SpyCatcher-HBsAg show substantially stronger serum IgG antibody responses compared to mice immunised with RSV-F-SpyTag protein alone irrespective of whether the vaccines were unadjuvanted (FIG. 6) or formulated with Addavax™ (FIG. 6).

Table of sequences

| Sequence | Nucleotide sequence | Amino acid sequence |
|---|---|---|
| Flexible linker 2 - (GSG)$_2$ | n/a | SEQ ID NO: 1 |
| Flexible linker 3 - (GSG)$_3$ | n/a | SEQ ID NO: 2 |
| Flexible linker 4 - (G4S)$_1$ | n/a | SEQ ID NO: 3 |
| Flexible linker 5 - (G4S)$_3$ | n/a | SEQ ID NO: 4 |
| Flexible linker 6 - (G4S)$_4$ | n/a | SEQ ID NO: 5 |
| Flexible linker 7 | n/a | SEQ ID NO: 6 |
| Flexible linker 8 | n/a | SEQ ID NO: 7 |
| Flexible linker 9 | n/a | SEQ ID NO: 8 |
| Rigid linker 1 | n/a | SEQ ID NO: 9 |
| Rigid linker 2 - (EAAAK)$_3$ | n/a | SEQ ID NO: 10 |
| Rigid linker 3 - (AP)$_7$ | n/a | SEQ ID NO: 11 |
| gH-SpyTag-His | SEQ ID NO: 12 | SEQ ID NO: 27 |
| gH with truncated transmembrane domain | SEQ ID NO: 13 | SEQ ID NO: 28 |
| Linker from gH construct (2158-2175 bp) | SEQ ID NO: 14 | SEQ ID NO: 29 |
| SpyTag (2176-2214 bp) | SEQ ID NO: 15 | SEQ ID NO: 30 |
| gL | SEQ ID NO: 16 | SEQ ID NO: 31 |
| UL130-C-tag | SEQ ID NO: 17 | SEQ ID NO: 32 |
| U130 (signal sequence and ectodomain) | SEQ ID NO: 18 | SEQ ID NO: 33 |
| Linker from UL130 construct | SEQ ID NO: 19 | SEQ ID NO: 34 |
| UL128 (includes the 2 introns) | SEQ ID NO: 20 | SEQ ID NO: 35 |
| UL131A (includes the intron) | SEQ ID NO: 21 | SEQ ID NO: 36 |
| SpyCatcher-HBsAg | SEQ ID NO: 22 | SEQ ID NO: 37 |
| SpyCatcherDeltaN1 | SEQ ID NO: 23 | SEQ ID NO: 38 |
| Flexible linker from SpyCatcher-HBsAg | SEQ ID NO: 24 | SEQ ID NO: 39 |
| PVTN linker from SpyCatcher-HBsAg | SEQ ID NO: 25 | SEQ ID NO: 40 |
| HBsAg | SEQ ID NO: 26 | SEQ ID NO: 41 |
| gH-SpyTag-His optimised for CHO expression | SEQ ID NO: 42 | SEQ ID NO: 27 |
| gL optimised for CHO expression | SEQ ID NO: 43 | SEQ ID NO: 31 |
| UL128 optimised for CHO expression | SEQ ID NO: 44 | SEQ ID NO: 35 |
| UL130 optimised for CHO expression | SEQ ID NO: 45 | SEQ ID NO: 32 |
| UL131 optimised for CHO expression | SEQ ID NO: 46 | SEQ ID NO: 36 |
| RSV-F-SpyTag-Ctag | SEQ ID NO: 47 | SEQ ID NO: 50 |
| Sc-9-10 DS-Cav1 A149C Y458C (RSV-F) | SEQ ID NO: 48 | SEQ ID NO: 51 |
| Sc-9-10 DS-Cav1 A149C Y458C without the signal peptide | SEQ ID NO: 49 | SEQ ID NO: 52 |
| RSV-F DS-Cav1-SpyTag-Ctag | SEQ ID NO: 53 | SEQ ID NO: 56 |
| RSV-F DS-Cav1 | SEQ ID NO: 54 | SEQ ID NO: 57 |
| RSV-F DS-Cav1 without the signal peptide | SEQ ID NO: 55 | SEQ ID NO: 58 |
| gH with truncated transmembrane domain without the signal peptide | SEQ ID NO: 59 | SEQ ID NO: 60 |

The invention claimed is:

1. A composition comprising a virus-like particle displaying an antigenic component, wherein said composition comprises:
   i) an antigenic component comprising a first peptide tag, and
   ii) a moiety comprising a second peptide tag,
   wherein the antigenic component and the moiety are linked via an isopeptide bond between said first and second peptide tags, wherein the antigenic component is over 50 kDa and is a multimer;
   wherein the moiety is a surface antigen of the hepatitis B virus (HBsAg) and multimerises to form the virus-like particle;
   wherein the first peptide tag is a SpyTag having the amino acid sequence set out in SEQ ID NO: 30; and
   wherein the second peptide tag is a SpyCatcher having the amino acid sequence set out in SEQ ID NO: 38.

2. The composition of claim 1, wherein the antigenic component is an immunogenic component of an HCMV pentamer comprising one or more of gH, gL, pUL128, pUL130, or pUL131 subunits.

3. The composition of claim 2, wherein the first peptide tag is attached to the gH subunit.

4. The composition of claim 1, wherein the antigenic component comprises an immunogenic component of an RSV-F protein.

5. The composition of claim 4, wherein the immunogenic component of the RSV-F protein is a pre-fusion F protein.

6. The composition of claim 5, wherein the immunogenic component of the RSV pre-fusion F protein comprises a trimer of $F_1$ and $F_2$ subunits.

7. The composition of claim 4, wherein the RSV-F protein has the amino acid sequence set out in any one of SEQ ID Nos: 50, 51, 52, 56, 57, or 58.

8. The composition of claim 5, wherein the first peptide tag is attached to a C-terminus of the pre-fusion F protein.

9. The composition of claim 1, wherein the antigenic component is attached to the SpyTag via a linker.

10. The composition of claim 1, wherein the moiety is attached to the SpyCatcher through a linker.

11. The composition of claim 1, wherein the composition is an immunogenic or vaccine composition.

12. A kit comprising a composition comprising a first immunogenic composition and one or more booster composition(s) comprising a second immunogenic composition wherein said first and/or second immunogenic compositions comprise a composition as claimed in claim 1.

13. The composition of claim 2, wherein the immunogenic component of the HCMV pentamer comprises the gH, gL, PUL128, pUL130, and pUL131 subunits.

14. The composition of claim 13, wherein the gH subunit comprises a truncated transmembrane domain having an amino acid sequence as set out in SEQ ID NO: 28 or SEQ ID NO: 60.

15. A pharmaceutical composition comprising the composition of claim 1 and a pharmaceutically acceptable buffer, excipient, carrier, adjuvant, or combination thereof.

* * * * *

SEQUENCE LISTING

<160> NUMBER OF SEQ ID NOS: 60

<210> SEQ ID NO 1
<211> LENGTH: 6
<212> TYPE: PRT
<213> ORGANISM: Artificial Sequence
<220> FEATURE:
<223> OTHER INFORMATION: Flexible linker 2 - (GSG)2

<400> SEQUENCE: 1

Gly Ser Gly Gly Ser Gly
1               5

<210> SEQ ID NO 2
<211> LENGTH: 9
<212> TYPE: PRT
<213> ORGANISM: Artificial Sequence
<220> FEATURE:
<223> OTHER INFORMATION: Flexible linker 3 - (GSG)3

<400> SEQUENCE: 2

Gly Ser Gly Gly Ser Gly Gly Ser Gly
1               5

<210> SEQ ID NO 3
<211> LENGTH: 5
<212> TYPE: PRT
<213> ORGANISM: Artificial Sequence
<220> FEATURE:
<223> OTHER INFORMATION: Flexible linker 4 - (G4S)1

<400> SEQUENCE: 3

Gly Gly Gly Gly Ser
1               5

<210> SEQ ID NO 4
<211> LENGTH: 15
<212> TYPE: PRT
<213> ORGANISM: Artificial Sequence
<220> FEATURE:
<223> OTHER INFORMATION: Flexible linker 5 - (G4S)3

<400> SEQUENCE: 4

Gly Gly Gly Gly Ser Gly Gly Gly Gly Ser Gly Gly Gly Gly Ser
1               5                   10                  15

<210> SEQ ID NO 5
<211> LENGTH: 20
<212> TYPE: PRT
<213> ORGANISM: Artificial Sequence
<220> FEATURE:
<223> OTHER INFORMATION: Flexible linker 6 - (G4S)4

<400> SEQUENCE: 5

Gly Gly Gly Gly Ser Gly Gly Gly Gly Ser Gly Gly Gly Gly Ser Gly
1               5                   10                  15

Gly Gly Gly Ser
            20

<210> SEQ ID NO 6
<211> LENGTH: 12
<212> TYPE: PRT
<213> ORGANISM: Artificial Sequence
<220> FEATURE:
<223> OTHER INFORMATION: Flexible linker 7

<400> SEQUENCE: 6

```
Gly Ser Ala Gly Ser Ala Ala Gly Ser Gly Glu Phe
1               5                   10

<210> SEQ ID NO 7
<211> LENGTH: 18
<212> TYPE: PRT
<213> ORGANISM: Artificial Sequence
<220> FEATURE:
<223> OTHER INFORMATION: Flexible linker 8

<400> SEQUENCE: 7

Lys Glu Ser Gly Ser Val Ser Ser Glu Gln Leu Ala Gln Phe Arg Ser
1               5                   10                  15

Leu Asp

<210> SEQ ID NO 8
<211> LENGTH: 14
<212> TYPE: PRT
<213> ORGANISM: Artificial Sequence
<220> FEATURE:
<223> OTHER INFORMATION: Flexible linker 9

<400> SEQUENCE: 8

Glu Gly Lys Ser Ser Gly Ser Gly Ser Glu Ser Lys Ser Thr
1               5                   10

<210> SEQ ID NO 9
<211> LENGTH: 5
<212> TYPE: PRT
<213> ORGANISM: Artificial Sequence
<220> FEATURE:
<223> OTHER INFORMATION: Rigid linker 1

<400> SEQUENCE: 9

Glu Ala Ala Ala Lys
1               5

<210> SEQ ID NO 10
<211> LENGTH: 15
<212> TYPE: PRT
<213> ORGANISM: Artificial Sequence
<220> FEATURE:
<223> OTHER INFORMATION: Rigid linker 2 - (EAAAK)3

<400> SEQUENCE: 10

Glu Ala Ala Ala Lys Glu Ala Ala Ala Lys Glu Ala Ala Ala Lys
1               5                   10                  15

<210> SEQ ID NO 11
<211> LENGTH: 14
<212> TYPE: PRT
<213> ORGANISM: Artificial Sequence
<220> FEATURE:
<223> OTHER INFORMATION: Rigid linker 3 - (AP)7

<400> SEQUENCE: 11

Ala Pro Ala Pro Ala Pro Ala Pro Ala Pro Ala Pro Ala Pro
1               5                   10

<210> SEQ ID NO 12
<211> LENGTH: 2235
<212> TYPE: DNA
<213> ORGANISM: Artificial Sequence
<220> FEATURE:
<223> OTHER INFORMATION: gH-SpyTag-His
<220> FEATURE:
```

```
<221> NAME/KEY: misc_feature
<222> LOCATION: (1146)..(1146)
<223> OTHER INFORMATION: C>A mutation at position 1146
<220> FEATURE:
<221> NAME/KEY: misc_feature
<222> LOCATION: (1)..(69)
<223> OTHER INFORMATION: Signal peptide
<220> FEATURE:
<221> NAME/KEY: misc_feature
<222> LOCATION: (70)..(2151)
<223> OTHER INFORMATION: Ectodomain
<220> FEATURE:
<221> NAME/KEY: misc_feature
<222> LOCATION: (2152)..(2157)
<223> OTHER INFORMATION: Transmembrane domain (truncated)
<220> FEATURE:
<221> NAME/KEY: misc_feature
<222> LOCATION: (2158)..(2175)
<223> OTHER INFORMATION: Linker
<220> FEATURE:
<221> NAME/KEY: misc_feature
<222> LOCATION: (2176)..(2214)
<223> OTHER INFORMATION: SpyTag
<220> FEATURE:
<221> NAME/KEY: misc_feature
<222> LOCATION: (2215)..(2232)
<223> OTHER INFORMATION: 6x His tag
<220> FEATURE:
<221> NAME/KEY: misc_feature
<222> LOCATION: (2233)..(2235)
<223> OTHER INFORMATION: Stop codon

<400> SEQUENCE: 12
atgcggccag gcctcccctc ctacctcatc atcctcgccg tctgtctctt cagccaccta      60
ctttcgtcac gatatggcgc agaagccgta tccgaaccgc tggacaaagc gtttcaccta     120
ctgctcaaca cctacgggag acccatccgc ttcctgcgtg aaaataccac ccagtgtacc     180
tacaacagca gcctccgtaa cagcacggtc gtcaggaaaa acgccatcag tttcaacttt     240
ttccaaagct ataatcaata ctatgtattc catatgcctc gatgtctttt tgcgggtcct     300
ctggcggagc agtttctgaa ccaggtagat ctgaccgaaa ccctggaaag ataccaacag     360
agacttaaca cttacgcgct ggtatccaaa gacctggcca gctaccgatc tttttcgcag     420
cagctaaagg cacaagacag cctaggtgaa cagcccacca ctgtgccacc gcccattgac     480
ctgtcaatac ctcacgtttg gatgccaccg caaaccactc cacacggctg acagaatca     540 cataccacct caggactaca ccgaccacac tttaaccaga cctgtatcct ctttgatgga     600
cacgatctac tattcagcac cgtcacacct tgtttgcacc aaggcttta cctcatcgac     660 gaactacgtt acgttaaaat aacactgacc gaggacttct tcgtagttac ggtgtccata     720
gacgacgaca cacccatgct gcttatcttc ggccatcttc acgcgtact tttcaaagcg     780 ccctatcaac gcgacaactt tatactacga caaactgaaa acacgagct cctggtgcta     840 gttaagaaag atcaactgaa ccgtcactct tatctcaaag acccggactt tcttgacgcc     900
gcacttgact tcaactacct agacctcagc gcactactac gtaacagctt caccgttac     960 gccgtggatg tactcaagag cggtcgatgt cagatgctgg accgccgcac ggtagaaatg    1020
gccttcgcct acgcattagc actgttcgca gcagcccgac aagaagaggc cggcgcccaa    1080
gtctccgtcc cacgggccct agaccgccag gccgcactct acaaataca agaatttatg    1140 atcacatgcc tctcacaaac accaccacgc accacgttgc tgctgtatcc cacggccgtg    1200
gacctggcca aacgagccct ttggacaccg aatcagatca ccgacatcac cagcctcgta    1260
cgcctggtct acatactctc taaacagaat cagcaacatc tcatccccca atgggcacta    1320
cgacagatcg ccgactttgc cctaaaacta cacaaaacgc acctggcctc ttttctttca    1380
```

```
gccttcgcac gccaagaact ctacctcatg ggcagcctcg tccactccat gctggtacat    1440
acgacggaga gacgcgaaat cttcatcgta gaaacgggcc tctgttcatt ggccgagcta    1500
tcacacttta cgcagttgtt agctcatcca caccacgaat acctcagcga cctgtacaca    1560
ccctgttcca gtagcgggcg acgcgatcac tcgctcgaac gcctcacgcg tctcttcccc    1620
gatgccaccg tccccgctac cgttcccgcc gccctctcca tcctatctac catgcaacca    1680
agcacgctgg aaaccttccc cgacctgttt tgcttgccgc tcggcgaatc cttctccgcg    1740
ctgaccgtct ccgaacacgt cagttatatc gtaacaaacc agtacctgat caaaggtatc    1800
tcctaccctg tctccaccac cgtcgtaggc cagagcctca tcatcaccca gacgacagt    1860 caaactaaat gcgaactgac gcgcaacatg cataccacac acagcatcac agtggcgctc    1920
aacatttcgc tagaaaactg cgccttttgc caaagcgccc tgctagaata cgacgacacg    1980
caaggcgtca tcaacatcat gtacatgcac gactcggacg acgtcctttt cgccctggat    2040
ccctacaacg aagtggtggt ctcatctccg cgaactcact acctcatgct tttgaaaaac    2100
ggtacggtac tagaagtaac tgacgtcgtc gtggacgcca ccgacagtcg tctcctcgga    2160
agcggaggct ctggtgccca tatcgtgatg gtggacgcct acaagcctac caaacatcat    2220
caccatcacc actaa                                                    2235

<210> SEQ ID NO 13
<211> LENGTH: 2157
<212> TYPE: DNA
<213> ORGANISM: Artificial Sequence
<220> FEATURE:
<223> OTHER INFORMATION: gH with truncated transmembrane domain
<220> FEATURE:
<221> NAME/KEY: misc_feature
<222> LOCATION: (1146)..(1146)
<223> OTHER INFORMATION: C>A mutation at position 1146
<220> FEATURE:
<221> NAME/KEY: misc_feature
<222> LOCATION: (1)..(69)
<223> OTHER INFORMATION: Signal peptide
<220> FEATURE:
<221> NAME/KEY: misc_feature
<222> LOCATION: (70)..(2151)
<223> OTHER INFORMATION: Ectodomain
<220> FEATURE:
<221> NAME/KEY: misc_feature
<222> LOCATION: (2152)..(2157)
<223> OTHER INFORMATION: Transmembrane domain (truncated)

<400> SEQUENCE: 13
atgcggccag gctcccctc ctacctcatc atcctcgccg tctgtctctt cagccaccta      60
ctttcgtcac gatatggcgc agaagccgta tccgaaccgc tggacaaagc gtttcaccta     120
ctgctcaaca cctacgggag acccatccgc ttcctgcgtg aaaataccac ccagtgtacc     180
tacaacagca gcctccgtaa cagcacggtc gtcagggaaa acgccatcag tttcaacttt     240
ttccaaagct ataatcaata ctatgtattc catatgcctc gatgtctttt tgcgggtcct     300
ctggcggagc agtttctgaa ccaggtagat ctgaccgaaa ccctggaaag ataccaacag     360
agacttaaca cttacgcgct ggtatccaaa gacctggcca gctaccgatc tttttcgcag     420
cagctaaagg cacaagacag cctaggtgaa cagcccacca ctgtgccacc gcccattgac     480
ctgtcaatac ctcacgtttg gatgccaccg caaaccactc cacacggctg gacagaatca     540
cataccacct caggactaca ccgaccacac tttaaccaga cctgtatcct ctttgatgga     600
cacgatctac tattcagcac cgtcacacct tgtttgcacc aaggcttta cctcatcgac     660
```

```
gaactacgtt acgttaaaat aacactgacc gaggacttct tcgtagttac ggtgtccata    720
gacgacgaca cacccatgct gcttatcttc ggccatcttc cacgcgtact tttcaaagcg    780
ccctatcaac gcgacaactt tatactacga caaactgaaa acacgagct  cctggtgcta    840 gttaagaaag atcaactgaa ccgtcactct tatctcaaag acccggactt tcttgacgcc    900
gcacttgact tcaactacct agacctcagc gcactactac gtaacagctt tcaccgttac    960
gccgtggatg tactcaagag cggtcgatgt cagatgctgg accgccgcac ggtagaaatg    1020
gccttcgcct acgcattagc actgttcgca gcagcccgac aagaagaggc cggcgcccaa    1080
gtctccgtcc cacgggccct agaccgccag ccgcactct  tacaaataca agaatttatg    1140
atcacatgcc tctcacaaac accaccacgc accacgttgc tgctgtatcc cacggccgtg    1200
gacctggcca acgagcccct ttggacaccg aatcagatca ccgacatcac cagcctcgta    1260
cgcctggtct acatactctc taaacagaat cagcaacatc tcatcccca  atgggcacta    1320 cgacagatcg ccgactttgc cctaaaacta cacaaaacgc acctggcctc ttttctttca    1380
gccttcgcac gccaagaact ctacctcatg ggcagcctcg tccactccat gctggtacat    1440
acgacggaga gacgcgaaat cttcatcgta gaaacgggcc tctgttcatt ggccgagcta    1500
tcacacttta cgcagttgtt agctcatcca caccacgaat acctcagcga cctgtacaca    1560
ccctgttcca gtagcgggcg acgcgatcac tcgctcgaac gcctcacgcg tctcttcccc    1620
gatgccaccg tccccgctac cgttcccgcc gccctctcca tcctatctac catgcaacca    1680
agcacgctgg aaaccttccc cgacctgttt tgcttgccgc tcggcgaatc cttctccgcg    1740
ctgaccgtct ccgaacacgt cagttatatc gtaacaaacc agtacctgat caaaggtatc    1800
tcctaccctg tctccaccac cgtcgtaggc cagagcctca tcatcaccca gacggacagt    1860
caaactaaat gcgaactgac gcgcaacatg cataccacac acagcatcac agtggcgctc    1920
aacatttcgc tagaaaactg cgccttttgc caaagcgccc tgctagaata cgacgacacg    1980
caaggcgtca tcaacatcat gtacatgcac gactcggacg acgtcctttt cgccctggat    2040
ccctacaacg aagtggtggt ctcatctccg cgaactcact acctcatgct tttgaaaaac    2100
ggtacggtac tagaagtaac tgacgtcgtc gtggacgcca ccgacagtcg tctcctc      2157
```

<210> SEQ ID NO 14
<211> LENGTH: 18
<212> TYPE: DNA
<213> ORGANISM: Artificial Sequence
<220> FEATURE:
<223> OTHER INFORMATION: Linker from gH construct

<400> SEQUENCE: 14

```
ggaagcggag gctctggt                                                   18
```

<210> SEQ ID NO 15
<211> LENGTH: 39
<212> TYPE: DNA
<213> ORGANISM: Artificial Sequence
<220> FEATURE:
<223> OTHER INFORMATION: Spytag

<400> SEQUENCE: 15

```
gcccatatcg tgatggtgga cgcctacaag cctaccaaa                            39
```

<210> SEQ ID NO 16
<211> LENGTH: 837
<212> TYPE: DNA
<213> ORGANISM: Human cytomegalovirus

```
<220> FEATURE:
<221> NAME/KEY: misc_feature
<222> LOCATION: (1)..(90)
<223> OTHER INFORMATION: Signal peptide
<220> FEATURE:
<221> NAME/KEY: misc_feature
<222> LOCATION: (91)..(834)
<223> OTHER INFORMATION: Ectodomain
<220> FEATURE:
<221> NAME/KEY: misc_feature
<222> LOCATION: (835)..(837)
<223> OTHER INFORMATION: Stop codon

<400> SEQUENCE: 16
atgtgccgcc gcccggattg cggcttctct ttctcacctg gaccggtgat actgctgtgg      60
tgttgccttc tgctgcccat tgtttcctca gccgccgtca gcgtcgctcc taccgccgcc     120
gagaaagtcc ccgcggagtg ccccgaacta acgcgccgat gcttgttggg tgaggtgttt     180
gagggtgaca agtatgaaag ttggctgcgc ccgttggtga atgttaccgg gcgcgatggc     240
ccgctatcgc aacttatccg ttaccgtccc gttacgccgg aggccgccaa ctccgtgctg     300
ttggacgagg ctttcctgga cactctggcc ctgctgtaca caatccgga tcaattgcgg      360 gccctgctga cgctgttgag ctcggacaca gcgccgcgct ggatgacggt gatgcgcggc     420
tacagcgagt gcggcgatgg ctcgccggcc gtgtacacgt gcgtggacga cctgtgccgc     480
ggctacgacc tcacgcgact gtcatacggg cgcagcatct tcacgaaaca cgtgttaggc     540
ttcgagctgg tgccaccgtc tctctttaac gtggtggtgg ccatacgcaa cgaagccacg     600
cgtaccaacc cgccgtgcg tctgcccgtg agcaccgctg ccgcgcccga gggcatcacg      660
ctcttttacg gcctgtacaa cgcagtgaag gaattctgcc tgcgtcacca gctggacccg     720
ccgctgctac gccacctaga taaatactac gccggactgc cgcccgagct gaagcagacg     780
cgcgtcaacc tgccggctca ctcgcgctat ggccctcaag cagtggatgc tcgctaa       837

<210> SEQ ID NO 17
<211> LENGTH: 702
<212> TYPE: DNA
<213> ORGANISM: Artificial Sequence
<220> FEATURE:
<223> OTHER INFORMATION: UL130 - C-tag
<220> FEATURE:
<221> NAME/KEY: misc_feature
<222> LOCATION: (1)..(75)
<223> OTHER INFORMATION: Signal peptide
<220> FEATURE:
<221> NAME/KEY: misc_feature
<222> LOCATION: (76)..(642)
<223> OTHER INFORMATION: Ectodomain
<220> FEATURE:
<221> NAME/KEY: misc_feature
<222> LOCATION: (643)..(687)
<223> OTHER INFORMATION: Linker
<220> FEATURE:
<221> NAME/KEY: misc_feature
<222> LOCATION: (688)..(699)
<223> OTHER INFORMATION: C-tag
<220> FEATURE:
<221> NAME/KEY: misc_feature
<222> LOCATION: (700)..(702)
<223> OTHER INFORMATION: Stop codon

<400> SEQUENCE: 17
atgctgcggc ttctgcttcg tcaccacttt cactgcctgc ttctgtgcgc ggtttgggca      60
acgccctgtc tggcgtctcc gtggtcgacg ctaacagcaa accagaatcc gtccccgcca     120
tggtctaaac tgacgtattc caaaccgcat gacgcggcga cgtttactg tcctttctc      180
```

```
tatccctcgc ccccacgatc ccccttgcaa ttctcggggt tccagcgggt atcaacgggt    240
cccgagtgtc gcaacgagac cctgtatctg ctgtacaacc gggaaggcca gaccttggtg    300
gagagaagct ccacctgggt gaaaaaggtg atctggtacc tgagcggtcg gaaccaaacc    360
atcctccaac ggatgccccg aacggcttcg aaaccgagcg acggaaacgt gcagatcagc    420
gtggaagacg ccaagatttt tggagcgcac atggtgccca gcagaccaa gctgctacgc     480 ttcgtcgtca acgatggcac acgttatcag atgtgtgtga tgaagctgga gagctgggct    540
cacgtcttcc gggactacag cgtgtctttt caggtgcgat tgacgttcac cgaggccaat    600
aaccagactt acaccttctg cacccatccc aatctcatcg ttggaggcgg aggatctggc    660
ggaggtggaa gtggcggagg cggatctgag cccgaggcct aa                       702
```

```
<210> SEQ ID NO 18
<211> LENGTH: 642
<212> TYPE: DNA
<213> ORGANISM: Artificial Sequence
<220> FEATURE:
<223> OTHER INFORMATION: UL130 (signal sequence and ectodomain)
<220> FEATURE:
<221> NAME/KEY: misc_feature
<222> LOCATION: (1)..(75)
<223> OTHER INFORMATION: Signal peptide
<220> FEATURE:
<221> NAME/KEY: misc_feature
<222> LOCATION: (76)..(642)
<223> OTHER INFORMATION: Ectodomain

<400> SEQUENCE: 18
```

```
atgctgcggc ttctgcttcg tcaccacttt cactgcctgc ttctgtgcgc ggtttgggca    60
acgccctgtc tggcgtctcc gtggtcgacg ctaacagcaa accagaatcc gtcccgcca    120 tggtctaaac tgacgtattc caaaccgcat gacgcggcga cgttttactg tccttttctc    180
tatccctcgc ccccacgatc ccccttgcaa ttctcggggt tccagcgggt atcaacgggt    240
cccgagtgtc gcaacgagac cctgtatctg ctgtacaacc gggaaggcca gaccttggtg    300
gagagaagct ccacctgggt gaaaaaggtg atctggtacc tgagcggtcg gaaccaaacc    360
atcctccaac ggatgccccg aacggcttcg aaaccgagcg acggaaacgt gcagatcagc    420
gtggaagacg ccaagatttt tggagcgcac atggtgccca gcagaccaa gctgctacgc     480 ttcgtcgtca acgatggcac acgttatcag atgtgtgtga tgaagctgga gagctgggct    540
cacgtcttcc gggactacag cgtgtctttt caggtgcgat tgacgttcac cgaggccaat    600
aaccagactt acaccttctg cacccatccc aatctcatcg tt                       642
```

```
<210> SEQ ID NO 19
<211> LENGTH: 45
<212> TYPE: DNA
<213> ORGANISM: Artificial Sequence
<220> FEATURE:
<223> OTHER INFORMATION: Linker from UL130 construct

<400> SEQUENCE: 19
ggaggcggag gatctggcgg aggtggaagt ggcggaggcg gatct                    45
```

```
<210> SEQ ID NO 20
<211> LENGTH: 759
<212> TYPE: DNA
<213> ORGANISM: Human cytomegalovirus
<220> FEATURE:
<221> NAME/KEY: misc_feature
<222> LOCATION: (634)..(634)
<223> OTHER INFORMATION: T>C mutation at position 634
```

```
<220> FEATURE:
<221> NAME/KEY: misc_feature
<222> LOCATION: (1)..(81)
<223> OTHER INFORMATION: Signal peptide
<220> FEATURE:
<221> NAME/KEY: misc_feature
<222> LOCATION: (82)..(164)
<223> OTHER INFORMATION: Ectodomain
<220> FEATURE:
<221> NAME/KEY: Intron
<222> LOCATION: (165)..(287)
<220> FEATURE:
<221> NAME/KEY: misc_feature
<222> LOCATION: (288)..(422)
<223> OTHER INFORMATION: Ectodomain
<220> FEATURE:
<221> NAME/KEY: Intron
<222> LOCATION: (423)..(542)
<220> FEATURE:
<221> NAME/KEY: misc_feature
<222> LOCATION: (543)..(756)
<223> OTHER INFORMATION: Ectodomain
<220> FEATURE:
<221> NAME/KEY: misc_feature
<222> LOCATION: (757)..(759)
<223> OTHER INFORMATION: Stop codon

<400> SEQUENCE: 20
atgagtccca aagatctgac gccgttcttg acggcgttgt ggctgctatt gggtcacagc      60
cgcgtgccgc gggtgcgcgc agaagaatgt tgcgaattca taaacgtcaa ccacccgccg     120
gaacgctgtt acgatttcaa aatgtgcaat cgcttcaccg tcgcgtacgt attttcatga     180
ttgtctgcgt tctgtggtgc gtctggatct gtctctcgac gttttctgata gccatgttcc    240 atcgacgatc ctcgggaatg ccagagtaga ttttcatgaa tccacaggct gcggtgtccg     300
gacggcgaag tctgctacag tcccgagaaa acgctgagaa ttcgcgggat cgtcaccacc     360
atgacccatt cattgacacg ccaggtcgta cacaacaaac tgacgagctg caactacaat     420
ccgtaagtct cttcctgagg gccttacagc ctatgggaga gtaagacaga gagggacaaa    480
acatcattaa aaaaaaagt ctaatttcac gttttgtacc cccttcccc tccgtgttgt      540 aggttatacc tcgaagctga cgggcgaata cgctgcggca agtaaacga caaggcgcag     600 tacctgctgg gcgccgctgg cagcgttccc tatcgatgga tcaatctgga atacgacaag    660
ataacccgga tcgtgggcct ggatcagtac ctggagagcg ttaagaaaca caacggctg     720 gatgtgtgcc gcgctaaaat gggctatatg ctgcagtga                          759

<210> SEQ ID NO 21
<211> LENGTH: 498
<212> TYPE: DNA
<213> ORGANISM: Human cytomegalovirus
<220> FEATURE:
<221> NAME/KEY: misc_feature
<222> LOCATION: (1)..(54)
<223> OTHER INFORMATION: Signal peptide
<220> FEATURE:
<221> NAME/KEY: misc_feature
<222> LOCATION: (55)..(236)
<223> OTHER INFORMATION: Ectodomain
<220> FEATURE:
<221> NAME/KEY: Intron
<222> LOCATION: (237)..(344)
<220> FEATURE:
<221> NAME/KEY: misc_feature
<222> LOCATION: (345)..(495)
<223> OTHER INFORMATION: Ectodomain
<220> FEATURE:
<221> NAME/KEY: misc_feature
<222> LOCATION: (496)..(498)
<223> OTHER INFORMATION: Stop codon
```

<400> SEQUENCE: 21

```
atgcggctgt gtcgggtgtg gctgtctgtt tgtctgtgcg ccgtggtgct gggtcagtgc      60
cagcgggaaa ccgcggaaaa aaacgattat taccgagtac cgcattactg ggacgcgtgc     120
tctcgcgcgc tgcccgacca aacccgttac aagtatgtgg aacagctcgt ggacctcacg     180
ttgaactacc actacgatgc gagccacggc ttggacaact ttgacgtgct caagaggtga     240
gggtacgcgc taaagatgca tgacaacggg aaggtaaggg cgaacgggta acgggtaagt     300
aaccgcatgg ggtatgaaat gacgttcgga acctgtgctt gcagaatcaa cgtgaccgag     360
gtgtcgttgc tcatcagcga ctttagacgt cagaaccgtc gcggcggcac caacaaaagg     420
accacgttca acgccgccgg ttcgctggcg ccacacgccc ggagcctcga gttcagcgtg     480
cggctctttg ccaactag                                                   498
```

<210> SEQ ID NO 22
<211> LENGTH: 1008
<212> TYPE: DNA
<213> ORGANISM: Artificial Sequence
<220> FEATURE:
<223> OTHER INFORMATION: SpyCatcher-HBsAg
<220> FEATURE:
<221> NAME/KEY: misc_feature
<222> LOCATION: (1)..(276)
<223> OTHER INFORMATION: SpyCatcherDeltaN1
<220> FEATURE:
<221> NAME/KEY: misc_feature
<222> LOCATION: (277)..(303)
<223> OTHER INFORMATION: Flexible Linker
<220> FEATURE:
<221> NAME/KEY: misc_feature
<222> LOCATION: (304)..(315)
<223> OTHER INFORMATION: PVTN linker
<220> FEATURE:
<221> NAME/KEY: misc_feature
<222> LOCATION: (316)..(993)
<223> OTHER INFORMATION: HBsAg
<220> FEATURE:
<221> NAME/KEY: misc_feature
<222> LOCATION: (994)..(1005)
<223> OTHER INFORMATION: C-tag
<220> FEATURE:
<221> NAME/KEY: misc_feature
<222> LOCATION: (1006)..(1008)
<223> OTHER INFORMATION: Stop codon

<400> SEQUENCE: 22

```
gactccgcta ctcacatcaa gttctccaag agagatgagg acggtaaaga attggctggt      60
gctactatgg aattgagaga ctcctccggt aagactatct ccacttggat ttccgacggt     120
caggttaagg acttctactt gtacccaggt aagtacactt tcgttgagac tgctgctcca     180
gacggttacg aagttgctac tgctatcact ttcactgtta acgagcaggg acaggttaca     240
gttaacggta aggctactaa gggtgacgct catattggtt ctggtggatc tggtggttcc     300
ggtccagtta ctaatatgga aaacatcact tccggtttct gggtcctttt gttggttttg     360
caggctggat tcttcttgtt gactagaatc ttgactatcc cacagtcctt ggactcttgg     420
tggacttcct tgaacttctt gggtggttcc ccagtttgtt tgggtcaaaa ctctcaatcc     480
ccaacttcca accactcccc aacatcttgt ccaccaattt gtcctggtta cagatggatg     540
tgtttgagaa gattcatcat tttcttgttc atcttgttgt tgtgtttgat cttcttgttg     600
gttttgttgg actaccaggg tatgttgcca gtttgtccat tgatcccagg ttccactact     660
acaaacactg gtccatgtaa gacttgtact actccagctc agggtaactc catgttccct     720
```

```
tcatgttgtt gtactaagcc aactgacggt aactgtactt gtatcccaat tccatcctcc      780
tgggctttcg ctaagtactt gtgggaatgg gcttccgtta gattctcctg gttgtccttg      840
ttggttccat tcgttcagtg gttcgttggt ttgtccccaa ctgtttggtt gtccgctatt      900
tggatgatgt ggtactgggg tccatccttg tactctatcg tttccccatt catccctttg      960
ttgccaatct tcttctgttt gtgggtttac atcgagccag aggcttaa                  1008
```

\<210\> SEQ ID NO 23
\<211\> LENGTH: 276
\<212\> TYPE: DNA
\<213\> ORGANISM: Artificial Sequence
\<220\> FEATURE:
\<223\> OTHER INFORMATION: SpyCatcherDeltaN1

\<400\> SEQUENCE: 23

```
gactccgcta ctcacatcaa gttctccaag agagatgagg acggtaaaga attggctggt       60
gctactatgg aattgagaga ctcctccggt aagactatct ccacttggat ttccgacggt      120
caggttaagg acttctactt gtacccaggt aagtacactt cgttgagac tgctgctcca       180 gacggttacg aagttgctac tgctatcact ttcactgtta acgagcaggg acaggttaca      240
gttaacggta aggctactaa gggtgacgct catatt                                276
```

\<210\> SEQ ID NO 24
\<211\> LENGTH: 27
\<212\> TYPE: DNA
\<213\> ORGANISM: Artificial Sequence
\<220\> FEATURE:
\<223\> OTHER INFORMATION: Flexible linker from SpyCatcher-HBsAg

\<400\> SEQUENCE: 24

```
ggttctggtg gatctggtgg ttccggt                                           27
```

\<210\> SEQ ID NO 25
\<211\> LENGTH: 12
\<212\> TYPE: DNA
\<213\> ORGANISM: Artificial Sequence
\<220\> FEATURE:
\<223\> OTHER INFORMATION: PVTN linker from SpyCatcher-HbsAg

\<400\> SEQUENCE: 25

```
ccagttacta at                                                           12
```

\<210\> SEQ ID NO 26
\<211\> LENGTH: 678
\<212\> TYPE: DNA
\<213\> ORGANISM: Artificial Sequence
\<220\> FEATURE:
\<223\> OTHER INFORMATION: HBsAg

\<400\> SEQUENCE: 26

```
atggaaaaca tcacttccgg tttcttgggt cctttgttgg ttttgcaggc tggattcttc       60
ttgttgacta gaatcttgac tatcccacag tccttggact cttggtggac ttccttgaac      120
ttcttgggtg gttccccagt tgtttgggt caaaactctc aatccccaac ttccaaccac       180
tccccaacat cttgtccacc aatttgtcct ggttacagat ggatgtgttt gagaagattc      240
atcattttct tgttcatctt gttgttgtgt ttgatcttct tgttggtttt gttggactac      300
cagggtatgt tgccagtttg tccattgatc ccaggttcca ctactacaaa cactggtcca      360
tgtaagactt gtactactcc agctcagggt aactccatgt tcccttcatg ttgttgtact      420
aagccaactg acggtaactg tacttgtatc ccaattccat cctcctgggc tttcgctaag      480
```

```
tacttgtggg aatgggcttc cgttagattc tcctggttgt ccttgttggt tccattcgtt    540
cagtggttcg ttggtttgtc cccaactgtt tggttgtccg ctatttggat gatgtggtac    600
tggggtccat ccttgtactc tatcgtttcc ccattcatcc ctttgttgcc aatcttcttc    660
tgtttgtggg tttacatc                                                  678
```

```
<210> SEQ ID NO 27
<211> LENGTH: 744
<212> TYPE: PRT
<213> ORGANISM: Artificial Sequence
<220> FEATURE:
<223> OTHER INFORMATION: gH-SpyTag-His
<220> FEATURE:
<221> NAME/KEY: misc_feature
<222> LOCATION: (1)..(23)
<223> OTHER INFORMATION: Signal peptide
<220> FEATURE:
<221> NAME/KEY: misc_feature
<222> LOCATION: (24)..(717)
<223> OTHER INFORMATION: Ectodomain
<220> FEATURE:
<221> NAME/KEY: misc_feature
<222> LOCATION: (718)..(719)
<223> OTHER INFORMATION: Transmembrane domain (truncated)
<220> FEATURE:
<221> NAME/KEY: misc_feature
<222> LOCATION: (720)..(725)
<223> OTHER INFORMATION: Linker
<220> FEATURE:
<221> NAME/KEY: misc_feature
<222> LOCATION: (726)..(738)
<223> OTHER INFORMATION: Spytag
<220> FEATURE:
<221> NAME/KEY: misc_feature
<222> LOCATION: (739)..(744)
<223> OTHER INFORMATION: 6x His tag

<400> SEQUENCE: 27

Met Arg Pro Gly Leu Pro Ser Tyr Leu Ile Ile Leu Ala Val Cys Leu
1               5                   10                  15

Phe Ser His Leu Leu Ser Ser Arg Tyr Gly Ala Glu Ala Val Ser Glu
            20                  25                  30

Pro Leu Asp Lys Ala Phe His Leu Leu Asn Thr Tyr Gly Arg Pro
        35                  40                  45

Ile Arg Phe Leu Arg Glu Asn Thr Thr Gln Cys Thr Tyr Asn Ser Ser
50                  55                  60

Leu Arg Asn Ser Thr Val Val Arg Glu Asn Ala Ile Ser Phe Asn Phe
65                  70                  75                  80

Phe Gln Ser Tyr Asn Gln Tyr Tyr Val Phe His Met Pro Arg Cys Leu
                85                  90                  95

Phe Ala Gly Pro Leu Ala Glu Gln Phe Leu Asn Gln Val Asp Leu Thr
            100                 105                 110

Glu Thr Leu Glu Arg Tyr Gln Gln Arg Leu Asn Thr Tyr Ala Leu Val
        115                 120                 125

Ser Lys Asp Leu Ala Ser Tyr Arg Ser Phe Ser Gln Gln Leu Lys Ala
130                 135                 140

Gln Asp Ser Leu Gly Glu Gln Pro Thr Thr Val Pro Pro Ile Asp
145                 150                 155                 160

Leu Ser Ile Pro His Val Trp Met Pro Pro Gln Thr Thr Pro His Gly
                165                 170                 175

Trp Thr Glu Ser His Thr Thr Ser Gly Leu His Arg Pro His Phe Asn
            180                 185                 190
```

```
Gln Thr Cys Ile Leu Phe Asp Gly His Asp Leu Leu Phe Ser Thr Val
        195                 200                 205

Thr Pro Cys Leu His Gln Gly Phe Tyr Leu Ile Asp Glu Leu Arg Tyr
210                 215                 220

Val Lys Ile Thr Leu Thr Glu Asp Phe Phe Val Val Thr Val Ser Ile
225                 230                 235                 240

Asp Asp Asp Thr Pro Met Leu Leu Ile Phe Gly His Leu Pro Arg Val
                245                 250                 255

Leu Phe Lys Ala Pro Tyr Gln Arg Asp Asn Phe Ile Leu Arg Gln Thr
            260                 265                 270

Glu Lys His Glu Leu Leu Val Leu Val Lys Lys Asp Gln Leu Asn Arg
        275                 280                 285

His Ser Tyr Leu Lys Asp Pro Asp Phe Leu Asp Ala Ala Leu Asp Phe
    290                 295                 300

Asn Tyr Leu Asp Leu Ser Ala Leu Leu Arg Asn Ser Phe His Arg Tyr
305                 310                 315                 320

Ala Val Asp Val Leu Lys Ser Gly Arg Cys Gln Met Leu Asp Arg Arg
                325                 330                 335

Thr Val Glu Met Ala Phe Ala Tyr Ala Leu Ala Leu Phe Ala Ala Ala
            340                 345                 350

Arg Gln Glu Glu Ala Gly Ala Gln Val Ser Val Pro Arg Ala Leu Asp
        355                 360                 365

Arg Gln Ala Ala Leu Leu Gln Ile Gln Glu Phe Met Ile Thr Cys Leu
    370                 375                 380

Ser Gln Thr Pro Pro Arg Thr Thr Leu Leu Tyr Pro Thr Ala Val
385                 390                 395                 400

Asp Leu Ala Lys Arg Ala Leu Trp Thr Pro Asn Gln Ile Thr Asp Ile
                405                 410                 415

Thr Ser Leu Val Arg Leu Val Tyr Ile Leu Ser Lys Gln Asn Gln Gln
            420                 425                 430

His Leu Ile Pro Gln Trp Ala Leu Arg Gln Ile Ala Asp Phe Ala Leu
        435                 440                 445

Lys Leu His Lys Thr His Leu Ala Ser Phe Leu Ser Ala Phe Ala Arg
    450                 455                 460

Gln Glu Leu Tyr Leu Met Gly Ser Leu Val His Ser Met Leu Val His
465                 470                 475                 480

Thr Thr Glu Arg Arg Glu Ile Phe Ile Val Glu Thr Gly Leu Cys Ser
                485                 490                 495

Leu Ala Glu Leu Ser His Phe Thr Gln Leu Leu Ala His Pro His His
            500                 505                 510

Glu Tyr Leu Ser Asp Leu Tyr Thr Pro Cys Ser Ser Gly Arg Arg
        515                 520                 525

Asp His Ser Leu Glu Arg Leu Thr Arg Leu Phe Pro Asp Ala Thr Val
    530                 535                 540

Pro Ala Thr Val Pro Ala Ala Leu Ser Ile Leu Ser Thr Met Gln Pro
545                 550                 555                 560

Ser Thr Leu Glu Thr Phe Pro Asp Leu Phe Cys Leu Pro Leu Gly Glu
                565                 570                 575

Ser Phe Ser Ala Leu Thr Val Ser Glu His Val Ser Tyr Ile Val Thr
            580                 585                 590

Asn Gln Tyr Leu Ile Lys Gly Ile Ser Tyr Pro Val Ser Thr Thr Val
        595                 600                 605

Val Gly Gln Ser Leu Ile Ile Thr Gln Thr Asp Ser Gln Thr Lys Cys
```

```
                610             615                 620
Glu Leu Thr Arg Asn Met His Thr Thr His Ser Ile Thr Val Ala Leu
625                 630                 635                 640

Asn Ile Ser Leu Glu Asn Cys Ala Phe Cys Gln Ser Ala Leu Leu Glu
                645                 650                 655

Tyr Asp Asp Thr Gln Gly Val Ile Asn Ile Met Tyr Met His Asp Ser
                660                 665                 670

Asp Asp Val Leu Phe Ala Leu Asp Pro Tyr Asn Glu Val Val Ser
                675                 680                 685

Ser Pro Arg Thr His Tyr Leu Met Leu Leu Lys Asn Gly Thr Val Leu
                690                 695                 700

Glu Val Thr Asp Val Val Val Asp Ala Thr Asp Ser Arg Leu Leu Gly
705                 710                 715                 720

Ser Gly Gly Ser Gly Ala His Ile Val Met Val Asp Ala Tyr Lys Pro
                725                 730                 735

Thr Lys His His His His His His
            740
```

<210> SEQ ID NO 28
<211> LENGTH: 719
<212> TYPE: PRT
<213> ORGANISM: Artificial Sequence
<220> FEATURE:
<223> OTHER INFORMATION: gH with truncated transmembrane domain
<220> FEATURE:
<221> NAME/KEY: misc_feature
<222> LOCATION: (1)..(23)
<223> OTHER INFORMATION: Signal peptide
<220> FEATURE:
<221> NAME/KEY: misc_feature
<222> LOCATION: (24)..(717)
<223> OTHER INFORMATION: Ectodomain
<220> FEATURE:
<221> NAME/KEY: misc_feature
<222> LOCATION: (718)..(719)
<223> OTHER INFORMATION: Transmembrane domain (truncated)

<400> SEQUENCE: 28

```
Met Arg Pro Gly Leu Pro Ser Tyr Leu Ile Ile Leu Ala Val Cys Leu
1               5                   10                  15

Phe Ser His Leu Leu Ser Ser Arg Tyr Gly Ala Glu Ala Val Ser Glu
                20                  25                  30

Pro Leu Asp Lys Ala Phe His Leu Leu Leu Asn Thr Tyr Gly Arg Pro
            35                  40                  45

Ile Arg Phe Leu Arg Glu Asn Thr Thr Gln Cys Thr Tyr Asn Ser Ser
50                  55                  60

Leu Arg Asn Ser Thr Val Val Arg Glu Asn Ala Ile Ser Phe Asn Phe
65                  70                  75                  80

Phe Gln Ser Tyr Asn Gln Tyr Tyr Val Phe His Met Pro Arg Cys Leu
                85                  90                  95

Phe Ala Gly Pro Leu Ala Glu Gln Phe Leu Asn Gln Val Asp Leu Thr
            100                 105                 110

Glu Thr Leu Glu Arg Tyr Gln Gln Arg Leu Asn Thr Tyr Ala Leu Val
        115                 120                 125

Ser Lys Asp Leu Ala Ser Tyr Arg Ser Phe Ser Gln Gln Leu Lys Ala
        130                 135                 140

Gln Asp Ser Leu Gly Glu Gln Pro Thr Thr Val Pro Pro Pro Ile Asp
145                 150                 155                 160

Leu Ser Ile Pro His Val Trp Met Pro Pro Gln Thr Thr Pro His Gly
```

```
                    165                 170                 175
Trp Thr Glu Ser His Thr Thr Ser Gly Leu His Arg Pro His Phe Asn
                180                 185                 190
Gln Thr Cys Ile Leu Phe Asp Gly His Asp Leu Leu Phe Ser Thr Val
                195                 200                 205
Thr Pro Cys Leu His Gln Gly Phe Tyr Leu Ile Asp Glu Leu Arg Tyr
210                 215                 220
Val Lys Ile Thr Leu Thr Glu Asp Phe Phe Val Val Thr Val Ser Ile
225                 230                 235                 240
Asp Asp Asp Thr Pro Met Leu Leu Ile Phe Gly His Leu Pro Arg Val
                245                 250                 255
Leu Phe Lys Ala Pro Tyr Gln Arg Asp Asn Phe Ile Leu Arg Gln Thr
                260                 265                 270
Glu Lys His Glu Leu Leu Val Leu Val Lys Lys Asp Gln Leu Asn Arg
                275                 280                 285
His Ser Tyr Leu Lys Asp Pro Asp Phe Leu Asp Ala Ala Leu Asp Phe
                290                 295                 300
Asn Tyr Leu Asp Leu Ser Ala Leu Leu Arg Asn Ser Phe His Arg Tyr
305                 310                 315                 320
Ala Val Asp Val Leu Lys Ser Gly Arg Cys Gln Met Leu Asp Arg Arg
                325                 330                 335
Thr Val Glu Met Ala Phe Ala Tyr Ala Leu Ala Leu Phe Ala Ala Ala
                340                 345                 350
Arg Gln Glu Glu Ala Gly Ala Gln Val Ser Val Pro Arg Ala Leu Asp
                355                 360                 365
Arg Gln Ala Ala Leu Leu Gln Ile Gln Glu Phe Met Ile Thr Cys Leu
                370                 375                 380
Ser Gln Thr Pro Pro Arg Thr Thr Leu Leu Leu Tyr Pro Thr Ala Val
385                 390                 395                 400
Asp Leu Ala Lys Arg Ala Leu Trp Thr Pro Asn Gln Ile Thr Asp Ile
                405                 410                 415
Thr Ser Leu Val Arg Leu Val Tyr Ile Leu Ser Lys Gln Asn Gln Gln
                420                 425                 430
His Leu Ile Pro Gln Trp Ala Leu Arg Gln Ile Ala Asp Phe Ala Leu
                435                 440                 445
Lys Leu His Lys Thr His Leu Ala Ser Phe Leu Ser Ala Phe Ala Arg
                450                 455                 460
Gln Glu Leu Tyr Leu Met Gly Ser Leu Val His Ser Met Leu Val His
465                 470                 475                 480
Thr Thr Glu Arg Arg Glu Ile Phe Ile Val Glu Thr Gly Leu Cys Ser
                485                 490                 495
Leu Ala Glu Leu Ser His Phe Thr Gln Leu Leu Ala His Pro His His
                500                 505                 510
Glu Tyr Leu Ser Asp Leu Tyr Thr Pro Cys Ser Ser Ser Gly Arg Arg
                515                 520                 525
Asp His Ser Leu Glu Arg Leu Thr Arg Leu Phe Pro Asp Ala Thr Val
                530                 535                 540
Pro Ala Thr Val Pro Ala Ala Leu Ser Ile Leu Ser Thr Met Gln Pro
545                 550                 555                 560
Ser Thr Leu Glu Thr Phe Pro Asp Leu Phe Cys Leu Pro Leu Gly Glu
                565                 570                 575
Ser Phe Ser Ala Leu Thr Val Ser Glu His Val Ser Tyr Ile Val Thr
                580                 585                 590
```

```
Asn Gln Tyr Leu Ile Lys Gly Ile Ser Tyr Pro Val Ser Thr Thr Val
            595                 600                 605
Val Gly Gln Ser Leu Ile Ile Thr Gln Thr Asp Ser Gln Thr Lys Cys
    610                 615                 620
Glu Leu Thr Arg Asn Met His Thr Thr His Ser Ile Thr Val Ala Leu
625                 630                 635                 640
Asn Ile Ser Leu Glu Asn Cys Ala Phe Cys Gln Ser Ala Leu Leu Glu
                645                 650                 655
Tyr Asp Asp Thr Gln Gly Val Ile Asn Ile Met Tyr Met His Asp Ser
            660                 665                 670
Asp Asp Val Leu Phe Ala Leu Asp Pro Tyr Asn Glu Val Val Val Ser
        675                 680                 685
Ser Pro Arg Thr His Tyr Leu Met Leu Leu Lys Asn Gly Thr Val Leu
    690                 695                 700
Glu Val Thr Asp Val Val Val Asp Ala Thr Asp Ser Arg Leu Leu
705                 710                 715

<210> SEQ ID NO 29
<211> LENGTH: 6
<212> TYPE: PRT
<213> ORGANISM: Artificial Sequence
<220> FEATURE:
<223> OTHER INFORMATION: Linker from gH construct

<400> SEQUENCE: 29

Gly Ser Gly Gly Ser Gly
1               5

<210> SEQ ID NO 30
<211> LENGTH: 13
<212> TYPE: PRT
<213> ORGANISM: Artificial Sequence
<220> FEATURE:
<223> OTHER INFORMATION: Spytag

<400> SEQUENCE: 30

Ala His Ile Val Met Val Asp Ala Tyr Lys Pro Thr Lys
1               5                   10

<210> SEQ ID NO 31
<211> LENGTH: 278
<212> TYPE: PRT
<213> ORGANISM: Human cytomegalovirus
<220> FEATURE:
<221> NAME/KEY: misc_feature
<222> LOCATION: (1)..(30)
<223> OTHER INFORMATION: Signal peptide
<220> FEATURE:
<221> NAME/KEY: misc_feature
<222> LOCATION: (31)..(278)
<223> OTHER INFORMATION: Ectodomain

<400> SEQUENCE: 31

Met Cys Arg Arg Pro Asp Cys Gly Phe Ser Phe Ser Pro Gly Pro Val
1               5                   10                  15
Ile Leu Leu Trp Cys Cys Leu Leu Leu Pro Ile Val Ser Ser Ala Ala
            20                  25                  30
Val Ser Val Ala Pro Thr Ala Ala Glu Lys Val Pro Ala Glu Cys Pro
        35                  40                  45
Glu Leu Thr Arg Arg Cys Leu Leu Gly Glu Val Phe Glu Gly Asp Lys
    50                  55                  60
```

Tyr Glu Ser Trp Leu Arg Pro Leu Val Asn Val Thr Gly Arg Asp Gly
65                  70                  75                  80

Pro Leu Ser Gln Leu Ile Arg Tyr Arg Pro Val Thr Pro Glu Ala Ala
            85                  90                  95

Asn Ser Val Leu Leu Asp Glu Ala Phe Leu Asp Thr Leu Ala Leu Leu
            100                 105                 110

Tyr Asn Asn Pro Asp Gln Leu Arg Ala Leu Leu Thr Leu Leu Ser Ser
            115                 120                 125

Asp Thr Ala Pro Arg Trp Met Thr Val Met Arg Gly Tyr Ser Glu Cys
            130                 135                 140

Gly Asp Gly Ser Pro Ala Val Tyr Thr Cys Val Asp Asp Leu Cys Arg
145                 150                 155                 160

Gly Tyr Asp Leu Thr Arg Leu Ser Tyr Gly Arg Ser Ile Phe Thr Glu
                165                 170                 175

His Val Leu Gly Phe Glu Leu Val Pro Pro Ser Leu Phe Asn Val Val
            180                 185                 190

Val Ala Ile Arg Asn Glu Ala Thr Arg Thr Asn Arg Ala Val Arg Leu
            195                 200                 205

Pro Val Ser Thr Ala Ala Pro Glu Gly Ile Thr Leu Phe Tyr Gly
210                 215                 220

Leu Tyr Asn Ala Val Lys Glu Phe Cys Leu Arg His Gln Leu Asp Pro
225                 230                 235                 240

Pro Leu Leu Arg His Leu Asp Lys Tyr Tyr Ala Gly Leu Pro Pro Glu
                245                 250                 255

Leu Lys Gln Thr Arg Val Asn Leu Pro Ala His Ser Arg Tyr Gly Pro
            260                 265                 270

Gln Ala Val Asp Ala Arg
            275

<210> SEQ ID NO 32
<211> LENGTH: 233
<212> TYPE: PRT
<213> ORGANISM: Artificial Sequence
<220> FEATURE:
<223> OTHER INFORMATION: UL130 - C-tag
<220> FEATURE:
<221> NAME/KEY: misc_feature
<222> LOCATION: (1)..(25)
<223> OTHER INFORMATION: Signal peptide
<220> FEATURE:
<221> NAME/KEY: misc_feature
<222> LOCATION: (26)..(214)
<223> OTHER INFORMATION: Ectodomain
<220> FEATURE:
<221> NAME/KEY: misc_feature
<222> LOCATION: (215)..(229)
<223> OTHER INFORMATION: Linker
<220> FEATURE:
<221> NAME/KEY: misc_feature
<222> LOCATION: (230)..(233)
<223> OTHER INFORMATION: C-tag

<400> SEQUENCE: 32

Met Leu Arg Leu Leu Arg His His Phe His Cys Leu Leu Leu Cys
1               5                   10                  15

Ala Val Trp Ala Thr Pro Cys Leu Ala Ser Pro Trp Ser Thr Leu Thr
            20                  25                  30

Ala Asn Gln Asn Pro Ser Pro Pro Trp Ser Lys Leu Thr Tyr Ser Lys
        35                  40                  45

Pro His Asp Ala Ala Thr Phe Tyr Cys Pro Phe Leu Tyr Pro Ser Pro
50                  55                  60

-continued

Pro Arg Ser Pro Leu Gln Phe Ser Gly Phe Gln Arg Val Ser Thr Gly
65                  70                  75                  80

Pro Glu Cys Arg Asn Glu Thr Leu Tyr Leu Leu Tyr Asn Arg Glu Gly
                85                  90                  95

Gln Thr Leu Val Glu Arg Ser Ser Thr Trp Val Lys Lys Val Ile Trp
            100                 105                 110

Tyr Leu Ser Gly Arg Asn Gln Thr Ile Leu Gln Arg Met Pro Arg Thr
        115                 120                 125

Ala Ser Lys Pro Ser Asp Gly Asn Val Gln Ile Ser Val Glu Asp Ala
130                 135                 140

Lys Ile Phe Gly Ala His Met Val Pro Lys Gln Thr Lys Leu Leu Arg
145                 150                 155                 160

Phe Val Val Asn Asp Gly Thr Arg Tyr Gln Met Cys Val Met Lys Leu
                165                 170                 175

Glu Ser Trp Ala His Val Phe Arg Asp Tyr Ser Val Ser Phe Gln Val
            180                 185                 190

Arg Leu Thr Phe Thr Glu Ala Asn Asn Gln Thr Tyr Thr Phe Cys Thr
        195                 200                 205

His Pro Asn Leu Ile Val Gly Gly Gly Ser Gly Gly Gly Gly Ser
    210                 215                 220

Gly Gly Gly Gly Ser Glu Pro Glu Ala
225                 230

<210> SEQ ID NO 33
<211> LENGTH: 214
<212> TYPE: PRT
<213> ORGANISM: Artificial Sequence
<220> FEATURE:
<223> OTHER INFORMATION: UL130 (signal sequence and ectodomain)
<220> FEATURE:
<221> NAME/KEY: misc_feature
<222> LOCATION: (1)..(25)
<223> OTHER INFORMATION: Signal peptide
<220> FEATURE:
<221> NAME/KEY: misc_feature
<222> LOCATION: (26)..(214)
<223> OTHER INFORMATION: Ectodomain

<400> SEQUENCE: 33

Met Leu Arg Leu Leu Arg His His Phe His Cys Leu Leu Leu Cys
1               5                   10                  15

Ala Val Trp Ala Thr Pro Cys Leu Ala Ser Pro Trp Ser Thr Leu Thr
            20                  25                  30

Ala Asn Gln Asn Pro Ser Pro Pro Trp Ser Lys Leu Thr Tyr Ser Lys
        35                  40                  45

Pro His Asp Ala Ala Thr Phe Tyr Cys Pro Phe Leu Tyr Pro Ser Pro
    50                  55                  60

Pro Arg Ser Pro Leu Gln Phe Ser Gly Phe Gln Arg Val Ser Thr Gly
65                  70                  75                  80

Pro Glu Cys Arg Asn Glu Thr Leu Tyr Leu Leu Tyr Asn Arg Glu Gly
                85                  90                  95

Gln Thr Leu Val Glu Arg Ser Ser Thr Trp Val Lys Lys Val Ile Trp
            100                 105                 110

Tyr Leu Ser Gly Arg Asn Gln Thr Ile Leu Gln Arg Met Pro Arg Thr
        115                 120                 125

Ala Ser Lys Pro Ser Asp Gly Asn Val Gln Ile Ser Val Glu Asp Ala
130                 135                 140

Lys Ile Phe Gly Ala His Met Val Pro Lys Gln Thr Lys Leu Leu Arg
145                 150                 155                 160

Phe Val Val Asn Asp Gly Thr Arg Tyr Gln Met Cys Val Met Lys Leu
            165                 170                 175

Glu Ser Trp Ala His Val Phe Arg Asp Tyr Ser Val Ser Phe Gln Val
            180                 185                 190

Arg Leu Thr Phe Thr Glu Ala Asn Asn Gln Thr Tyr Thr Phe Cys Thr
            195                 200                 205

His Pro Asn Leu Ile Val
            210

<210> SEQ ID NO 34
<211> LENGTH: 15
<212> TYPE: PRT
<213> ORGANISM: Artificial Sequence
<220> FEATURE:
<223> OTHER INFORMATION: Linker from UL130 construct

<400> SEQUENCE: 34

Gly Gly Gly Gly Ser Gly Gly Gly Gly Ser Gly Gly Gly Gly Ser
1               5                   10                  15

<210> SEQ ID NO 35
<211> LENGTH: 171
<212> TYPE: PRT
<213> ORGANISM: Human cytomegalovirus
<220> FEATURE:
<221> NAME/KEY: misc_feature
<222> LOCATION: (1)..(27)
<223> OTHER INFORMATION: Signal peptide
<220> FEATURE:
<221> NAME/KEY: misc_feature
<222> LOCATION: (28)..(171)
<223> OTHER INFORMATION: Ectodomain

<400> SEQUENCE: 35

Met Ser Pro Lys Asp Leu Thr Pro Phe Leu Thr Ala Leu Trp Leu Leu
1               5                   10                  15

Leu Gly His Ser Arg Val Pro Arg Val Arg Ala Glu Glu Cys Cys Glu
            20                  25                  30

Phe Ile Asn Val Asn His Pro Pro Glu Arg Cys Tyr Asp Phe Lys Met
            35                  40                  45

Cys Asn Arg Phe Thr Val Ala Leu Arg Cys Pro Asp Gly Glu Val Cys
50                  55                  60

Tyr Ser Pro Glu Lys Thr Ala Glu Ile Arg Gly Ile Val Thr Thr Met
65                  70                  75                  80

Thr His Ser Leu Thr Arg Gln Val Val His Asn Lys Leu Thr Ser Cys
            85                  90                  95

Asn Tyr Asn Pro Leu Tyr Leu Glu Ala Asp Gly Arg Ile Arg Cys Gly
            100                 105                 110

Lys Val Asn Asp Lys Ala Gln Tyr Leu Leu Gly Ala Ala Gly Ser Val
            115                 120                 125

Pro Tyr Arg Trp Ile Asn Leu Glu Tyr Asp Lys Ile Thr Arg Ile Val
            130                 135                 140

Gly Leu Asp Gln Tyr Leu Glu Ser Val Lys His Lys Arg Leu Asp
145                 150                 155                 160

Val Cys Arg Ala Lys Met Gly Tyr Met Leu Gln
            165                 170

<210> SEQ ID NO 36

```
<211> LENGTH: 129
<212> TYPE: PRT
<213> ORGANISM: Human cytomegalovirus
<220> FEATURE:
<221> NAME/KEY: misc_feature
<222> LOCATION: (1)..(18)
<223> OTHER INFORMATION: Signal peptide
<220> FEATURE:
<221> NAME/KEY: misc_feature
<222> LOCATION: (19)..(129)
<223> OTHER INFORMATION: Ectodomain

<400> SEQUENCE: 36

Met Arg Leu Cys Arg Val Trp Leu Ser Val Cys Leu Cys Ala Val Val
1               5                   10                  15

Leu Gly Gln Cys Gln Arg Glu Thr Ala Glu Lys Asn Asp Tyr Tyr Arg
            20                  25                  30

Val Pro His Tyr Trp Asp Ala Cys Ser Arg Ala Leu Pro Asp Gln Thr
        35                  40                  45

Arg Tyr Lys Tyr Val Glu Gln Leu Val Asp Leu Thr Leu Asn Tyr His
    50                  55                  60

Tyr Asp Ala Ser His Gly Leu Asp Asn Phe Asp Val Leu Lys Arg Ile
65                  70                  75                  80

Asn Val Thr Glu Val Ser Leu Leu Ile Ser Asp Phe Arg Arg Gln Asn
                85                  90                  95

Arg Arg Gly Gly Thr Asn Lys Arg Thr Thr Phe Asn Ala Ala Gly Ser
            100                 105                 110

Leu Ala Pro His Ala Arg Ser Leu Glu Phe Ser Val Arg Leu Phe Ala
        115                 120                 125

Asn

<210> SEQ ID NO 37
<211> LENGTH: 335
<212> TYPE: PRT
<213> ORGANISM: Artificial Sequence
<220> FEATURE:
<223> OTHER INFORMATION: SpyCatcher-HBsAg
<220> FEATURE:
<221> NAME/KEY: misc_feature
<222> LOCATION: (1)..(92)
<223> OTHER INFORMATION: SpycatcherDeltaN1
<220> FEATURE:
<221> NAME/KEY: misc_feature
<222> LOCATION: (93)..(101)
<223> OTHER INFORMATION: Flexible Linker
<220> FEATURE:
<221> NAME/KEY: misc_feature
<222> LOCATION: (102)..(105)
<223> OTHER INFORMATION: PVTN linker
<220> FEATURE:
<221> NAME/KEY: misc_feature
<222> LOCATION: (106)..(331)
<223> OTHER INFORMATION: HBsAg
<220> FEATURE:
<221> NAME/KEY: misc_feature
<222> LOCATION: (332)..(335)
<223> OTHER INFORMATION: C-tag

<400> SEQUENCE: 37

Asp Ser Ala Thr His Ile Lys Phe Ser Lys Arg Asp Glu Asp Gly Lys
1               5                   10                  15

Glu Leu Ala Gly Ala Thr Met Glu Leu Arg Asp Ser Ser Gly Lys Thr
            20                  25                  30

Ile Ser Thr Trp Ile Ser Asp Gly Gln Val Lys Asp Phe Tyr Leu Tyr
        35                  40                  45
```

-continued

```
Pro Gly Lys Tyr Thr Phe Val Glu Thr Ala Ala Pro Asp Gly Tyr Glu
 50                  55                  60

Val Ala Thr Ala Ile Thr Phe Thr Val Asn Glu Gln Gly Gln Val Thr
 65                  70                  75                  80

Val Asn Gly Lys Ala Thr Lys Gly Asp Ala His Ile Gly Ser Gly Gly
                 85                  90                  95

Ser Gly Gly Ser Gly Pro Val Thr Asn Met Glu Asn Ile Thr Ser Gly
                100                 105                 110

Phe Leu Gly Pro Leu Leu Val Leu Gln Ala Gly Phe Phe Leu Leu Thr
                115                 120                 125

Arg Ile Leu Thr Ile Pro Gln Ser Leu Asp Ser Trp Trp Thr Ser Leu
130                 135                 140

Asn Phe Leu Gly Gly Ser Pro Val Cys Leu Gly Gln Asn Ser Gln Ser
145                 150                 155                 160

Pro Thr Ser Asn His Ser Pro Thr Ser Cys Pro Pro Ile Cys Pro Gly
                165                 170                 175

Tyr Arg Trp Met Cys Leu Arg Arg Phe Ile Ile Phe Leu Phe Ile Leu
                180                 185                 190

Leu Leu Cys Leu Ile Phe Leu Leu Val Leu Leu Asp Tyr Gln Gly Met
                195                 200                 205

Leu Pro Val Cys Pro Leu Ile Pro Gly Ser Thr Thr Thr Asn Thr Gly
210                 215                 220

Pro Cys Lys Thr Cys Thr Thr Pro Ala Gln Gly Asn Ser Met Phe Pro
225                 230                 235                 240

Ser Cys Cys Cys Thr Lys Pro Thr Asp Gly Asn Cys Thr Cys Ile Pro
                245                 250                 255

Ile Pro Ser Ser Trp Ala Phe Ala Lys Tyr Leu Trp Glu Trp Ala Ser
                260                 265                 270

Val Arg Phe Ser Trp Leu Ser Leu Leu Val Pro Phe Val Gln Trp Phe
                275                 280                 285

Val Gly Leu Ser Pro Thr Val Trp Leu Ser Ala Ile Trp Met Met Trp
                290                 295                 300

Tyr Trp Gly Pro Ser Leu Tyr Ser Ile Val Ser Pro Phe Ile Pro Leu
305                 310                 315                 320

Leu Pro Ile Phe Phe Cys Leu Trp Val Tyr Ile Glu Pro Glu Ala
                325                 330                 335

<210> SEQ ID NO 38
<211> LENGTH: 92
<212> TYPE: PRT
<213> ORGANISM: Artificial Sequence
<220> FEATURE:
<223> OTHER INFORMATION: SpyCatcherDeltaN1

<400> SEQUENCE: 38

Asp Ser Ala Thr His Ile Lys Phe Ser Lys Arg Asp Glu Asp Gly Lys
 1               5                  10                  15

Glu Leu Ala Gly Ala Thr Met Glu Leu Arg Asp Ser Ser Gly Lys Thr
                 20                  25                  30

Ile Ser Thr Trp Ile Ser Asp Gly Gln Val Lys Asp Phe Tyr Leu Tyr
                 35                  40                  45

Pro Gly Lys Tyr Thr Phe Val Glu Thr Ala Ala Pro Asp Gly Tyr Glu
                 50                  55                  60

Val Ala Thr Ala Ile Thr Phe Thr Val Asn Glu Gln Gly Gln Val Thr
 65                  70                  75                  80
```

Val Asn Gly Lys Ala Thr Lys Gly Asp Ala His Ile
                85                  90

<210> SEQ ID NO 39
<211> LENGTH: 9
<212> TYPE: PRT
<213> ORGANISM: Artificial Sequence
<220> FEATURE:
<223> OTHER INFORMATION: Flexible linker from SpyCatcher-HBsAg

<400> SEQUENCE: 39

Gly Ser Gly Gly Ser Gly Gly Ser Gly
1               5

<210> SEQ ID NO 40
<211> LENGTH: 4
<212> TYPE: PRT
<213> ORGANISM: Artificial Sequence
<220> FEATURE:
<223> OTHER INFORMATION: PVTN linker from SpyCatcher-HBsAg

<400> SEQUENCE: 40

Pro Val Thr Asn
1

<210> SEQ ID NO 41
<211> LENGTH: 226
<212> TYPE: PRT
<213> ORGANISM: Artificial Sequence
<220> FEATURE:
<223> OTHER INFORMATION: HBsAg

<400> SEQUENCE: 41

Met Glu Asn Ile Thr Ser Gly Phe Leu Gly Pro Leu Leu Val Leu Gln
1               5                   10                  15

Ala Gly Phe Phe Leu Leu Thr Arg Ile Leu Thr Ile Pro Gln Ser Leu
                20                  25                  30

Asp Ser Trp Trp Thr Ser Leu Asn Phe Leu Gly Gly Ser Pro Val Cys
            35                  40                  45

Leu Gly Gln Asn Ser Gln Ser Pro Thr Ser Asn His Ser Pro Thr Ser
        50                  55                  60

Cys Pro Pro Ile Cys Pro Gly Tyr Arg Trp Met Cys Leu Arg Arg Phe
65                  70                  75                  80

Ile Ile Phe Leu Phe Ile Leu Leu Leu Cys Leu Ile Phe Leu Leu Val
                85                  90                  95

Leu Leu Asp Tyr Gln Gly Met Leu Pro Val Cys Pro Leu Ile Pro Gly
            100                 105                 110

Ser Thr Thr Thr Asn Thr Gly Pro Cys Lys Thr Cys Thr Thr Pro Ala
        115                 120                 125

Gln Gly Asn Ser Met Phe Pro Ser Cys Cys Cys Thr Lys Pro Thr Asp
    130                 135                 140

Gly Asn Cys Thr Cys Ile Pro Ile Pro Ser Ser Trp Ala Phe Ala Lys
145                 150                 155                 160

Tyr Leu Trp Glu Trp Ala Ser Val Arg Phe Ser Trp Leu Ser Leu Leu
                165                 170                 175

Val Pro Phe Val Gln Trp Phe Val Gly Leu Ser Pro Thr Val Trp Leu
            180                 185                 190

Ser Ala Ile Trp Met Met Trp Tyr Trp Gly Pro Ser Leu Tyr Ser Ile
        195                 200                 205

Val Ser Pro Phe Ile Pro Leu Leu Pro Ile Phe Phe Cys Leu Trp Val

Tyr Ile
225

<210> SEQ ID NO 42
<211> LENGTH: 2235
<212> TYPE: DNA
<213> ORGANISM: Artificial Sequence
<220> FEATURE:
<223> OTHER INFORMATION: gH-(GSG)2-SpyTag-His (without introns)
     optimised for CHO expression
<220> FEATURE:
<221> NAME/KEY: misc_feature
<222> LOCATION: (1)..(69)
<223> OTHER INFORMATION: gH signal peptide
<220> FEATURE:
<221> NAME/KEY: misc_feature
<222> LOCATION: (70)..(2151)
<223> OTHER INFORMATION: gH ectodomain
<220> FEATURE:
<221> NAME/KEY: misc_feature
<222> LOCATION: (2152)..(2157)
<223> OTHER INFORMATION: gH truncated transmembrane domain
<220> FEATURE:
<221> NAME/KEY: misc_feature
<222> LOCATION: (2158)..(2175)
<223> OTHER INFORMATION: (GSG)2 linker
<220> FEATURE:
<221> NAME/KEY: misc_feature
<222> LOCATION: (2176)..(2214)
<223> OTHER INFORMATION: Spytag
<220> FEATURE:
<221> NAME/KEY: misc_feature
<222> LOCATION: (2215)..(2232)
<223> OTHER INFORMATION: Histag
<220> FEATURE:
<221> NAME/KEY: misc_feature
<222> LOCATION: (2233)..(2235)
<223> OTHER INFORMATION: Stop codon

<400> SEQUENCE: 42
atgaggcctg gcctgccttc ttatctgatc atcctggccg tgtgcctgtt ctcccatctg    60
ctgtcctcta gatacggcgc cgaggctgtg tctgagcctc tggataaggc cttctcatctg   120 ctgctgaaca cctacggcag acctatccgg ttcctgcgcg agaacaccac acagtgcacc   180
tacaactcca gcctgcggaa ctccacagtc gtgcgggaaa acgccatctc cttcaacttt   240
ttccagtcct acaaccagta ctatgtgttc cacatgcctc ctgcctgtt cgctggacct    300 ctggctgagc agttcctgaa ccaggtggac ctgaccgaga cactggaaag ataccagcag   360
cggctgaaca catatgccct ggtgtctaag gacctggcct cctacagatc cttcagccag   420
cagctgaagg ctcaggactc tctgggagag cagcctacaa cagtgcctcc tcctatcgac   480
ctgtctatcc tcacgtgtg gatgcctcca cagaccacac tcatggctg accgagtct     540 cataccacct ctggcctgca ccggcctcac ttcaaccaga cctgcatcct gttcgacggc   600
cacgacctgc tgttctccac cgtgacacca tgtctgcacc agggcttcta cctgatcgac   660
gagctgagat acgtgaagat acccctgaca gaggacttct cgtggtcac cgtgtccatc   720 gacgacgaca cccctatgct gctgatcttc ggccatctgc tcgggtgct gttcaaggcc   780 ccttaccagc gggacaactt catcctgaga cagaccgaga gcacgagct gctggtgctg   840 gtcaagaagg accagctgaa ccggcactcc tacctgaagg accctgactt cctggacgcc   900
gctctggact tcaactacct ggatctgagc gccctgctgc ggaacagctt cacagatac   960 gccgtggacg tgctgaagtc tggcagatgc agatgctgg acagcggac cgtggaaatg   1020 gccttcgctt acgccctggc tctgtttgcc gccgctagac aagaagaggc tggcgcccaa   1080

```
gtgtccgtgc ctagagcact ggatagacaa gccgctctgc tgcagatcca agagttcatg    1140
atcacatgcc tgtctcagac ccctcctcgg accacactgc tgctgtatcc taccgctgtg    1200
gatctggcca agagggctct gtggaccccct aaccagatca ccgacatcac atccctcgtg    1260
cggctggtgt acatcctgtc caagcagaac cagcagcatc tgatccctca gtgggccctg    1320
aggcagatcg ctgattttgc cctgaagctg cacaagaccc acctggccag ctttctgtct    1380
gccttcgcca gacaagagct gtacctgatg gcagcctgg tgcactctat gctggtgcat    1440
accaccgagc ggcgcgagat cttcatcgtg aaaccggcc tgtgttccct ggccgagctg    1500
tctcacttta cccagctgct cgctcaccct caccacgagt acctgtccga cctgtacacc    1560
ccttgctcct ctagcggcag aagggaccac agcctggaaa gactgacccg gctgttccct    1620
gatgccaccg tgcctgctac agttcctgcc gctctgtcca tcctgagcac catgcagcct    1680
tccactctgg aaacattccc cgacctgttc tgcctgcctc tgggcgagtc tttttctgcc    1740
ctgaccgtgt ccgagcacgt gtcctacatc gtgaccaatc agtacctgat caagggcatc    1800 agctacccccg tgtccacaac cgtcgttggc cagagcctga tcatcaccca gaccgactct    1860
cagaccaagt gcgagctgac ccggaacatg cacacaaccc actccatcac cgtggctctg    1920
aacatctccc tggaaaactg cgccttctgc cagtctgccc tgctggaata cgatgacacc    1980
cagggcgtga tcaacatcat gtatatgcac gactccgacg acgtgctgtt tgccctggat    2040
ccttacaacg aggtggtggt gtctagcccc agaacacact acctgatgct gctcaagaac    2100
ggcaccgtgc tggaagtgac cgacgtggtg gtggacgcca ccgattctag attgctcggc    2160
tctggtggct ccggcgctca tatcgtgatg gtggatgctt acaagcccac caagcaccat    2220
catcaccacc actaa                                                      2235

<210> SEQ ID NO 43
<211> LENGTH: 837
<212> TYPE: DNA
<213> ORGANISM: Artificial Sequence
<220> FEATURE:
<223> OTHER INFORMATION: gL (without introns) optimised for CHO
      expression
<220> FEATURE:
<221> NAME/KEY: misc_feature
<222> LOCATION: (1)..(90)
<223> OTHER INFORMATION: gL signal peptide
<220> FEATURE:
<221> NAME/KEY: misc_feature
<222> LOCATION: (91)..(834)
<223> OTHER INFORMATION: gL ectodomain
<220> FEATURE:
<221> NAME/KEY: misc_feature
<222> LOCATION: (835)..(837)
<223> OTHER INFORMATION: Stop codon

<400> SEQUENCE: 43
atgtgcagaa ggcctgactg cggcttctcc ttctctcccg gacctgtgat cctgctgtgg      60
tgctgtctgc tgctgcccat cgtttcttcc gccgctgtgt ctgtggctcc taccgctgct     120
gaaaaggtgc cagctgagtg tcccgagctg accagaagat gtctgctggg cgaagtgttc     180
gagggcgata agtacgagtc ttggctgcgg cctctggtca acgtgaccgg aagagatgga     240
cccctgagcc agctgatccg gtacagacct gtgacacctg aggccgccaa ttccgtgctg     300
ctggatgagg ccttcctgga cacactggcc ctgctgtaca caaccccga tcagctgaga     360 gccctgctga ccctgctgtc ctctgatacc gctcctagag gatgaccgt gatgcggggc     420 tactctgagt gcggagatgg aagcccagcc gtgtacacct gtgtggacga tctgtgcaga     480
```

```
ggctacgacc tgaccagact gtcctacggc cggtccatct ttaccgagca tgtgctgggc    540
tttgagctgg tgcctcctag cctgttcaat gtggtggtgg ccatccggaa tgaggccacc    600
agaacaaata gagccgtgcg gctgcctgtg tctacagctg ctgctcctga gggcatcacc    660
ctgttctacg gcctgtacaa cgccgtgaaa gagttctgcc tgagacacca gctggaccct    720
ccactgctga ggcacctgga taagtactac gctggcctgc tcctgagct gaagcagacc    780 agagtgaacc tgcctgctca ctccagatac ggccctcagg ctgtggacgc cagataa      837
```

<210> SEQ ID NO 44
<211> LENGTH: 516
<212> TYPE: DNA
<213> ORGANISM: Artificial Sequence
<220> FEATURE:
<223> OTHER INFORMATION: UL128 (without introns) optimised for CHO
      expression
<220> FEATURE:
<221> NAME/KEY: misc_feature
<222> LOCATION: (1)..(81)
<223> OTHER INFORMATION: UL128 signal peptide
<220> FEATURE:
<221> NAME/KEY: misc_feature
<222> LOCATION: (82)..(513)
<223> OTHER INFORMATION: UL128 ectodomain
<220> FEATURE:
<221> NAME/KEY: misc_feature
<222> LOCATION: (514)..(516)
<223> OTHER INFORMATION: Stop codon

<400> SEQUENCE: 44

```
atgtcccta aggatctgac ccctttcctg accgctctgt ggctgctgct gggccattct     60
agagtgccta gagtcagagc cgaggaatgc tgcgagttca tcaacgtgaa ccatcctcca    120
gagcggtgct acgacttcaa gatgtgcaac agattcaccg tggctctgcg gtgccctgat    180
ggcgaagtgt gctactcccc tgaaaagacc gccgagatca gaggcatcgt gaccaccatg    240
acacactccc tgaccagaca ggtggtgcac aacaagctga ccagctgcaa ctacaaccct    300
ctgtacctgg aagccgacgg cagaatcaga tgcggcaaag tgaacgacaa ggcccagtac    360
ctgttgggcg ctgctggctc tgtgccctac agatggatca acctggaata cgacaagatc    420
acccggatcg tcggcctgga ccagtatctg gaatccgtga agaagcacaa gcggctggac    480
gtgtgcagag ccaagatggg ctatatgctg cagtaa                              516
```

<210> SEQ ID NO 45
<211> LENGTH: 702
<212> TYPE: DNA
<213> ORGANISM: Artificial Sequence
<220> FEATURE:
<223> OTHER INFORMATION: UL130-(G4S)3 - C-tag (without introns)
      optimised for CHO expression
<220> FEATURE:
<221> NAME/KEY: misc_feature
<222> LOCATION: (1)..(75)
<223> OTHER INFORMATION: UL130 signal peptide
<220> FEATURE:
<221> NAME/KEY: misc_feature
<222> LOCATION: (76)..(642)
<223> OTHER INFORMATION: UL130 ectodomain
<220> FEATURE:
<221> NAME/KEY: misc_feature
<222> LOCATION: (643)..(687)
<223> OTHER INFORMATION: (G4S)3 linker
<220> FEATURE:
<221> NAME/KEY: misc_feature
<222> LOCATION: (688)..(699)
<223> OTHER INFORMATION: C-tag
<220> FEATURE:

```
<221> NAME/KEY: misc_feature
<222> LOCATION: (700)..(702)
<223> OTHER INFORMATION: Stop codon

<400> SEQUENCE: 45
atgctgagac tgctgctgag acaccacttc cactgcctgc tgctgtgtgc cgtttgggct    60
acaccttgtc tggcctctcc atggtctacc ctgaccgcca accagaatcc ttctccacct   120
tggtccaagc tgacctactc caagcctcac gatgccgcta ccttctactg ccccttcctg   180
tacccatctc cacctcggag ccctctgcag ttctctggct tccagagagt gtccaccgga   240
cctgagtgcc ggaacgagac actgtacctg ctgtacaacc gcgagggcca gacactggtg   300
gaaagatcct ctacctgggt caagaaagtg atctggtatc tgagcggccg gaaccagacc   360
atcctgcaga gaatgcctcg gaccgcctct aagccttctg acggcaacgt gcagatctcc   420
gtggaagatg ccaagatctt cggcgcccac atggtgccca agcagaccaa actgctgaga   480
ttcgtggtca cgacggcac ccgctaccag atgtgcgtga tgaagctgga aagctgggcc   540
cacgtgttcc gggattactc cgtgtctttc caagtgcggc tgaccttcac cgaggccaac   600
aaccagacct acaccttctg cacccatcct aacctgatcg tcggaggcgg aggatctggc   660
ggaggtggaa gtggcggagg cggatctgag cccgaggcct aa                      702

<210> SEQ ID NO 46
<211> LENGTH: 390
<212> TYPE: DNA
<213> ORGANISM: Artificial Sequence
<220> FEATURE:
<223> OTHER INFORMATION: UL131A (without introns) optimised for CHO
      expression
<220> FEATURE:
<221> NAME/KEY: misc_feature
<222> LOCATION: (1)..(54)
<223> OTHER INFORMATION: UL131 signal peptide
<220> FEATURE:
<221> NAME/KEY: misc_feature
<222> LOCATION: (55)..(387)
<223> OTHER INFORMATION: UL131 ectodomain
<220> FEATURE:
<221> NAME/KEY: misc_feature
<222> LOCATION: (388)..(390)
<223> OTHER INFORMATION: Stop codon

<400> SEQUENCE: 46
atgagactgt gcagagtgtg gctgtccgtg tgcctgtgtg ctgtggttct gggccagtgc    60
cagagagaga cagccgagaa gaacgactac tacagagtgc cccactactg gacgcctgc   120 agtagagctt tgcccgatca gacccggtac aaatacgtgg aacagctggt ggatctgacc   180
ctgaactacc actacgacgc ctctcacggc ctggacaact tcgacgtgct gaagcggatc   240
aacgtgaccg aggtgtccct gctgatctct gacttccggc ggcagaatag aagaggcgga   300
accaacaagc ggaccacctt taatgctgcc ggctctctgg ctccccacgc cagatctctg   360
gaattttccg tgcggctgtt cgccaactaa                                     390

<210> SEQ ID NO 47
<211> LENGTH: 1587
<212> TYPE: DNA
<213> ORGANISM: Artificial Sequence
<220> FEATURE:
<223> OTHER INFORMATION: RSV-F-SpyTag-Ctag
<220> FEATURE:
<221> NAME/KEY: misc_feature
<222> LOCATION: (1)..(75)
<223> OTHER INFORMATION: Signal peptide
<220> FEATURE:
```

```
<221> NAME/KEY: misc_feature
<222> LOCATION: (1435)..(1515)
<223> OTHER INFORMATION: Foldon domain
<220> FEATURE:
<221> NAME/KEY: misc_feature
<222> LOCATION: (1516)..(1533)
<223> OTHER INFORMATION: (GSG)2 linker
<220> FEATURE:
<221> NAME/KEY: misc_feature
<222> LOCATION: (1534)..(1572)
<223> OTHER INFORMATION: Spytag
<220> FEATURE:
<221> NAME/KEY: misc_feature
<222> LOCATION: (1573)..(1584)
<223> OTHER INFORMATION: Ctag
<220> FEATURE:
<221> NAME/KEY: misc_feature
<222> LOCATION: (1585)..(1587)
<223> OTHER INFORMATION: Stop codon

<400> SEQUENCE: 47
atggaactgc tgatcctgaa ggccaacgcc atcaccacca tcctgaccgc cgtgaccttc      60
tgcttcgcca gcggccagaa catcaccgag gaattctacc agagcacctg cagcgccgtg     120
agcaagggct acctgagcgc cctgcggacc ggctggtaca ccagcgtgat caccatcgag     180
ctgtccaaca tcaagaaaaa caagtgcaac ggcaccgacg ccaaagtgaa gctgatcaag     240
caggaactgg acaagtacaa gaacgccgtg accgagctgc agctgctgat gcagagcacc     300
cccgccaccg gatctggcag cgccatttgc agcggcgtgg ccgtgtgtaa agtgctgcac     360
ctggaaggcg aagtgaacaa gatcaagtcc gccctgctgt ccaccaacaa ggccgtggtg     420
tccctgagca cggcgtgag cgtgctgacc ttcaaggtgc tggatctgaa gaactacatc     480
gacaagcagc tgctgcccat cctgaacaag cagagctgca gcatcagcaa catcgagaca     540
gtgatcgagt tccagcagaa gaacaaccgg ctgctggaaa tcacccggga gttcagcgtg     600
aacgccggag tgaccacccc cgtgtccacc tacatgctga ccaacagcga gctgctgtcc     660
ctgatcaatg acatgcccat caccaacgac cagaaaaagc tgatgagcaa caacgtgcag     720
atcgtgcggc agcagagcta ctccatcatg tgcatcatca agaagaggt gctggcctac     780
gtggtgcagc tgcccctgta cggcgtgatc gacaccccct gctggaagct gcacaccagc     840
cccctgtgca aaccaacac aaagagggc agcaacatct gcctgacccg gaccgaccgg     900
ggctggtact gcgacaacgc cggcagcgtg tccttctttc acaggccga catgcaag     960
gtgcagagca accgggtgtt ctgcgacacc atgaacagcc tgaccctgcc ctccgaagtg    1020
aacctgtgca acgtggacat cttcaacccc aagtacgact gcaagatcat gacctccaag    1080
accgacgtgt ccagctccgt gatcacctcc ctgggcgcca tcgtgtcctg ctacggcaag    1140
accaagtgca ccgccagcaa caagaacaga ggcatcatca gaccttcag caacggctgc    1200
gactacgtgt ccaataaggg cgtggacacc gtgtccgtgg caacacact gtactgcgtg    1260
aataagcagg aaggcaagag cctgtacgtg aagggcgagc ccatcatcaa cttctacgac    1320
cccctggtgt tccccagcga cgagttcgac gctagcatca gccaggtgaa cgagaagatc    1380
aaccagagcc tggccttcat cagaaagagc gacgaactgc tgtccgccat cggcggctac    1440
atccccgagg cccccagaga tggccaggcc tacgtgcgga aggacggcga gtgggtgctg    1500
ctgtctacat ttctgggaag cggaggctct ggtgcccata tcgtgatggt ggacgcctac    1560
aagcctacca aagagcccga ggcctaa                                      1587

<210> SEQ ID NO 48
<211> LENGTH: 1515
```

```
<212> TYPE: DNA
<213> ORGANISM: Artificial Sequence
<220> FEATURE:
<223> OTHER INFORMATION: Sc9-10 DS-Cav1 A149C Y458C (RSV-F)
<220> FEATURE:
<221> NAME/KEY: misc_feature
<222> LOCATION: (1)..(75)
<223> OTHER INFORMATION: Signal peptide
<220> FEATURE:
<221> NAME/KEY: misc_feature
<222> LOCATION: (1435)..(1515)
<223> OTHER INFORMATION: Foldon domain

<400> SEQUENCE: 48
atggaactgc tgatcctgaa ggccaacgcc atcaccacca tcctgaccgc cgtgaccttc      60
tgcttcgcca gcggccagaa catcaccgag gaattctacc agagcacctg cagcgccgtg     120
agcaagggct acctgagcgc cctgcggacc ggctggtaca ccagcgtgat caccatcgag     180
ctgtccaaca tcaagaaaaa caagtgcaac ggcaccgacg ccaaagtgaa gctgatcaag     240
caggaactgg acaagtacaa gaacgccgtg accgagctgc agctgctgat gcagagcacc     300
cccgccaccg gatctggcag cgccatttgc agcggcgtgg ccgtgtgtaa agtgctgcac     360
ctggaaggcg aagtgaacaa gatcaagtcc gccctgctgt ccaccaacaa ggccgtggtg     420
tccctgagca acggcgtgag cgtgctgacc ttcaaggtgc tggatctgaa gaactacatc     480
gacaagcagc tgctgcccat cctgaacaag cagagctgca gcatcagcaa catcgagaca     540
gtgatcgagt tccagcagaa gaacaaccgg ctgctggaaa tcacccggga gttcagcgtg     600
aacgccggag tgaccacccc cgtgtccacc tacatgctga ccaacagcga gctgctgtcc     660
ctgatcaatg acatgcccat caccaacgac cagaaaaagc tgatgagcaa caacgtgcag     720
atcgtgcggc agcagagcta ctccatcatg tgcatcatca agaagaggt gctggcctac     780 gtggtgcagc tgcccctgta cggcgtgatc gacacccccct gctggaagct gcacaccagc     840
cccctgtgca caaccaacac caaagagggc agcaacatct gcctgacccg gaccgaccgg     900
ggctggtact gcgacaacgc cggcagcgtg tccttctttc cacaggccga gatcatgcaa     960
gtgcagagca ccggggtgtt ctgcgacacc atgaacagcc tgaccctgcc ctccgaagtg    1020
aacctgtgca acgtggacat cttcaacccc aagtacgact gcaagatcat gacctccaag    1080
accgacgtgt ccagctccgt gatcacctcc ctgggcgcca tcgtgtcctg ctacggcaag    1140
accaagtgca ccgccagcaa caagaacaga ggcatcatca gaccttcag caacggctgc    1200 gactacgtgt ccaataaggg cgtggacacc gtgtccgtgg gcaacacact gtactgcgtg    1260
aataagcagg aaggcaagag cctgtacgtg aagggcgagc ccatcatcaa cttctacgac    1320
cccctggtgt tccccagcga cgagttcgac gctagcatca gccaggtgaa cgagaagatc    1380
aaccagagcc tggccttcat cagaaagagc gacgaactgc tgtccgccat cggcggctac    1440
atccccgagg cccccagaga tggccaggcc tacgtgcgga aggacggcga gtgggtgctg    1500
ctgtctacat tctg                                                     1515

<210> SEQ ID NO 49
<211> LENGTH: 1440
<212> TYPE: DNA
<213> ORGANISM: Artificial Sequence
<220> FEATURE:
<223> OTHER INFORMATION: Sc-9-10 DS-Cav1 A149C Y458C (RSV-F) without the
      signal peptide
<220> FEATURE:
<221> NAME/KEY: misc_feature
<222> LOCAT

<400> SEQUENCE: 49

```
cagaacatca ccgaggaatt ctaccagagc acctgcagcg ccgtgagcaa gggctacctg      60
agcgccctgc ggaccggctg gtacaccagc gtgatcacca tcgagctgtc caacatcaaa     120
gaaaacaagt gcaacggcac cgacgccaaa gtgaagctga tcaagcagga actggacaag     180
tacaagaacg ccgtgaccga gctgcagctg ctgatgcaga gcaccccccgc caccggatct    240
ggcagcgcca tttgcagcgg cgtggccgtg tgtaaagtgc tgcacctgga aggcgaagtg     300
aacaagatca agtccgccct gctgtccacc aacaaggccg tggtgtccct gagcaacggc     360
gtgagcgtgc tgaccttcaa ggtgctggat ctgaagaact acatcgacaa gcagctgctg     420
cccatcctga caagcagag ctgcagcatc agcaacatcg agacagtgat cgagttccag      480
cagaagaaca accggctgct ggaaatcacc cgggagttca gcgtgaacgc cggagtgacc     540
accccccgtgt ccacctacat gctgaccaac agcgagctgc tgtccctgat caatgacatg    600
cccatcacca cgaccagaa aaagctgatg agcaacaacg tgcagatcgt gcggcagcag      660
agctactcca tcatgtgcat catcaaagaa gaggtgctgg cctacgtggt gcagctgccc     720
ctgtacggcg tgatcgacac ccctgctgg aagctgcaca ccagccccct gtgcacaacc      780
aacaccaaag agggcagcaa catctgcctg acccggaccg accggggctg gtactgcgac     840
aacgccggca cgtgtccttctttccacag gccgagacat gcaaggtgca gagcaaccgg       900
gtgttctgcg acaccatgaa cagccggacc ctgccctccg aagtgaacct gtgcaacgtg     960
gacatcttca accccaagta cgactgcaag atcatgacct ccaagaccga cgtgtccagc    1020
tccgtgatca cctccctggg cgccatcgtg tcctgctacg gcaagaccaa gtgcaccgcc    1080
agcaacaaga cagaggcat catcaagacc ttcagcaacg gctgcgacta cgtgtccaat     1140
aagggcgtgg acaccgtgtc cgtgggcaac acactgtact gcgtgaataa gcaggaaggc    1200
aagagcctgt acgtgaaggg cgagcccatc atcaacttct acgaccccct ggtgttcccc    1260
agcgacgagt tcgacgctag catcagccag gtgaacgaga agatcaacca gagcctggcc    1320
ttcatcagaa agagcgacga actgctgtcc gccatcggcg gctacatccc cgaggccccc    1380
agagatggcc aggcctacgt gcggaaggac ggcgagtggg tgctgctgtc tacatttctg    1440
```

<210> SEQ ID NO 50
<211> LENGTH: 528
<212> TYPE: PRT
<213> ORGANISM: Artificial Sequence
<220> FEATURE:
<223> OTHER INFORMATION: RSV-F-SpyTag-Ctag
<220> FEATURE:
<221> NAME/KEY: MISC_FEATURE
<222> LOCATION: (1)..(25)
<223> OTHER INFORMATION: Signal peptide
<220> FEATURE:
<221> NAME/KEY: MISC_FEATURE
<222> LOCATION: (479)..(505)
<223> OTHER INFORMATION: Foldon domain
<220> FEATURE:
<221> NAME/KEY: MISC_FEATURE
<222> LOCATION: (506)..(511)
<223> OTHER INFORMATION: (GSG)2 linker
<220> FEATURE:
<221> NAME/KEY: MISC_FEATURE
<222> LOCATION: (512)..(524)
<223> OTHER INFORMATION: Spytag
<220> FEATURE:
<221> NAME/KEY: MISC_FEATURE
<222> LOCATION: (525)..(527)
<223> OTHER INFORMATION: Ctag

```
<400> SEQUENCE: 50

Met Glu Leu Leu Ile Leu Lys Ala Asn Ala Ile Thr Thr Ile Leu Thr
1               5                   10                  15

Ala Val Thr Phe Cys Phe Ala Ser Gly Gln Asn Ile Thr Glu Glu Phe
            20                  25                  30

Tyr Gln Ser Thr Cys Ser Ala Val Ser Lys Gly Tyr Leu Ser Ala Leu
        35                  40                  45

Arg Thr Gly Trp Tyr Thr Ser Val Ile Thr Ile Glu Leu Ser Asn Ile
50                  55                  60

Lys Glu Asn Lys Cys Asn Gly Thr Asp Ala Lys Val Lys Leu Ile Lys
65                  70                  75                  80

Gln Glu Leu Asp Lys Tyr Lys Asn Ala Val Thr Glu Leu Gln Leu Leu
                85                  90                  95

Met Gln Ser Thr Pro Ala Thr Gly Ser Gly Ser Ala Ile Cys Ser Gly
            100                 105                 110

Val Ala Val Cys Lys Val Leu His Leu Glu Gly Glu Val Asn Lys Ile
        115                 120                 125

Lys Ser Ala Leu Leu Ser Thr Asn Lys Ala Val Val Ser Leu Ser Asn
130                 135                 140

Gly Val Ser Val Leu Thr Phe Lys Val Leu Asp Leu Lys Asn Tyr Ile
145                 150                 155                 160

Asp Lys Gln Leu Leu Pro Ile Leu Asn Lys Gln Ser Cys Ser Ile Ser
                165                 170                 175

Asn Ile Glu Thr Val Ile Glu Phe Gln Gln Lys Asn Asn Arg Leu Leu
            180                 185                 190

Glu Ile Thr Arg Glu Phe Ser Val Asn Ala Gly Val Thr Thr Pro Val
        195                 200                 205

Ser Thr Tyr Met Leu Thr Asn Ser Glu Leu Leu Ser Leu Ile Asn Asp
210                 215                 220

Met Pro Ile Thr Asn Asp Gln Lys Lys Leu Met Ser Asn Asn Val Gln
225                 230                 235                 240

Ile Val Arg Gln Gln Ser Tyr Ser Ile Met Cys Ile Ile Lys Glu Glu
                245                 250                 255

Val Leu Ala Tyr Val Val Gln Leu Pro Leu Tyr Gly Val Ile Asp Thr
            260                 265                 270

Pro Cys Trp Lys Leu His Thr Ser Pro Leu Cys Thr Thr Asn Thr Lys
        275                 280                 285

Glu Gly Ser Asn Ile Cys Leu Thr Arg Thr Asp Arg Gly Trp Tyr Cys
290                 295                 300

Asp Asn Ala Gly Ser Val Ser Phe Phe Pro Gln Ala Glu Thr Cys Lys
305                 310                 315                 320

Val Gln Ser Asn Arg Val Phe Cys Asp Thr Met Asn Ser Arg Thr Leu
                325                 330                 335

Pro Ser Glu Val Asn Leu Cys Asn Val Asp Ile Phe Asn Pro Lys Tyr
            340                 345                 350

Asp Cys Lys Ile Met Thr Ser Lys Thr Asp Val Ser Ser Ser Val Ile
        355                 360                 365

Thr Ser Leu Gly Ala Ile Val Ser Cys Tyr Gly Lys Thr Lys Cys Thr
370                 375                 380

Ala Ser Asn Lys Asn Arg Gly Ile Ile Lys Thr Phe Ser Asn Gly Cys
385                 390                 395                 400

Asp Tyr Val Ser Asn Lys Gly Val Asp Thr Val Ser Val Gly Asn Thr
                405                 410                 415
```

```
Leu Tyr Cys Val Asn Lys Gln Glu Gly Lys Ser Leu Tyr Val Lys Gly
            420                 425                 430

Glu Pro Ile Ile Asn Phe Tyr Asp Pro Leu Val Phe Pro Ser Asp Glu
            435                 440                 445

Phe Asp Ala Ser Ile Ser Gln Val Asn Glu Lys Ile Asn Gln Ser Leu
450                 455                 460

Ala Phe Ile Arg Lys Ser Asp Glu Leu Leu Ser Ala Ile Gly Gly Tyr
465                 470                 475                 480

Ile Pro Glu Ala Pro Arg Asp Gly Gln Ala Tyr Val Arg Lys Asp Gly
            485                 490                 495

Glu Trp Val Leu Leu Ser Thr Phe Leu Gly Ser Gly Ser Gly Ser Ala
            500                 505                 510

His Ile Val Met Val Asp Ala Tyr Lys Pro Thr Lys Glu Pro Glu Ala
            515                 520                 525

<210> SEQ ID NO 51
<211> LENGTH: 1010
<212> TYPE: PRT
<213> ORGANISM: Artificial Sequence
<220> FEATURE:
<223> OTHER INFORMATION: Sc-9-10 DS-Cav1 A149C Y458C (RSV-F)
<220> FEATURE:
<221> NAME/KEY: MISC_FEATURE
<222> LOCATION: (1)..(25)
<223> OTHER INFORMATION: Signal peptide
<220> FEATURE:
<221> NAME/KEY: MISC_FEATURE
<222> LOCATION: (479)..(505)
<223> OTHER INFORMATION: Foldon domain

<400> SEQUENCE: 51

Met Glu Leu Leu Ile Leu Lys Ala Asn Ala Ile Thr Thr Ile Leu Thr
1               5                   10                  15

Ala Val Thr Phe Cys Phe Ala Ser Gly Gln Asn Ile Thr Glu Glu Phe
            20                  25                  30

Tyr Gln Ser Thr Cys Ser Ala Val Ser Lys Gly Tyr Leu Ser Ala Leu
        35                  40                  45

Arg Thr Gly Trp Tyr Thr Ser Val Ile Thr Ile Glu Leu Ser Asn Ile
    50                  55                  60

Lys Glu Asn Lys Cys Asn Gly Thr Asp Ala Lys Val Lys Leu Ile Lys
65                  70                  75                  80

Gln Glu Leu Asp Lys Tyr Lys Asn Ala Val Thr Glu Leu Gln Leu Leu
                85                  90                  95

Met Gln Ser Thr Pro Ala Thr Gly Ser Gly Ser Ala Ile Cys Ser Gly
            100                 105                 110

Val Ala Val Cys Lys Val Leu His Leu Glu Gly Glu Val Asn Lys Ile
            115                 120                 125

Lys Ser Ala Leu Leu Ser Thr Asn Lys Ala Val Val Ser Leu Ser Asn
130                 135                 140

Gly Val Ser Val Leu Thr Phe Lys Val Leu Asp Leu Lys Asn Tyr Ile
145                 150                 155                 160

Asp Lys Gln Leu Leu Pro Ile Leu Asn Lys Gln Ser Cys Ser Ile Ser
                165                 170                 175

Asn Ile Glu Thr Val Ile Glu Phe Gln Gln Lys Asn Asn Arg Leu Leu
            180                 185                 190

Glu Ile Thr Arg Glu Phe Ser Val Asn Ala Gly Val Thr Thr Pro Val
        195                 200                 205
```

```
Ser Thr Tyr Met Leu Thr Asn Ser Glu Leu Leu Ser Leu Ile Asn Asp
    210                 215                 220

Met Pro Ile Thr Asn Asp Gln Lys Lys Leu Met Ser Asn Asn Val Gln
225                 230                 235                 240

Ile Val Arg Gln Gln Ser Tyr Ser Ile Met Cys Ile Ile Lys Glu Glu
                245                 250                 255

Val Leu Ala Tyr Val Val Gln Leu Pro Leu Tyr Gly Val Ile Asp Thr
            260                 265                 270

Pro Cys Trp Lys Leu His Thr Ser Pro Leu Cys Thr Thr Asn Thr Lys
                275                 280                 285

Glu Gly Ser Asn Ile Cys Leu Thr Arg Thr Asp Arg Gly Trp Tyr Cys
290                 295                 300

Asp Asn Ala Gly Ser Val Ser Phe Phe Pro Gln Ala Glu Thr Cys Lys
305                 310                 315                 320

Val Gln Ser Asn Arg Val Phe Cys Asp Thr Met Asn Ser Arg Thr Leu
                325                 330                 335

Pro Ser Glu Val Asn Leu Cys Asn Val Asp Ile Phe Asn Pro Lys Tyr
                340                 345                 350

Asp Cys Lys Ile Met Thr Ser Lys Thr Asp Val Ser Ser Ser Val Ile
            355                 360                 365

Thr Ser Leu Met Glu Leu Leu Ile Leu Lys Ala Asn Ala Ile Thr Thr
    370                 375                 380

Ile Leu Thr Ala Val Thr Phe Cys Phe Ala Ser Gly Gln Asn Ile Thr
385                 390                 395                 400

Glu Glu Phe Tyr Gln Ser Thr Cys Ser Ala Val Ser Lys Gly Tyr Leu
                405                 410                 415

Ser Ala Leu Arg Thr Gly Trp Tyr Thr Ser Val Ile Thr Ile Glu Leu
            420                 425                 430

Ser Asn Ile Lys Glu Asn Lys Cys Asn Gly Thr Asp Ala Lys Val Lys
    435                 440                 445

Leu Ile Lys Gln Glu Leu Asp Lys Tyr Lys Asn Ala Val Thr Glu Leu
450                 455                 460

Gln Leu Leu Met Gln Ser Thr Pro Ala Thr Gly Ser Gly Ser Ala Ile
465                 470                 475                 480

Cys Ser Gly Val Ala Val Cys Lys Val Leu His Leu Glu Gly Glu Val
                485                 490                 495

Asn Lys Ile Lys Ser Ala Leu Leu Ser Thr Asn Lys Ala Val Val Ser
            500                 505                 510

Leu Ser Asn Gly Val Ser Val Leu Thr Phe Lys Val Leu Asp Leu Lys
    515                 520                 525

Asn Tyr Ile Asp Lys Gln Leu Leu Pro Ile Leu Asn Lys Gln Ser Cys
    530                 535                 540

Ser Ile Ser Asn Ile Glu Thr Val Ile Glu Phe Gln Gln Lys Asn Asn
545                 550                 555                 560

Arg Leu Leu Glu Ile Thr Arg Glu Phe Ser Val Asn Ala Gly Val Thr
                565                 570                 575

Thr Pro Val Ser Thr Tyr Met Leu Thr Asn Ser Glu Leu Leu Ser Leu
            580                 585                 590

Ile Asn Asp Met Pro Ile Thr Asn Asp Gln Lys Lys Leu Met Ser Asn
    595                 600                 605

Asn Val Gln Ile Val Arg Gln Gln Ser Tyr Ser Ile Met Cys Ile Ile
    610                 615                 620

Lys Glu Glu Val Leu Ala Tyr Val Val Gln Leu Pro Leu Tyr Gly Val
```

```
            625                 630                 635                 640
Ile Asp Thr Pro Cys Trp Lys Leu His Thr Ser Pro Leu Cys Thr Thr
                    645                 650                 655

Asn Thr Lys Glu Gly Ser Asn Ile Cys Leu Thr Arg Thr Asp Arg Gly
                660                 665                 670

Trp Tyr Cys Asp Asn Ala Gly Ser Val Ser Phe Phe Pro Gln Ala Glu
            675                 680                 685

Thr Cys Lys Val Gln Ser Asn Arg Val Phe Cys Asp Thr Met Asn Ser
        690                 695                 700

Arg Thr Leu Pro Ser Glu Val Asn Leu Cys Asn Val Asp Ile Phe Asn
705                 710                 715                 720

Pro Lys Tyr Asp Cys Lys Ile Met Thr Ser Lys Thr Asp Val Ser Ser
                725                 730                 735

Ser Val Ile Thr Ser Leu Gly Ala Ile Val Ser Cys Tyr Gly Lys Thr
                740                 745                 750

Lys Cys Thr Ala Ser Asn Lys Asn Arg Gly Ile Ile Lys Thr Phe Ser
            755                 760                 765

Asn Gly Cys Asp Tyr Val Ser Asn Lys Gly Val Asp Thr Val Ser Val
        770                 775                 780

Gly Asn Thr Leu Tyr Cys Val Asn Lys Gln Glu Gly Lys Ser Leu Tyr
785                 790                 795                 800

Val Lys Gly Glu Pro Ile Ile Asn Phe Tyr Asp Pro Leu Val Phe Pro
                805                 810                 815

Ser Asp Glu Phe Asp Ala Ser Ile Ser Gln Val Asn Glu Lys Ile Asn
            820                 825                 830

Gln Ser Leu Ala Phe Ile Arg Lys Ser Asp Glu Leu Leu Ser Ala Ile
        835                 840                 845

Gly Gly Tyr Ile Pro Glu Ala Pro Arg Asp Gly Gln Ala Tyr Val Arg
    850                 855                 860

Lys Asp Gly Glu Trp Val Leu Leu Ser Thr Phe Leu Gly Ala Ile Val
865                 870                 875                 880

Ser Cys Tyr Gly Lys Thr Lys Cys Thr Ala Ser Asn Lys Asn Arg Gly
                885                 890                 895

Ile Ile Lys Thr Phe Ser Asn Gly Cys Asp Tyr Val Ser Asn Lys Gly
            900                 905                 910

Val Asp Thr Val Ser Val Gly Asn Thr Leu Tyr Cys Val Asn Lys Gln
        915                 920                 925

Glu Gly Lys Ser Leu Tyr Val Lys Gly Glu Pro Ile Ile Asn Phe Tyr
    930                 935                 940

Asp Pro Leu Val Phe Pro Ser Asp Glu Phe Asp Ala Ser Ile Ser Gln
945                 950                 955                 960

Val Asn Glu Lys Ile Asn Gln Ser Leu Ala Phe Ile Arg Lys Ser Asp
                965                 970                 975

Glu Leu Leu Ser Ala Ile Gly Gly Tyr Ile Pro Glu Ala Pro Arg Asp
            980                 985                 990

Gly Gln Ala Tyr Val Arg Lys Asp  Gly Glu Trp Val Leu  Leu Ser Thr
        995                 1000                1005

Phe Leu
    1010

<210> SEQ ID NO 52
<211> LENGTH: 480
<212> TYPE: PRT
<213> ORGANISM: Artificial Sequence
```

```
<220> FEATURE:
<223> OTHER INFORMATION: sc9-10 DS-Cav1 A149C Y458C (RSV-F) without the
      signal peptide
<220> FEATURE:
<221> NAME/KEY: MISC_FEATURE
<222> LOCATION: (454)..(480)
<223> OTHER INFORMATION: Foldon domain

<400> SEQUENCE: 52

Gln Asn Ile Thr Glu Glu Phe Tyr Gln Ser Thr Cys Ser Ala Val Ser
1               5                   10                  15

Lys Gly Tyr Leu Ser Ala Leu Arg Thr Gly Trp Tyr Thr Ser Val Ile
            20                  25                  30

Thr Ile Glu Leu Ser Asn Ile Lys Glu Asn Lys Cys Asn Gly Thr Asp
        35                  40                  45

Ala Lys Val Lys Leu Ile Lys Gln Glu Leu Asp Lys Tyr Lys Asn Ala
    50                  55                  60

Val Thr Glu Leu Gln Leu Leu Met Gln Ser Thr Pro Ala Thr Gly Ser
65                  70                  75                  80

Gly Ser Ala Ile Cys Ser Gly Val Ala Val Cys Lys Val Leu His Leu
                85                  90                  95

Glu Gly Glu Val Asn Lys Ile Lys Ser Ala Leu Leu Ser Thr Asn Lys
            100                 105                 110

Ala Val Val Ser Leu Ser Asn Gly Val Ser Val Leu Thr Phe Lys Val
        115                 120                 125

Leu Asp Leu Lys Asn Tyr Ile Asp Lys Gln Leu Leu Pro Ile Leu Asn
    130                 135                 140

Lys Gln Ser Cys Ser Ile Ser Asn Ile Glu Thr Val Ile Glu Phe Gln
145                 150                 155                 160

Gln Lys Asn Asn Arg Leu Leu Glu Ile Thr Arg Glu Phe Ser Val Asn
                165                 170                 175

Ala Gly Val Thr Thr Pro Val Ser Thr Tyr Met Leu Thr Asn Ser Glu
            180                 185                 190

Leu Leu Ser Leu Ile Asn Asp Met Pro Ile Thr Asn Asp Gln Lys Lys
        195                 200                 205

Leu Met Ser Asn Asn Val Gln Ile Val Arg Gln Gln Ser Tyr Ser Ile
    210                 215                 220

Met Cys Ile Ile Lys Glu Glu Val Leu Ala Tyr Val Val Gln Leu Pro
225                 230                 235                 240

Leu Tyr Gly Val Ile Asp Thr Pro Cys Trp Lys Leu His Thr Ser Pro
                245                 250                 255

Leu Cys Thr Thr Asn Thr Lys Glu Gly Ser Asn Ile Cys Leu Thr Arg
            260                 265                 270

Thr Asp Arg Gly Trp Tyr Cys Asp Asn Ala Gly Ser Val Ser Phe Phe
        275                 280                 285

Pro Gln Ala Glu Thr Cys Lys Val Gln Ser Asn Arg Val Phe Cys Asp
    290                 295                 300

Thr Met Asn Ser Arg Thr Leu Pro Ser Glu Val Asn Leu Cys Asn Val
305                 310                 315                 320

Asp Ile Phe Asn Pro Lys Tyr Asp Cys Lys Ile Met Thr Ser Lys Thr
                325                 330                 335

Asp Val Ser Ser Ser Val Ile Thr Ser Leu Gly Ala Ile Val Ser Cys
            340                 345                 350

Tyr Gly Lys Thr Lys Cys Thr Ala Ser Asn Lys Asn Arg Gly Ile Ile
        355                 360                 365
```

```
Lys Thr Phe Ser Asn Gly Cys Asp Tyr Val Ser Asn Lys Gly Val Asp
    370                 375                 380

Thr Val Ser Val Gly Asn Thr Leu Tyr Cys Val Asn Lys Gln Glu Gly
385                 390                 395                 400

Lys Ser Leu Tyr Val Lys Gly Glu Pro Ile Ile Asn Phe Tyr Asp Pro
            405                 410                 415

Leu Val Phe Pro Ser Asp Glu Phe Asp Ala Ser Ile Ser Gln Val Asn
                420                 425                 430

Glu Lys Ile Asn Gln Ser Leu Ala Phe Ile Arg Lys Ser Asp Glu Leu
        435                 440                 445

Leu Ser Ala Ile Gly Gly Tyr Ile Pro Glu Ala Pro Arg Asp Gly Gln
450                 455                 460

Ala Tyr Val Arg Lys Asp Gly Glu Trp Val Leu Leu Ser Thr Phe Leu
465                 470                 475                 480

<210> SEQ ID NO 53
<211> LENGTH: 1704
<212> TYPE: DNA
<213> ORGANISM: Artificial Sequence
<220> FEATURE:
<223> OTHER INFORMATION: RSV-F DS-Cav1-SpyTag-Ctag
<220> FEATURE:
<221> NAME/KEY: misc_feature
<222> LOCATION: (1)..(75)
<223> OTHER INFORMATION: Signal peptide
<220> FEATURE:
<221> NAME/KEY: misc_feature
<222> LOCATION: (1552)..(1632)
<223> OTHER INFORMATION: Foldon domain
<220> FEATURE:
<221> NAME/KEY: misc_feature
<222> LOCATION: (1633)..(1650)
<223> OTHER INFORMATION: (GSG)2 linker
<220> FEATURE:
<221> NAME/KEY: misc_feature
<222> LOCATION: (1651)..(1689)
<223> OTHER INFORMATION: Spytag
<220> FEATURE:
<221> NAME/KEY: misc_feature
<222> LOCATION: (1690)..(1701)
<223> OTHER INFORMATION: Ctag
<220> FEATURE:
<221> NAME/KEY: misc_feature
<222> LOCATION: (1702)..(1704)
<223> OTHER INFORMATION: Stop codon

<400> SEQUENCE: 53
atggaactgc tgatcctgaa ggccaacgcc atcaccacca tcctgaccgc cgtgaccttc      60
tgcttcgcca gcggcagaa catcaccgag gaattctacc agagcacctg cagcgccgtg     120
agcaagggct acctgagcgc cctgcggacc ggctggtaca ccagcgtgat caccatcgag     180
ctgtccaaca tcaagaaaa caagtgcaac ggcaccgacg ccaaagtgaa gctgatcaag     240
caggaactgg acaagtacaa gaacgccgtg accgagctgc agctgctgat gcagagcacc     300
cccgccacca caacagagc cagaagagag ctgccccggt tcatgaacta cacccctgaac    360 aacgccaaga aaaccaacgt gaccctgagc aagaagagaa agagaagatt cctgggcttc     420
ctgctgggcg tgggcagcgc cattgccagc ggcgtggccg tgtgtaaagt gctgcacctg     480
gaaggcgaag tgaacaagat caagtccgcc ctgctgtcca ccaacaaggc cgtggtgtcc     540
ctgagcaacg gcgtgagcgt gctgaccttc aaggtgctgg atctgaagaa ctacatcgac     600
aagcagctgc tgcccatcct gaacaagcag agctgcagca tcagcaacat cgagacagtg     660
atcgagttcc agcagaagaa caccggctg ctggaaatca cccgggagtt cagcgtgaac     720
```

| | |
|---|---|
| gccggagtga ccacccccgt gtccacctac atgctgacca acagcgagct gctgtccctg | 780 |
| atcaatgaca tgcccatcac caacgaccag aaaaagctga tgagcaacaa cgtgcagatc | 840 |
| gtgcggcagc agagctactc catcatgtgc atcatcaaag aagaggtgct ggcctacgtg | 900 |
| gtgcagctgc ccctgtacgg cgtgatcgac accccctgct ggaagctgca caccagcccc | 960 |
| ctgtgcacaa ccaacaccaa agagggcagc aacatctgcc tgacccggac cgaccgggc | 1020 |
| tggtactgcg acaacgccgg cagcgtgtcc ttctttccac aggccgagac atgcaaggtg | 1080 |
| cagagcaacc gggtgttctg cgacaccatg aacagcctga ccctgccctc cgaagtgaac | 1140 |
| ctgtgcaacg tggacatctt caaccccaag tacgactgca agatcatgac ctccaagacc | 1200 |
| gacgtgtcca gctccgtgat cacctccctg ggcgccatcg tgtcctgcta cggcaagacc | 1260 |
| aagtgcaccg ccagcaacaa gaacagaggc atcatcaaga ccttcagcaa cggctgcgac | 1320 |
| tacgtgtcca ataagggcgt ggacaccgtg tccgtgggca cacactgta ctacgtgaat | 1380 |
| aagcaggaag gcaagagcct gtacgtgaag ggcgagccca tcatcaactt ctacgacccc | 1440 |
| ctggtgttcc ccagcgacga gttcgacgcc agcatcagcc aggtgaacga aagatcaac | 1500 |
| cagagcctgg ccttcatcag aaagagcgac gaactgctgt ccgccatcgg cggctacatc | 1560 |
| cccgaggccc ccagagatgg ccaggcctac gtgcggaagg acggcgagtg ggtgctgctg | 1620 |
| tctacatttc tgggaagcgg aggctctggt gcccatatcg tgatggtgga cgcctacaag | 1680 |
| cctaccaaag agcccgaggc ctaa | 1704 |

<210> SEQ ID NO 54
<211> LENGTH: 1632
<212> TYPE: DNA
<213> ORGANISM: Artificial Sequence
<220> FEATURE:
<223> OTHER INFORMATION: RSV-F DS-Cav1
<220> FEATURE:
<221> NAME/KEY: misc_feature
<222> LOCATION: (1)..(75)
<223> OTHER INFORMATION: Signal peptide
<220> FEATURE:
<221> NAME/KEY: misc_feature
<222> LOCATION: (1552)..(1632)
<223> OTHER INFORMATION: Foldon domain

<400> SEQUENCE: 54

| | |
|---|---|
| atggaactgc tgatcctgaa ggccaacgcc atcaccacca tcctgaccgc cgtgaccttc | 60 |
| tgcttcgcca gcggccagaa catcaccgag gaattctacc agagcacctg cagcgccgtg | 120 |
| agcaagggct acctgagcgc cctgcggacc ggctggtaca ccagcgtgat caccatcgag | 180 |
| ctgtccaaca tcaaagaaaa caagtgcaac ggcaccgacg ccaaagtgaa gctgatcaag | 240 |
| caggaactgg acaagtacaa gaacgccgtg accgagctgc agctgctgat gcagagcacc | 300 |
| cccgccacca acaacagagc cagaagagag ctgccccggt tcatgaacta caccctgaac | 360 |
| aacgccaaga aaaccaacgt gaccctgagc aagaagagaa agagaagatt cctgggcttc | 420 |
| ctgctgggcg tgggcagcgc cattgccagc ggcgtggccg tgtgtaaagt gctgcacctg | 480 |
| gaaggcgaag tgaacaagat caagtccgcc ctgctgtcca ccaacaaggc cgtggtgtcc | 540 |
| ctgagcaacg gcgtgagcgt gctgaccttc aaggtgctgg atctgaagaa ctacatcgac | 600 |
| aagcagctgc tgcccatcct gaacaagcag agctgcagca tcagcaacat cgagacagtg | 660 |
| atcgagttcc agcagaagaa caccggctg ctggaaatca cccggagtt cagcgtgaac | 720 |
| gccggagtga ccacccccgt gtccacctac atgctgacca acagcgagct gctgtccctg | 780 |
| atcaatgaca tgcccatcac caacgaccag aaaaagctga tgagcaacaa cgtgcagatc | 840 |

```
gtgcggcagc agagctactc catcatgtgc atcatcaaag aagaggtgct ggcctacgtg    900
gtgcagctgc ccctgtacgg cgtgatcgac accccctgct ggaagctgca caccagcccc    960
ctgtgcacaa ccaacaccaa agagggcagc aacatctgcc tgaccccggac cgaccggggc   1020 tggtactgcg acaacgccgg cagcgtgtcc ttctttccac aggccgagac atgcaaggtg   1080
cagagcaacc gggtgttctg cgacaccatg aacagcctga ccctgccctc cgaagtgaac   1140
ctgtgcaacg tggacatctt caaccccaag tacgactgca agatcatgac ctccaagacc   1200
gacgtgtcca gctccgtgat cacctccctg ggcgccatcg tgtcctgcta cggcaagacc   1260
aagtgcaccg ccagcaacaa gaacagaggc atcatcaaga ccttcagcaa cggctgcgac   1320
tacgtgtcca ataagggcgt ggacaccgtg tccgtgggca acacactgta ctacgtgaat   1380
aagcaggaag gcaagagcct gtacgtgaag ggcgagccca tcatcaactt ctacgacccc   1440
ctggtgttcc ccagcgacga gttcgacgcc agcatcagcc aggtgaacga gaagatcaac   1500
cagagcctgg ccttcatcag aaagagcgac gaactgctgt ccgccatcgg cggctacatc   1560
cccgaggccc ccagagatgg ccaggcctac gtgcggaagg acggcgagtg ggtgctgctg   1620
tctacatttc tg                                                        1632
```

<210> SEQ ID NO 55
<211> LENGTH: 1557
<212> TYPE: DNA
<213> ORGANISM: Artificial Sequence
<220> FEATURE:
<223> OTHER INFORMATION: RSV-F DS-Cav1 without the signal peptide
<220> FEATURE:
<221> NAME/KEY: misc_feature
<222> LOCATION: (1477)..(1557)
<223> OTHER INFORMATION: Foldon domain

<400> SEQUENCE: 55

```
cagaacatca ccgaggaatt ctaccagagc acctgcagcg ccgtgagcaa gggctacctg     60
agcgccctgc ggaccggctg gtacaccagc gtgatcacca tcgagctgtc caacatcaaa   120
gaaaacaagt gcaacggcac cgacgccaaa gtgaagctga tcaagcagga actggacaag   180
tacaagaacg ccgtgaccga gctgcagctg ctgatgcaga gcaccccccgc caccaacaac   240 agagccagaa gagagctgcc ccggttcatg aactacaccc tgaacaacgc caagaaaacc   300
aacgtgaccc tgagcaagaa gagaaagaga agattcctgg gcttcctgct gggcgtgggc   360
agcgccattg ccagcggcgt ggccgtgtgt aaagtgctgc acctggaagg cgaagtgaac   420
aagatcaagt ccgccctgct gtccaccaac aaggccgtgg tgtccctgag caacggcgtg   480
agcgtgctga ccttcaaggt gctggatctg aagaactaca tcgacaagca gctgctgccc   540
atcctgaaca agcagagctg cagcatcagc aacatcgaga cagtgatcga gttccagcag   600
aagaacaacc ggctgctgga aatcacccgg gagttcagcg tgaacgccgg agtgaccacc   660
cccgtgtcca cctacatgct gaccaacagc gagctgctgt ccctgatcaa tgacatgccc   720
atcaccaacg accagaaaaa gctgatgagc aacaacgtgc agatcgtgcg gcagcagagc   780
tactccatca tgtgcatcat caaagaagag gtgctggcct acgtggtgca gctgcccctg   840
tacggcgtga tcgacacccc ctgctggaag ctgcacacca gcccctgtg cacaaccaac   900 accaaagagg gcagcaacat ctgcctgacc cggaccgacc ggggctggta ctgcgacaac   960
gccggcagcg tgtccttctt tccacaggcc gagacatgca aggtgcagag caaccgggtg   1020
ttctgcgaca ccatgaacag cctgaccctg ccctccgaag tgaacctgtg caacgtggac   1080
```

```
atcttcaacc ccaagtacga ctgcaagatc atgacctcca agaccgacgt gtccagctcc    1140
gtgatcacct ccctgggcgc catcgtgtcc tgctacggca agaccaagtg caccgccagc    1200
aacaagaaca gaggcatcat caagaccttc agcaacggct gcgactacgt gtccaataag    1260
ggcgtggaca ccgtgtccgt gggcaacaca ctgtactacg tgaataagca ggaaggcaag    1320
agcctgtacg tgaagggcga gcccatcatc aacttctacg acccctggt gttccccagc     1380 gacgagttcg acgccagcat cagccaggtg aacgagaaga tcaaccagag cctggccttc    1440
atcagaaaga gcgacgaact gctgtccgcc atcggcggct acatccccga ggcccccaga    1500
gatggccagg cctacgtgcg gaaggacggc gagtgggtgc tgctgtctac atttctg       1557
```

<210> SEQ ID NO 56
<211> LENGTH: 567
<212> TYPE: PRT
<213> ORGANISM: Artificial Sequence
<220> FEATURE:
<223> OTHER INFORMATION: RSV-F DS-Cav1-SpyTag-Ctag
<220> FEATURE:
<221> NAME/KEY: MISC_FEATURE
<222> LOCATION: (1)..(25)
<223> OTHER INFORMATION: Signal peptide
<220> FEATURE:
<221> NAME/KEY: MISC_FEATURE
<222> LOCATION: (518)..(544)
<223> OTHER INFORMATION: Foldon domain
<220> FEATURE:
<221> NAME/KEY: MISC_FEATURE
<222> LOCATION: (545)..(550)
<223> OTHER INFORMATION: Linker
<220> FEATURE:
<221> NAME/KEY: MISC_FEATURE
<222> LOCATION: (551)..(563)
<223> OTHER INFORMATION: Spytag
<220> FEATURE:
<221> NAME/KEY: MISC_FEATURE
<222> LOCATION: (564)..(567)
<223> OTHER INFORMATION: Ctag

<400> SEQUENCE: 56

```
Met Glu Leu Leu Ile Leu Lys Ala Asn Ala Ile Thr Thr Ile Leu Thr
1               5                   10                  15

Ala Val Thr Phe Cys Phe Ala Ser Gly Gln Asn Ile Thr Glu Glu Phe
            20                  25                  30

Tyr Gln Ser Thr Cys Ser Ala Val Ser Lys Gly Tyr Leu Ser Ala Leu
        35                  40                  45

Arg Thr Gly Trp Tyr Thr Ser Val Ile Thr Ile Glu Leu Ser Asn Ile
    50                  55                  60

Lys Glu Asn Lys Cys Asn Gly Thr Asp Ala Lys Val Lys Leu Ile Lys
65                  70                  75                  80

Gln Glu Leu Asp Lys Tyr Lys Asn Ala Val Thr Glu Leu Gln Leu Leu
                85                  90                  95

Met Gln Ser Thr Pro Ala Thr Asn Asn Arg Ala Arg Arg Glu Leu Pro
            100                 105                 110

Arg Phe Met Asn Tyr Thr Leu Asn Asn Ala Lys Lys Thr Asn Val Thr
        115                 120                 125

Leu Ser Lys Lys Arg Lys Arg Arg Phe Leu Gly Phe Leu Leu Gly Val
    130                 135                 140

Gly Ser Ala Ile Ala Ser Gly Val Ala Val Cys Lys Val Leu His Leu
145                 150                 155                 160

Glu Gly Glu Val Asn Lys Ile Lys Ser Ala Leu Leu Ser Thr Asn Lys
                165                 170                 175
```

Ala Val Val Ser Leu Ser Asn Gly Val Ser Val Leu Thr Phe Lys Val
            180                 185                 190

Leu Asp Leu Lys Asn Tyr Ile Asp Lys Gln Leu Leu Pro Ile Leu Asn
        195                 200                 205

Lys Gln Ser Cys Ser Ile Ser Asn Ile Glu Thr Val Ile Glu Phe Gln
        210                 215                 220

Gln Lys Asn Asn Arg Leu Leu Glu Ile Thr Arg Glu Phe Ser Val Asn
225                 230                 235                 240

Ala Gly Val Thr Thr Pro Val Ser Thr Tyr Met Leu Thr Asn Ser Glu
                245                 250                 255

Leu Leu Ser Leu Ile Asn Asp Met Pro Ile Thr Asn Asp Gln Lys Lys
        260                 265                 270

Leu Met Ser Asn Asn Val Gln Ile Val Arg Gln Gln Ser Tyr Ser Ile
        275                 280                 285

Met Cys Ile Ile Lys Glu Glu Val Leu Ala Tyr Val Val Gln Leu Pro
        290                 295                 300

Leu Tyr Gly Val Ile Asp Thr Pro Cys Trp Lys Leu His Thr Ser Pro
305                 310                 315                 320

Leu Cys Thr Thr Asn Thr Lys Glu Gly Ser Asn Ile Cys Leu Thr Arg
                325                 330                 335

Thr Asp Arg Gly Trp Tyr Cys Asp Asn Ala Gly Ser Val Ser Phe Phe
                340                 345                 350

Pro Gln Ala Glu Thr Cys Lys Val Gln Ser Asn Arg Val Phe Cys Asp
                355                 360                 365

Thr Met Asn Ser Leu Thr Leu Pro Ser Glu Val Asn Leu Cys Asn Val
        370                 375                 380

Asp Ile Phe Asn Pro Lys Tyr Asp Cys Lys Ile Met Thr Ser Lys Thr
385                 390                 395                 400

Asp Val Ser Ser Ser Val Ile Thr Ser Leu Gly Ala Ile Val Ser Cys
                405                 410                 415

Tyr Gly Lys Thr Lys Cys Thr Ala Ser Asn Lys Asn Arg Gly Ile Ile
                420                 425                 430

Lys Thr Phe Ser Asn Gly Cys Asp Tyr Val Ser Asn Lys Gly Val Asp
        435                 440                 445

Thr Val Ser Val Gly Asn Thr Leu Tyr Tyr Val Asn Lys Gln Glu Gly
        450                 455                 460

Lys Ser Leu Tyr Val Lys Gly Glu Pro Ile Ile Asn Phe Tyr Asp Pro
465                 470                 475                 480

Leu Val Phe Pro Ser Asp Glu Phe Asp Ala Ser Ile Ser Gln Val Asn
                485                 490                 495

Glu Lys Ile Asn Gln Ser Leu Ala Phe Ile Arg Lys Ser Asp Glu Leu
            500                 505                 510

Leu Ser Ala Ile Gly Gly Tyr Ile Pro Glu Ala Pro Arg Asp Gly Gln
        515                 520                 525

Ala Tyr Val Arg Lys Asp Gly Glu Trp Val Leu Leu Ser Thr Phe Leu
        530                 535                 540

Gly Ser Gly Gly Ser Gly Ala His Ile Val Met Val Asp Ala Tyr Lys
545                 550                 555                 560

Pro Thr Lys Glu Pro Glu Ala
                565

<210> SEQ ID NO 57
<211> LENGTH: 544
<212> TYPE: PRT

<213> ORGANISM: Artificial Sequence
<220> FEATURE:
<223> OTHER INFORMATION: RSV-F DS-Cav1
<220> FEATURE:
<221> NAME/KEY: MISC_FEATURE
<222> LOCATION: (1)..(25)
<223> OTHER INFORMATION: Signal peptide
<220> FEATURE:
<221> NAME/KEY: MISC_FEATURE
<222> LOCATION: (518)..(544)
<223> OTHER INFORMATION: Foldon domain

<400> SEQUENCE: 57

```
Met Glu Leu Leu Ile Leu Lys Ala Asn Ala Ile Thr Thr Ile Leu Thr
 1               5                  10                  15

Ala Val Thr Phe Cys Phe Ala Ser Gly Gln Asn Ile Thr Glu Glu Phe
             20                  25                  30

Tyr Gln Ser Thr Cys Ser Ala Val Ser Lys Gly Tyr Leu Ser Ala Leu
         35                  40                  45

Arg Thr Gly Trp Tyr Thr Ser Val Ile Thr Ile Glu Leu Ser Asn Ile
     50                  55                  60

Lys Glu Asn Lys Cys Asn Gly Thr Asp Ala Lys Val Lys Leu Ile Lys
 65                  70                  75                  80

Gln Glu Leu Asp Lys Tyr Lys Asn Ala Val Thr Glu Leu Gln Leu Leu
                 85                  90                  95

Met Gln Ser Thr Pro Ala Thr Asn Asn Arg Ala Arg Arg Glu Leu Pro
            100                 105                 110

Arg Phe Met Asn Tyr Thr Leu Asn Asn Ala Lys Lys Thr Asn Val Thr
        115                 120                 125

Leu Ser Lys Lys Arg Lys Arg Arg Phe Leu Gly Phe Leu Leu Gly Val
    130                 135                 140

Gly Ser Ala Ile Ala Ser Gly Val Ala Val Cys Lys Val Leu His Leu
145                 150                 155                 160

Glu Gly Glu Val Asn Lys Ile Lys Ser Ala Leu Leu Ser Thr Asn Lys
                165                 170                 175

Ala Val Val Ser Leu Ser Asn Gly Val Ser Val Leu Thr Phe Lys Val
            180                 185                 190

Leu Asp Leu Lys Asn Tyr Ile Asp Lys Gln Leu Leu Pro Ile Leu Asn
        195                 200                 205

Lys Gln Ser Cys Ser Ile Ser Asn Ile Glu Thr Val Ile Glu Phe Gln
    210                 215                 220

Gln Lys Asn Asn Arg Leu Leu Glu Ile Thr Arg Glu Phe Ser Val Asn
225                 230                 235                 240

Ala Gly Val Thr Thr Pro Val Ser Thr Tyr Met Leu Thr Asn Ser Glu
                245                 250                 255

Leu Leu Ser Leu Ile Asn Asp Met Pro Ile Thr Asn Asp Gln Lys Lys
            260                 265                 270

Leu Met Ser Asn Asn Val Gln Ile Val Arg Gln Gln Ser Tyr Ser Ile
        275                 280                 285

Met Cys Ile Ile Lys Glu Glu Val Leu Ala Tyr Val Val Gln Leu Pro
    290                 295                 300

Leu Tyr Gly Val Ile Asp Thr Pro Cys Trp Lys Leu His Thr Ser Pro
305                 310                 315                 320

Leu Cys Thr Thr Asn Thr Lys Glu Gly Ser Asn Ile Cys Leu Thr Arg
                325                 330                 335

Thr Asp Arg Gly Trp Tyr Cys Asp Asn Ala Gly Ser Val Ser Phe Phe
            340                 345                 350
```

```
Pro Gln Ala Glu Thr Cys Lys Val Gln Ser Asn Arg Val Phe Cys Asp
            355                 360                 365

Thr Met Asn Ser Leu Thr Leu Pro Ser Glu Val Asn Leu Cys Asn Val
        370                 375                 380

Asp Ile Phe Asn Pro Lys Tyr Asp Cys Lys Ile Met Thr Ser Lys Thr
385                 390                 395                 400

Asp Val Ser Ser Val Ile Thr Ser Leu Gly Ala Ile Val Ser Cys
            405                 410                 415

Tyr Gly Lys Thr Lys Cys Thr Ala Ser Asn Lys Asn Arg Gly Ile Ile
            420                 425                 430

Lys Thr Phe Ser Asn Gly Cys Asp Tyr Val Ser Asn Lys Gly Val Asp
            435                 440                 445

Thr Val Ser Val Gly Asn Thr Leu Tyr Tyr Val Asn Lys Gln Glu Gly
        450                 455                 460

Lys Ser Leu Tyr Val Lys Gly Glu Pro Ile Ile Asn Phe Tyr Asp Pro
465                 470                 475                 480

Leu Val Phe Pro Ser Asp Glu Phe Asp Ala Ser Ile Ser Gln Val Asn
                485                 490                 495

Glu Lys Ile Asn Gln Ser Leu Ala Phe Ile Arg Lys Ser Asp Glu Leu
            500                 505                 510

Leu Ser Ala Ile Gly Gly Tyr Ile Pro Glu Ala Pro Arg Asp Gly Gln
            515                 520                 525

Ala Tyr Val Arg Lys Asp Gly Glu Trp Val Leu Leu Ser Thr Phe Leu
            530                 535                 540

<210> SEQ ID NO 58
<211> LENGTH: 519
<212> TYPE: PRT
<213> ORGANISM: Artificial Sequence
<220> FEATURE:
<223> OTHER INFORMATION: RSV-F DS-Cav1 without the signal peptide
<220> FEATURE:
<221> NAME/KEY: MISC_FEATURE
<222> LOCATION: (493)..(519)
<223> OTHER INFORMATION: Foldon domain

<400> SEQUENCE: 58

Gln Asn Ile Thr Glu Glu Phe Tyr Gln Ser Thr Cys Ser Ala Val Ser
1               5                   10                  15

Lys Gly Tyr Leu Ser Ala Leu Arg Thr Gly Trp Tyr Thr Ser Val Ile
            20                  25                  30

Thr Ile Glu Leu Ser Asn Ile Lys Glu Asn Lys Cys Asn Gly Thr Asp
        35                  40                  45

Ala Lys Val Lys Leu Ile Lys Gln Glu Leu Asp Lys Tyr Lys Asn Ala
    50                  55                  60

Val Thr Glu Leu Gln Leu Leu Met Gln Ser Thr Pro Ala Thr Asn Asn
65                  70                  75                  80

Arg Ala Arg Arg Glu Leu Pro Arg Phe Met Asn Tyr Thr Leu Asn Asn
                85                  90                  95

Ala Lys Lys Thr Asn Val Thr Leu Ser Lys Lys Arg Lys Arg Arg Phe
            100                 105                 110

Leu Gly Phe Leu Leu Gly Val Gly Ser Ala Ile Ala Ser Gly Val Ala
        115                 120                 125

Val Cys Lys Val Leu His Leu Glu Gly Glu Val Asn Lys Ile Lys Ser
    130                 135                 140

Ala Leu Leu Ser Thr Asn Lys Ala Val Val Ser Leu Ser Asn Gly Val
```

```
            145                 150                 155                 160
        Ser Val Leu Thr Phe Lys Val Leu Asp Leu Lys Asn Tyr Ile Asp Lys
                        165                 170                 175

Gln Leu Leu Pro Ile Leu Asn Lys Gln Ser Cys Ser Ile Ser Asn Ile
                        180                 185                 190

Glu Thr Val Ile Glu Phe Gln Gln Lys Asn Asn Arg Leu Leu Glu Ile
                        195                 200                 205

Thr Arg Glu Phe Ser Val Asn Ala Gly Val Thr Thr Pro Val Ser Thr
                        210                 215                 220

Tyr Met Leu Thr Asn Ser Glu Leu Leu Ser Leu Ile Asn Asp Met Pro
        225                 230                 235                 240

Ile Thr Asn Asp Gln Lys Lys Leu Met Ser Asn Asn Val Gln Ile Val
                            245                 250                 255

Arg Gln Gln Ser Tyr Ser Ile Met Cys Ile Ile Lys Glu Glu Val Leu
                            260                 265                 270

Ala Tyr Val Val Gln Leu Pro Leu Tyr Gly Val Ile Asp Thr Pro Cys
                            275                 280                 285

Trp Lys Leu His Thr Ser Pro Leu Cys Thr Thr Asn Thr Lys Glu Gly
                            290                 295                 300

Ser Asn Ile Cys Leu Thr Arg Thr Asp Arg Gly Trp Tyr Cys Asp Asn
        305                 310                 315                 320

Ala Gly Ser Val Ser Phe Phe Pro Gln Ala Glu Thr Cys Lys Val Gln
                            325                 330                 335

Ser Asn Arg Val Phe Cys Asp Thr Met Asn Ser Leu Thr Leu Pro Ser
                            340                 345                 350

Glu Val Asn Leu Cys Asn Val Asp Ile Phe Asn Pro Lys Tyr Asp Cys
                            355                 360                 365

Lys Ile Met Thr Ser Lys Thr Asp Val Ser Ser Ser Val Ile Thr Ser
                            370                 375                 380

Leu Gly Ala Ile Val Ser Cys Tyr Gly Lys Thr Lys Cys Thr Ala Ser
        385                 390                 395                 400

Asn Lys Asn Arg Gly Ile Ile Lys Thr Phe Ser Asn Gly Cys Asp Tyr
                            405                 410                 415

Val Ser Asn Lys Gly Val Asp Thr Val Ser Val Gly Asn Thr Leu Tyr
                            420                 425                 430

Tyr Val Asn Lys Gln Glu Gly Lys Ser Leu Tyr Val Lys Gly Glu Pro
                            435                 440                 445

Ile Ile Asn Phe Tyr Asp Pro Leu Val Phe Pro Ser Asp Glu Phe Asp
                            450                 455                 460

Ala Ser Ile Ser Gln Val Asn Glu Lys Ile Asn Gln Ser Leu Ala Phe
        465                 470                 475                 480

Ile Arg Lys Ser Asp Glu Leu Leu Ser Ala Ile Gly Gly Tyr Ile Pro
                            485                 490                 495

Glu Ala Pro Arg Asp Gly Gln Ala Tyr Val Arg Lys Asp Gly Glu Trp
                            500                 505                 510

Val Leu Leu Ser Thr Phe Leu
                    515

<210> SEQ ID NO 59
<211> LENGTH: 2088
<212> TYPE: DNA
<213> ORGANISM: Artificial Sequence
<220> FEATURE:
<223> OTHER INFORMATION: gH without the signal peptide
<220> FEATURE:
```

```
<221> NAME/KEY: misc_feature
<222> LOCATION: (1077)..(1077)
<223> OTHER INFORMATION: C>A mutation at position 1077
<220> FEATURE:
<221> NAME/KEY: misc_feature
<222> LOCATION: (1)..(2082)
<223> OTHER INFORMATION: Ectodomain
<220> FEATURE:
<221> NAME/KEY: misc_feature
<222> LOCATION: (2083)..(2088)
<223> OTHER INFORMATION: Transmembrane domain (truncated)

<400> SEQUENCE: 59
cgatatggcg cagaagccgt atccgaaccg ctggacaaag cgtttcacct actgctcaac      60
acctacggga gacccatccg cttcctgcgt gaaaatacca cccagtgtac ctacaacagc     120
agcctccgta acagcacggt cgtcagggaa aacgccatca gtttcaactt tttccaaagc     180
tataatcaat actatgtatt ccatatgcct cgatgtcttt ttgcgggtcc tctggcggag     240
cagtttctga accaggtaga tctgaccgaa accctggaaa gataccaaca gagacttaac     300
acttacgcgc tggtatccaa agacctggcc agctaccgat ctttttcgca gcagctaaag     360
gcacaagaca gcctaggtga acagcccacc actgtgccac cgcccattga cctgtcaata     420
cctcacgttt ggatgccacc gcaaaccact ccacacggcc ggacagaatc acataccacc     480
tcaggactac accgaccaca cttaaccag acctgtatcc tctttgatgg acacgatcta     540
ctattcagca ccgtcacacc ttgtttgcac caaggctttt acctcatcga cgaactacgt     600
tacgttaaaa taacactgac cgaggacttc ttcgtagtta cggtgtccat agacgacgac     660
acacccatgc tgcttatctt cggccatctt ccacgcgtac ttttcaaagc gccctatcaa     720
cgcgacaact ttatactacg acaaactgaa aaacacgagc tcctggtgct agttaagaaa     780
gatcaactga accgtcactc ttatctcaaa gacccggact tcttgacgc cgcacttgac     840
ttcaactacc tagacctcag cgcactacta cgtaacagct ttcaccgtta cgccgtggat     900
gtactcaaga gcggtcgatg tcagatgctg accgccgca cggtagaaat ggccttcgcc     960
tacgcattag cactgttcgc agcagcccga caagaagagg ccggcgccca agtctccgtc    1020
ccacgggccc tagaccgcca ggccgcactc ttacaaatac aagaatttat gatcacatgc    1080
ctctcacaaa caccaccacg caccacgttg ctgctgtatc ccacggccgt ggacctggcc    1140
aaacgagccc tttggacacc gaatcagatc accgacatca ccagcctcgt acgcctggtc    1200
tacatactct ctaaacagaa tcagcaacat ctcatccccc aatgggcact acgacagatc    1260
gccgactttg ccctaaaact acacaaaacg cacctggcc cttttcttc agccttcgca    1320
cgccaagaac tctacctcat gggcagcctc gtccactcca tgctggtaca tacgacggag    1380
agacgcgaaa tcttcatcgt agaaacgggc ctctgttcat ggccgagct atcacacttt    1440
acgcagttgt tagctcatcc acaccacgaa tacctcagcg acctgtacac accctgttcc    1500
agtagcgggc gacgcgatca ctcgctcgaa cgcctcacgc gtctcttccc cgatgccacc    1560
gtccccgcta ccgttcccgc cgccctctcc atcctatcta ccatgcaacc aagcacgctg    1620
gaaaccttcc ccgacctgtt ttgcttgccg ctcggcgaat ccttctccgc gctgaccgtc    1680
tccgaacacg tcagttatat cgtaacaaac cagtacctga tcaaaggtat ctcctaccct    1740
gtctccacca ccgtcgtagg ccagagcctc atcatcaccc agacggacag tcaaactaaa    1800
tgcgaactga cgcgcaacat gcataccaca cacagcatca cagtggcgct caacatttcg    1860
ctagaaaact gcgccttttg ccaaagcgcc ctgctagaat acgacgacac gcaaggcgtc    1920
atcaacatca tgtacatgca cgactcggac gacgtccttt tcgccctgga tccctacaac    1980
```
gaagtggtgg tctcatctcc gcgaactcac tacctcatgc ttttgaaaaa cggtacggta    2040
ctagaagtaa ctgacgtcgt cgtggacgcc accgacagtc gtctcctc                2088

<210> SEQ ID NO 60
<211> LENGTH: 696
<212> TYPE: PRT
<213> ORGANISM: Artificial Sequence
<220> FEATURE:
<223> OTHER INFORMATION: gH without the signal peptide
<220> FEATURE:
<221> NAME/KEY: MISC_FEATURE
<222> LOCATION: (1)..(694)
<223> OTHER INFORMATION: Ectodomain
<220> FEATURE:
<221> NAME/KEY: MISC_FEATURE
<222> LOCATION: (694)..(696)
<223> OTHER INFORMATION: Transmembrane domain (truncated)

<400> SEQUENCE: 60

Arg Tyr Gly Ala Glu Ala Val Ser Glu Pro Leu Asp Lys Ala Phe His
1               5                   10                  15

Leu Leu Leu Asn Thr Tyr Gly Arg Pro Ile Arg Phe Leu Arg Glu Asn
            20                  25                  30

Thr Thr Gln Cys Thr Tyr Asn Ser Ser Leu Arg Asn Ser Thr Val Val
        35                  40                  45

Arg Glu Asn Ala Ile Ser Phe Asn Phe Gln Ser Tyr Asn Gln Tyr
    50                  55                  60

Tyr Val Phe His Met Pro Arg Cys Leu Phe Ala Gly Pro Leu Ala Glu
65                  70                  75                  80

Gln Phe Leu Asn Gln Val Asp Leu Thr Glu Thr Leu Glu Arg Tyr Gln
                85                  90                  95

Gln Arg Leu Asn Thr Tyr Ala Leu Val Ser Lys Asp Leu Ala Ser Tyr
            100                 105                 110

Arg Ser Phe Ser Gln Gln Leu Lys Ala Gln Asp Ser Leu Gly Glu Gln
        115                 120                 125

Pro Thr Thr Val Pro Pro Ile Asp Leu Ser Ile Pro His Val Trp
    130                 135                 140

Met Pro Pro Gln Thr Thr Pro His Gly Trp Thr Glu Ser His Thr Thr
145                 150                 155                 160

Ser Gly Leu His Arg Pro His Phe Asn Gln Thr Cys Ile Leu Phe Asp
                165                 170                 175

Gly His Asp Leu Leu Phe Ser Thr Val Thr Pro Cys Leu His Gln Gly
            180                 185                 190

Phe Tyr Leu Ile Asp Glu Leu Arg Tyr Val Lys Ile Thr Leu Thr Glu
        195                 200                 205

Asp Phe Phe Val Val Thr Val Ser Ile Asp Asp Thr Pro Met Leu
    210                 215                 220

Leu Ile Phe Gly His Leu Pro Arg Val Leu Phe Lys Ala Pro Tyr Gln
225                 230                 235                 240

Arg Asp Asn Phe Ile Leu Arg Gln Thr Glu Lys His Glu Leu Leu Val
                245                 250                 255

Leu Val Lys Lys Asp Gln Leu Asn Arg His Ser Tyr Leu Lys Asp Pro
            260                 265                 270

Asp Phe Leu Asp Ala Ala Leu Asp Phe Asn Tyr Leu Asp Leu Ser Ala
        275                 280                 285

Leu Leu Arg Asn Ser Phe His Arg Tyr Ala Val Asp Val Leu Lys Ser
    290                 295                 300

```
Gly Arg Cys Gln Met Leu Asp Arg Arg Thr Val Glu Met Ala Phe Ala
305                 310                 315                 320

Tyr Ala Leu Ala Leu Phe Ala Ala Arg Gln Glu Glu Ala Gly Ala
            325                 330                 335

Gln Val Ser Val Pro Arg Ala Leu Asp Arg Gln Ala Ala Leu Leu Gln
            340                 345                 350

Ile Gln Glu Phe Met Ile Thr Cys Leu Ser Gln Thr Pro Pro Arg Thr
            355                 360                 365

Thr Leu Leu Leu Tyr Pro Thr Ala Val Asp Leu Ala Lys Arg Ala Leu
            370                 375                 380

Trp Thr Pro Asn Gln Ile Thr Asp Ile Thr Ser Leu Val Arg Leu Val
385                 390                 395                 400

Tyr Ile Leu Ser Lys Gln Asn Gln Gln His Leu Ile Pro Gln Trp Ala
            405                 410                 415

Leu Arg Gln Ile Ala Asp Phe Ala Leu Lys Leu His Lys Thr His Leu
            420                 425                 430

Ala Ser Phe Leu Ser Ala Phe Ala Arg Gln Glu Leu Tyr Leu Met Gly
            435                 440                 445

Ser Leu Val His Ser Met Leu Val His Thr Thr Glu Arg Arg Glu Ile
450                 455                 460

Phe Ile Val Glu Thr Gly Leu Cys Ser Leu Ala Glu Leu Ser His Phe
465                 470                 475                 480

Thr Gln Leu Leu Ala His Pro His His Glu Tyr Leu Ser Asp Leu Tyr
            485                 490                 495

Thr Pro Cys Ser Ser Ser Gly Arg Arg Asp His Ser Leu Glu Arg Leu
            500                 505                 510

Thr Arg Leu Phe Pro Asp Ala Thr Val Pro Ala Thr Val Pro Ala Ala
            515                 520                 525

Leu Ser Ile Leu Ser Thr Met Gln Pro Ser Thr Leu Glu Thr Phe Pro
530                 535                 540

Asp Leu Phe Cys Leu Pro Leu Gly Glu Ser Phe Ser Ala Leu Thr Val
545                 550                 555                 560

Ser Glu His Val Ser Tyr Ile Val Thr Asn Gln Tyr Leu Ile Lys Gly
            565                 570                 575

Ile Ser Tyr Pro Val Ser Thr Thr Val Val Gly Gln Ser Leu Ile Ile
            580                 585                 590

Thr Gln Thr Asp Ser Gln Thr Lys Cys Glu Leu Thr Arg Asn Met His
            595                 600                 605

Thr Thr His Ser Ile Thr Val Ala Leu Asn Ile Ser Leu Glu Asn Cys
            610                 615                 620

Ala Phe Cys Gln Ser Ala Leu Leu Glu Tyr Asp Asp Thr Gln Gly Val
625                 630                 635                 640

Ile Asn Ile Met Tyr Met His Asp Ser Asp Val Leu Phe Ala Leu
            645                 650                 655

Asp Pro Tyr Asn Glu Val Val Val Ser Ser Pro Arg Thr His Tyr Leu
            660                 665                 670

Met Leu Leu Lys Asn Gly Thr Val Leu Glu Val Thr Asp Val Val Val
            675                 680                 685

Asp Ala Thr Asp Ser Arg Leu Leu
690                 695
```

UNITED STATES PATENT AND TRADEMARK OFFICE
CERTIFICATE OF CORRECTION

PATENT NO. : 12,433,944 B2
APPLICATION NO. : 17/052707
DATED : October 7, 2025
INVENTOR(S) : Sumi Biswas et al.

Page 1 of 1

It is certified that error appears in the above-identified patent and that said Letters Patent is hereby corrected as shown below:

In the Claims

In Claim 13, Column 122, Line 22, replace "PUL128," with -- pUL128, --.

Signed and Sealed this
Twenty-fifth Day of November, 2025

John A. Squires
*Director of the United States Patent and Trademark Office*